(12) United States Patent
Choi et al.

(10) Patent No.: US 12,279,614 B2
(45) Date of Patent: Apr. 22, 2025

(54) PHOTO-POLYMERIZABLE, UNIVERSAL ANTIMICROBIAL COATING TO PRODUCE HIGH-PERFORMING, MULTI-FUNCTIONAL FACE MASKS

(71) Applicant: The Governors of the University of Alberta, Edmonton (CA)

(72) Inventors: Hyo-Jick Choi, Edmonton (CA); Surjith Kumaran, Edmonton (CA); Euna Oh, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 0 days.

(21) Appl. No.: 18/306,615

(22) Filed: Apr. 25, 2023

(65) Prior Publication Data

US 2023/0337670 A1    Oct. 26, 2023

Related U.S. Application Data

(60) Provisional application No. 63/334,292, filed on Apr. 25, 2022.

(51) Int. Cl.
  *A01N 43/40* (2006.01)
  *A01N 25/10* (2006.01)
  *C07G 1/00* (2011.01)

(52) U.S. Cl.
  CPC .............. *A01N 43/40* (2013.01); *A01N 25/10* (2013.01); *C07G 1/00* (2013.01)

(58) Field of Classification Search
  CPC ............ A01N 43/40; A01N 25/10; C07G 1/00
  USPC ......................................................... 530/500
  See application file for complete search history.

(56) References Cited

U.S. PATENT DOCUMENTS

| 3,699,958 A | 10/1972 | Szucs |
| 5,783,502 A | 7/1998 | Swanson |
| 5,849,311 A | 12/1998 | Sawan et al. |
| 6,368,361 B1 | 4/2002 | Yayabe et al. |
| 8,318,282 B2 | 11/2012 | Ylitalo et al. |
| 10,961,401 B2 | 3/2021 | Porosa et al. |
| 2010/0282083 A1 | 11/2010 | Edwards |
| 2012/0082711 A1 | 4/2012 | Goranov |
| 2020/0383907 A1 | 12/2020 | Shiuey |

FOREIGN PATENT DOCUMENTS

EP    2558637 A2    2/2013

OTHER PUBLICATIONS

Kumaran et al., "Photopolymerizable, Universal Antimicrobial Coating to Produce High-Performing, Multifunctional Face Masks", Nano Letters, Apr. 26, 2021, vol. 21, p. 5422-5429. (Year: 2021).*
ASTM F1862/F1862M-17, "Standard Test Method for Resistance of Medical Face Masks to Penetration by Synthetic Blood (Horizontal Projection of Fixed Volume at a Known Velocity)", published Jun. 2017 (21 pages).

(Continued)

*Primary Examiner* — David T Karst
(74) *Attorney, Agent, or Firm* — Clark & Elbing LLP

(57) ABSTRACT

Disclosed herein is a photo-polymerizable coating with broad-spectrum antimicrobial properties designed for personal protective equipment (PPE), such as face masks.

15 Claims, 21 Drawing Sheets

Specification includes a Sequence Listing.

(56) References Cited

OTHER PUBLICATIONS

ASTM F2100-19, "Standard Specification for Performance of Materials Used in Medical Face Masks", published Aug. 2019 (4 pages).
ASTM F2101-19, "Standard Test Method for Evaluating the Bacterial Filtration Efficiency (BFE) of Medical Face Mask Materials, Using a Biological Aerosol of *Staphylococcus aureus*", published Jul. 2019 (6 pages).
ASTM F2299/F2299M-03, "Standard Test Method for Determining the Initial Efficiency of Materials Used in Medical Face Masks to Penetration by Particulates Using Latex Spheres", published Jun. 2017 (8 pages).
Badrossamay et al., "Acyclic Halamine Polypropylene Polymer: Effect of Monomer Structure on Grafting Efficiency, Stability and Biocidal Activities," Reactive & Functional Polymers, vol. 68 (Oct. 2008), pp. 1636-1645.
Bai et al., "N-halamine-containing Electrospun Fibers Kill Bacteria via a Contact/release Co-determined Antibacterial Pathway," ACS Applied Materials & Interfaces (Nov. 2016) (11 pages).
Botequim et al., "Nanoparticles and Surfaces Presenting Antifungal, Antibacterial and Antiviral Properties," Langmuir, vol. 28(20), (Apr. 2012) pp. 7646-7656.
Bright et al., "Assessment of the Antiviral Properties of Zeolites Containing Metal Ions," Food Environ Virol, vol. 1(1), (2009) pp. 37-41.
Brosseau et al., "Bacterial Survival on Respirator Filters and Surgical Masks," Journal of the American Biological Safety Association, vol. 2(3), (1997) pp. 32-43.
Cagno et al., "Broad-Spectrum Non-toxic Antiviral Nanoparticles with a Virucidal Inhibition Mechanism," Nature Materials, vol. 17(2), published Dec. 2017, (10 pages).
Castro-Mayorga et al., "Antiviral Properties of Silver Nanoparticles Against Norovirus Surrogates and Their Efficacy in Coated Polyhydroxyalkanoates Systems," LWT—Food Science and Technology, vol. 79, (Jan. 2017) (28 pages).
CDRH: "Guidance for Industry and FDA Staff: Surgical Masks—Premarket Notification [510(k)] Submissions," Food and Drug Administration, (May 2003) (17 pages).
Cerkez et al., "Antimicrobial Surface Coatings for Polypropylene Nonwoven Fabrics," Reactive and Functional Polymers, Aug. 2013, vol. 73(11), pp. 1412-1419.
Cheng et al., "Antimicrobial Coating of Modified Chitosan Onto Cotton Fabrics," Applied Surface Science, 2014, vol. 309 (6 pages).
Chua et al., "Face Masks in the New COVID-19 Normal: Materials, Testing, and Perspectives," AAAS Research, vol. 20, Article ID 7286735, (2020) (40 pages).
Chughtai et al., "Contamination by Respiratory Viruses on Outer Surface of Medical Masks Used by Hospital Healthcare Workers," BMC Infectious Diseases, 2019, vol. 19(1), (8 pages).
Coronavirus disease (COVID-19) pandemic, World Health Organisation https://www.who.int/emergencies/diseases/novel-coronavirus-2019, last updated: May 25, 2024 (12 pages).
Deleo et al., "Assessment of Ecological Hazards and Environmental Fate of Disinfectant Quaternary Ammonium Compounds," Ecotoxicology and Environmental Safety, Sep. 2020, vol. 206, (10 pages).
Gelman et al., "Drastically Lowering the Titer of Waterborne Bacteriophage PRD1 by Exposure to Immobilized Hydrophobic Polycations," Biotechnology Letters, (2004) vol. 26(22), pp. 1695-1700.
Haldar et al., "Polymeric Coatings That Inactivate Both Influenza Virus and Pathogenic Bacteria," Proceedings of the National Academy of Sciences of the United States of America, Nov. 2006, vol. 103(47), pp. 17667-17671.
Hintermann., "Comprehensive Organic Name Reactions and Reagents," Angew. Chem. Int. Ed., 2010, vol. 49(15), pp. 2659-2660.
Impact of the Coronavirus Pandemic on the Global Economy—Statistics & Facts. https://www.statista.com/topics/6139/covid-19-impact-on-the-global-economy, published Online Jan. 10, 2024 (5 pages).
Jampala et al., "Plasma-enhanced Synthesis of Bactericidal Quaternary Ammonium Thin Layers on Stainless Steel and Cellulose Surfaces," Langmuir, Jul. 2008, vol. 24(16), pp. 8583-8591.
Jennings et al., "Quaternary Ammonium Compounds: An Antimicrobial Mainstay and Platform for Innovation to Address Bacterial Resistance," ACS Infectious Diseases, May 2015, vol. 1(7), pp. 288-303.
Jeong et al., "Coating of an Antimicrobial Peptide on Solid Substrate via Initiated Chemical Vapor Deposition," Journal of Industrial and Engineering Chemistry, Feb. 2018, vol. (58), (22 pages).
Jung et al., "Preparation of Airborne Ag/CNT Hybrid Nanoparticles Using an Aerosol Process and Their Application to Antimicrobial Air Filtration," Langmuir, Jul. 2011, vol. 27(16), pp. 10256-10264.
Kang et al., "Filtration of Nanoparticles with Dimethyldioctadecylammonium Bromide Treated Microporous Polypropylene Filters," Langmuir, (1997) vol. 13, pp. 1820-1826.
Kroehnke, Fritz, "The Specific Synthesis of Pyridines and Oligopyridines," Synthesis, (1976) vol. 1, (24 pages).
Lin et al., "Durably Antibacterial and Bacterially Anti-Adhesive Cotton Fabrics Coated by Cationic Fluorinated Polymers," ACS Applied Materials & Interfaces, Jan. 2018, vol. 10(7), (52 pages).
Lundin et al., "Targeting Membrane-Bound Viral RNA Synthesis Reveals Potent Inhibition of Diverse Coronaviruses Including the Middle East Respiratory Syndrome Virus," PLOS Pathogens, May 2014, vol. 10(5), pp. 1-15.
Marti et., "Protective Face Mask Filter Capable of Inactivating SARS-CoV-2, and Methicillin- Resistant *Staphylococcus aureus* and *Staphylococcus epidermidis*," Polymers, Jan. 2021, vol. 13(2), 207, pp. 1-12.
Milovic et al., "Immobilized N-Alkylated Polyethylenimine Avidly Kills Bacteria by Rupturing Cell Membranes With No Resistance Developed," Biotechnology and Bioengineering, Mar. 2005, vol. 90(6), (8 pages).
N95 Respirators, Surgical Masks, Face Masks, and Barrier Face Coverings, https://www.fda.gov/medical-devices/personal-protective-equipment-infection-control/n95-respirators-and-surgical-masks-face-masks, (downloaded Jun. 2024) (6 pages).
Parent et al., "Synthesis and Characterization of Isobutylene-Based Ammonium and Phosphonium Bromide Ionomers, " Macromolecules, Sep. 2004, vol. 37(20), pp. 7477-7483.
Pineda et al., "Amide-Controlled, One-Pot Synthesis of Tri-Substituted Purines Generates Structural Diversity and Analogues with Trypanocidal Activity," Scientific Reports, Mar. 2015, vol. 5(1), pp. 1-9.
Quan et al., "Universal and Reusable Virus Deactivation System for Respiratory Protection," Scientific Reports, Jan. 2017, vol. 7(1), pp. 1-10.
Romanowski., "Benzalkonium Chloride Demonstrates Concentration-Dependent Antiviral Activity Against Adenovirus In Vitro," Journal of Ocular Pharmacology and Therapeutics, Feb. 2019, vol. 35(5), (4 pages).
Rubino et al., "Salt Coatings Functionalize Inert Membranes into High-Performing Filters against Infectious Respiratory Diseases," Scientific Reports, Aug. 2020, vol. 10(1), (10 pages).
Rubino et al., "Role of Respiratory Protection Against Pandemic and Epidemic Diseases," Tibtec, Oct. 2017, vol. 35(10), pp. 907-910.
Standard Respirator Testing Procedures, The National Personal Protective Technology Laboratory (NPPTL), https://www.cdc.gov/niosh/npptl/stps/respirator_testing.html, downloaded Jun. 2024 (16 pages).
Tellier et al., "Recognition of Aerosol Transmission of Infectious Agents: A Commentary," BMC Infectious Diseases, (2019) vol. 19(101), pp. 1-9.
Tlili et al., "Single-Walled Carbon Nanotube Chemoresistive Label-Free Immunosensor For Salivary Stress Biomarkers," Analyst, Aug. 2010, vol. 135(10), pp. 2637-2642.
Tuladhar et al., "Different Virucidal Activities of Hyperbranched Quaternary Ammonium Coatings on Poliovirus and Influenza Virus," Applied and Environmental Microbiology, Apr. 2012, vol. 78(7), pp. 2456-2458.

(56) References Cited

OTHER PUBLICATIONS

Vabret et al., "Direct Diagnosis of Human Respiratory Coronaviruses 229E and OC43 by the Polymerase Chain Reaction," Journal of Virological Methods, May 2001, vol. 97, pp. 59-66.
Vijgen et al., "Complete Genomic Sequence of Human Coronavirus OC43: Molecular Clock Analysis Suggests a Relatively Recent Zoonotic Coronavirus Transmission Event," Journal of Virology, Feb. 2005, vol. 79(3), pp. 1595-1604.
Viscusi et al., "Evaluation of the Filtration Performance of 21 N95 Filtering Face Piece Respirators After Prolonged Storage," American Journal of Infection Control, Jun. 2009, vol. 37(5), pp. 381-386.
Wang et., "Surface Modification of Low-Density Polyethylene Films by UV-Induced Graft Copolymerization and Its Relevance to Photolamination," Langmuir, Jan. 1998, vol. 14(4), pp. 921-927.
Weber et al., "The Effect of Blood on the Anitiviral Activity of Sodium Hypochlorite, a Phenolic, and a Quaternary Ammonium Compound," Infection Control and Hospital Epidemiology, Dec. 1999, vol. 20(12), pp. 821-827.
WHO: "Mask use in the Context of COVID-19: Interim Guidance," World Health Organization, Dec. 2020, (22 pages).
Wood et al., "The Action of Three Antiseptics/disinfectants Against Enveloped and Non-enveloped Viruses," Journal of Hospital Infection, (1998), vol. 38(4), pp. 283-295.
YIM et., "KN95 and N95 Respirators Retain Filtration Efficiency despite a Loss of Dipole Charge during Decontamination," ACS Applied Materials & Interfaces, Dec. 2020, vol. 12(49), (8 pages).
Zalas et al., "Synthesis of New Dendritic Antenna-like Polypyridine Ligands," Chemical Papers, (2012), vol. 66(8), pp. 733-740.
Zhou et al., "Progress and Perspective of Antiviral Protective Material," Advanced Fiber Materials, Jun. 2020, (17 pages).

* cited by examiner

SEQUENCE LISTING

```
Sequence total quantity: 12
SEQ ID NO: 1            moltype = DNA  length = 22
FEATURE                 Location/Qualifiers
source                  1..22
                        mol_type = other DNA
                        organism = synthetic construct
SEQUENCE: 1
ggaaagaagt cctcgtgcta tg                                               22

SEQ ID NO: 2            moltype = DNA  length = 22
FEATURE                 Location/Qualifiers
source                  1..22
                        mol_type = other DNA
                        organism = synthetic construct
SEQUENCE: 2
caatcgtgga ctggtgtatc tg                                               22

SEQ ID NO: 3            moltype = DNA  length = 20
FEATURE                 Location/Qualifiers
source                  1..20
                        mol_type = other DNA
                        organism = synthetic construct
SEQUENCE: 3
gcacggtctg cactcatatt                                                  20

SEQ ID NO: 4            moltype = DNA  length = 21
FEATURE                 Location/Qualifiers
source                  1..21
                        mol_type = other DNA
                        organism = synthetic construct
SEQUENCE: 4
tcctccactt ctggtcctta t                                                21
```

```
SEQ ID NO: 5              moltype = DNA   length = 20
FEATURE                   Location/Qualifiers
source                    1..20
                          mol_type = other DNA
                          organism = synthetic construct
SEQUENCE: 5
tggccccatt aaaaatgtgt                                                        20

SEQ ID NO: 6              moltype = DNA   length = 20
FEATURE                   Location/Qualifiers
source                    1..20
                          mol_type = other DNA
                          organism = synthetic construct
SEQUENCE: 6
cctgaacacc tgaagccaat                                                        20

SEQ ID NO: 7              moltype = DNA   length = 22
FEATURE                   Location/Qualifiers
source                    1..22
                          mol_type = other DNA
                          organism = synthetic construct
SEQUENCE: 7
ctctggtgtg tggtgcttat ag                                                     22

SEQ ID NO: 8              moltype = DNA   length = 23
FEATURE                   Location/Qualifiers
source                    1..23
                          mol_type = other DNA
                          organism = synthetic construct
SEQUENCE: 8
ctcgtttagg gaaagggtct atg                                                    23

SEQ ID NO: 9              moltype = DNA   length = 20
FEATURE                   Location/Qualifiers
source                    1..20
                          mol_type = other DNA
                          organism = synthetic construct
SEQUENCE: 9
ggcttatgtg gccccttact                                                        20

SEQ ID NO: 10             moltype = DNA   length = 20
FEATURE                   Location/Qualifiers
source                    1..20
                          mol_type = other DNA
                          organism = synthetic construct
SEQUENCE: 10
ggcaaatctg cccaagaata                                                        20

SEQ ID NO: 11             moltype = DNA   length = 22
FEATURE                   Location/Qualifiers
source                    1..22
                          mol_type = other DNA
                          organism = synthetic construct
SEQUENCE: 11
tgatgcttat cttgcagaca ct                                                     22

SEQ ID NO: 12             moltype = DNA   length = 20
FEATURE                   Location/Qualifiers
source                    1..20
                          mol_type = other DNA
                          organism = synthetic construct
SEQUENCE: 12
acgtcatcca catcaaggac                                                        20
```

PHOTO-POLYMERIZABLE, UNIVERSAL ANTIMICROBIAL COATING TO PRODUCE HIGH-PERFORMING, MULTI-FUNCTIONAL FACE MASKS

CROSS REFERENCE TO RELATED APPLICATIONS

This application claims priority to U.S. Provisional Application No. 63/334,292 filed Apr. 25, 2022.

INTRODUCTION

The present disclosure relates generally to a photo-polymerizable, universal antimicrobial coating to produce high-performing, multi-functional face masks.

SEQUENCE LISTING

This instant application contains a Sequence Listing which has been submitted electronically in XML format and is hereby incorporated by reference in its entirety. The XML copy, created on Apr. 24, 2023, is named 51012-061001_Sequence_Listing_ST.26_4_24_23.

BACKGROUND

COVID-19 and respiratory diseases pose a major threat to global health and socioeconomic structures, and the need for a highly effective, antimicrobial face mask has been considered a major challenge for protection against respiratory diseases.

SUMMARY

This disclosure presents a photo-polymerizable coating with broad-spectrum antimicrobial properties designed for personal protective equipment (PPE) such as face masks, N95 respirators, cotton fabrics, aprons, gowns, and high touch surfaces. The coating effectively inactivates airborne bacteria, fungi, and viruses, which is particularly relevant during the current global health crisis caused by COVID-19, H1N1, and other respiratory diseases. The coating is made of lignin-conjugated 2,2',6',2"-(terpyridine-1-methyl ammonium chloride-1-yloxy) methyl epoxide (LTMAC) and lignin-conjugated hexyl adenine epoxide (LAHAC), which are either hydrophobic or hydrophilic, and applied to spunbond and meltblown nonwoven polypropylene fabrics. In some embodiments, the invention involves the production of TMAC and AHAC, antimicrobial agents, through various synthesis strategies for elimination of hazardous materials and cost reduction. The lignin-based material can be dip/spray-coated over conventional mask fabrics, imparting antimicrobial properties, and rapid inactivation of multiple types of viruses and bacteria. This antimicrobial coating technology is cost-effective, material-independent, and derived from sustainable sources. The hydrophilic and hydrophobic coating can provide contact-based or non-contact-based inactivation of pathogens, creating a barrier against airborne and droplet pathogens. The polymer coating can be rapidly implemented using a spray system and UV cure and can address multiple levels of health and safety hierarchy by minimizing specific modes of pathogen transmission. These findings have immediate implications in containing infectious diseases, such as COVID-19, and provide a practical method for mitigating their spread.

On one aspect, there is provided a composition comprising: a lignin conjugated 2,2',6',2"-(terpyridine-1-methyl ammonium chloride-1-yloxy) methyl epoxide (LTMAC).

In one example, the composition further comprising a crosslinker and a UV initiator.

In one example, the composition further comprising 2-hydoxyethyl methacrylate (HEMA), penaerythritol tatraacrylate, and Hydroxy-2-methylpropiophenone.

In one example, the composition further comprising tert-butyl methacrylate (TBMA), penaerythritol tatraacrylate, and Hydroxy-2-methylpropiophenone.

In one aspect there is provided a composition comprising: a lignin conjugated N-9(Adenine N-hexyl ammonium chloride)N-6 methyl epoxide (LAHAC).

In one example, the composition further comprising a crosslinker and a UV initiator.

In one example, the composition further comprising 2-hydoxyethyl methacrylate (HEMA), penaerythritol tatraacrylate, and 0.1% Hydroxy-2-methylpropiophenone.

In one example, the composition further comprising tert-butyl methacrylate (TBMA), penaerythritol tatraacrylate, and % Hydroxy-2-methylpropiophenone.

In one aspect there is provided a method for manufacturing an antimicrobial and/or antiviral article, comprising: applying a composition comprising: a lignin conjugated 2,2',6',2"-(terpyridine-1-methyl ammonium chloride-1-yloxy) methyl epoxide (LTMAC), or a lignin conjugated N-9(Adenine N-hexyl ammonium chloride)N-6 methyl epoxide (LAHAC), onto a surface of an article.

In one example, the method further comprising a crosslinker and a UV initiator.

In one example, the method further comprising 2-hydoxyethyl methacrylate (HEMA), penaerythritol tatraacrylate, and 0.1% Hydroxy-2-methylpropiophenone In one example, the method further comprising tert-butyl methacrylate (TBMA), penaerythritol tatraacrylate, and % Hydroxy-2-methylpropiophenone.

In one example, the applying comprising dipping or spray-coating the article with the composition.

In one example, wherein the article a facemask, a respirator, an apron, a gown, a surgical mask, a N95 mask, a N99 mask, a HEPA filter, HVAC nonwoven microfilter, a coveralls, a three-ply fabric stacked by spunbond, meltblown and spunbond fabricated polyproplene/polyethylene layers, a N100 mask, a KN 95 mask, a FFP2 mask, a P2 mask, a Korea 1st class (KF94) mask, a DS respirator mask.

In one example, wherein the article comprises cotton, silk, a synthetic fiber, chiffon polyester, a polyester/cotton blend, polypropylene, a cellulose-based fabric, a flannel fabric, and/or Spandex.

BRIEF DESCRIPTION OF THE FIGURES

FIG. 3. Characterization of antiviral performance against influenza virus. (A) Antiviral performance of the LTMAC-coated spunbond fabrics against A/PR/8/34 H1N1 (PR8) influenza virus in aerosols (2.5-4 μm) and droplets (5 μL) by measuring relative HA activity (General Linear Model (GLM), n=5-8, mean±SD), and (B,C) expression levels of HA and NP genes of the PR8 virus on the spunbond, meltblown, and spunbond-N95 face mask fabrics with two lignin conjugated antimicrobial (GLM, n=3, mean±SD) (B: LTMAC, C: LAHAC) polymer coatings measured by RT-qPCR. (D) Antiviral performance test at harsh environmental conditions against PR8 after 30 min of incubation on the fabrics. The expression of HA and NP genes were analyzed after incubation at different humidity conditions (50 and 97% RH) (HYD LTMAC and LAHAC-coated spunbond PP fabrics) for 7 days (n=5, mean±SD). (E) TEM micrographs of PR8 influenza virus (viral stock as a positive control (left) and virus exposed to spunbond fabrics with HYD LTMAC (middle) and HYD LAHAC (right) coatings after 30 min of incubation).

The spunbond PP with a monomer mixture of LTMAC and LAHAC, and with a 50:50 weight ratio shows peaks at a lower —C═O stretching vibration at 1720 cm−1, —N+-CH3 stretching at 1404 cm−1, and —N+-CH2 vibration peak at 1375 cm−1, compared to 10:90. With the increase of LAHAC concentration from 50% to 90%, the —N+-CH2 stretching shifted from 1365 cm−1 to 1375 cm−1.

Figure 14:
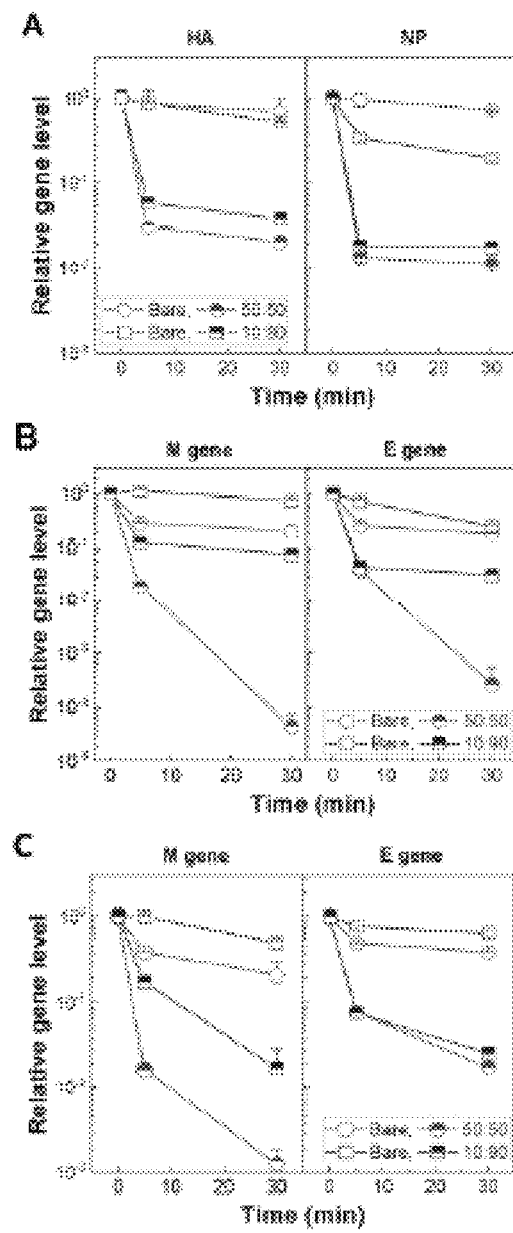

FIG. 14. Gene expression level change of PR8 influenza virus (A), HCoV-229E (B) and HCoV-OC43 (C) on spunbond PP fabrics with crosslinked antimicrobial coatings that have different weight ratios of antimicrobial moieties (TMAC:AHAC=50:50, 10:90) (n=3, mean±SD).

Figure 15:
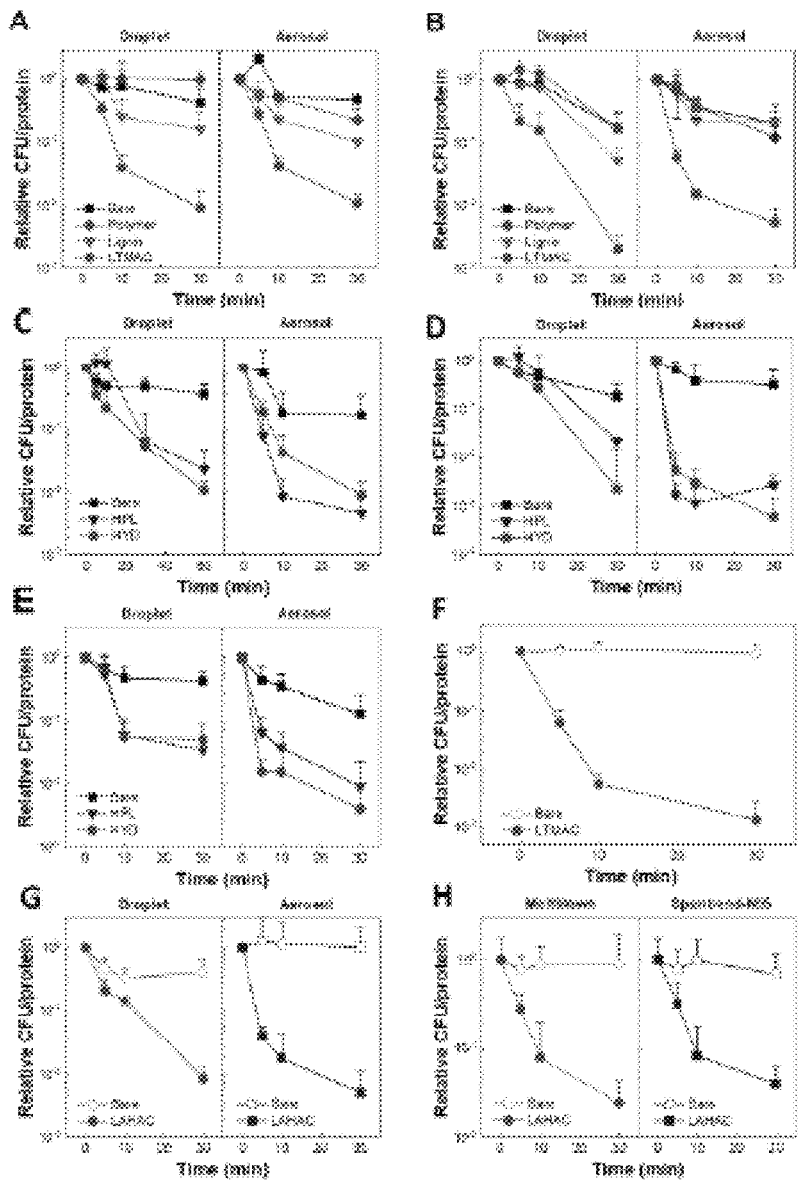

FIG. 15. Time-dependent inactivation of *K. pneumoniae* upon exposure to the spunbond, meltblown, and spunbond-N95. *K. pneumoniae* in DI water exposed to HPL LTMAC-coated spunbond fabric (n=3-4, mean±SD) (A) and HYD LTMAC-coated spunbond fabric (n=3-4, mean±SD) (B), *K. pneumoniae* in artificial saliva exposed to HPL and HYD LTMAC-coated spunbond fabrics (n=4-8, mean±SD) (C), *K. pneumoniae* in DI water (n=3-8, mean±SD) (D) and in artificial saliva (n=4, mean±SD) (E) exposed to HPL and HYD LTMAC-coated meltblown fabric, *K. pneumoniae* in DI water droplets exposed to HYD LTMAC-coated spunbond-N95 (n=4-8, mean±SD) (F), HYD LAHAC-coated spunbond PP fabric (G), and HYD LAHAC-coated meltblown fabric and spunbond-N95 (n=4, mean±SD) (H).

Figure 16:
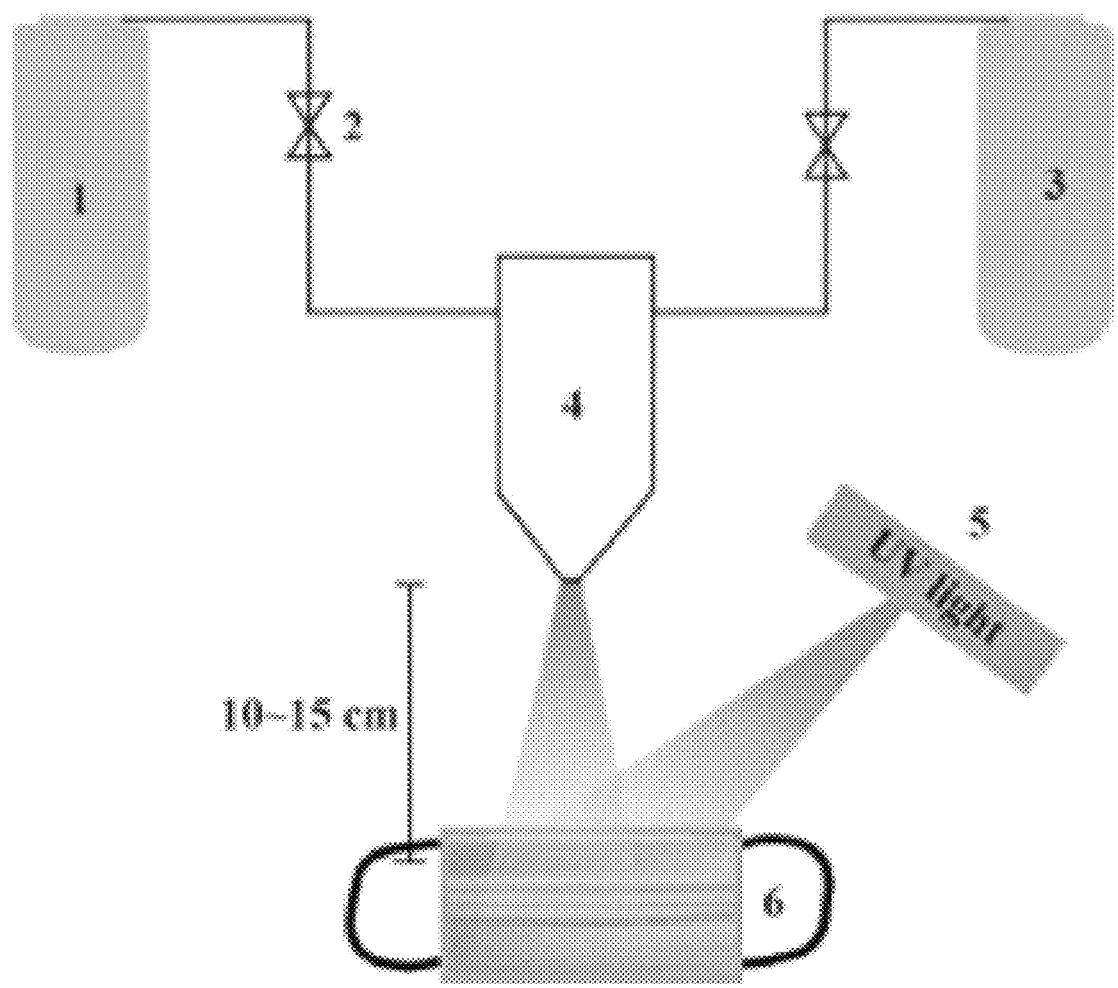

FIG. 16 schematic of lignin based antimicrobial coated system for disposable surgical mask. Containing compressed nitrogen gas (1), control valves (2), liquid coating compositions (3), spray nozzle system (4), UV light curing system (5), and surgical mask/respirator as substrates (6).

Figure 17:
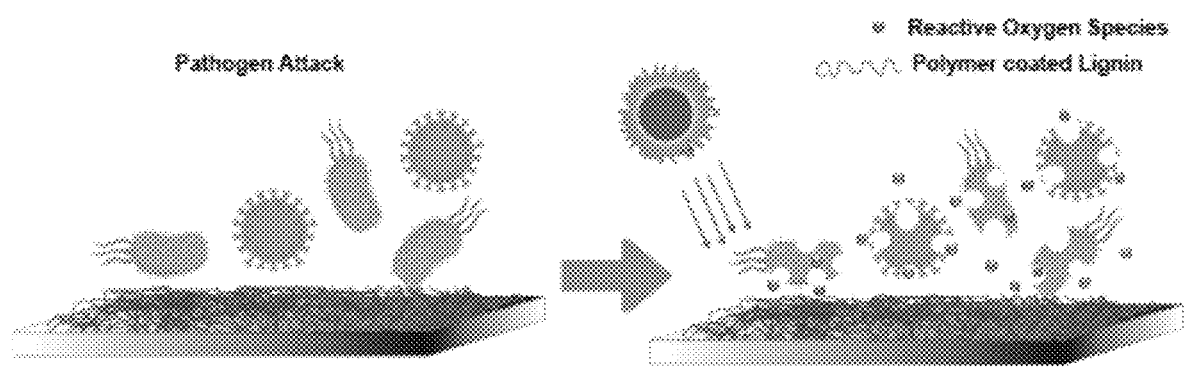

FIG. 17 Pathogen inactivation mechanism of light activated reactive oxygen species generated from lignin-based biocide coating.

Figure 18:
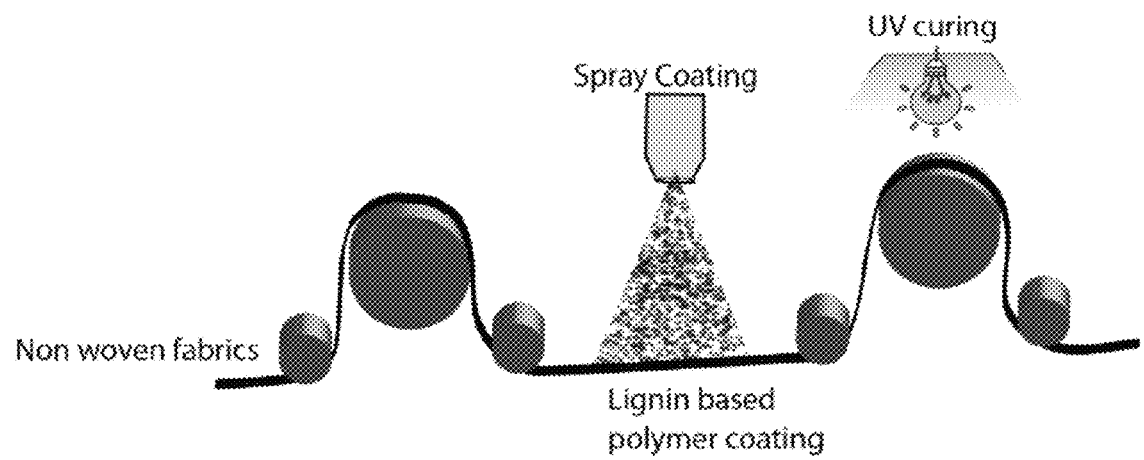

FIG. 18: Schematic example of continuous roll-on spunbond fabric strip through feed rolls and air-based spray applying of lignin based biocide monomer composition, followed by UV induced cross-link.

Figure 19:
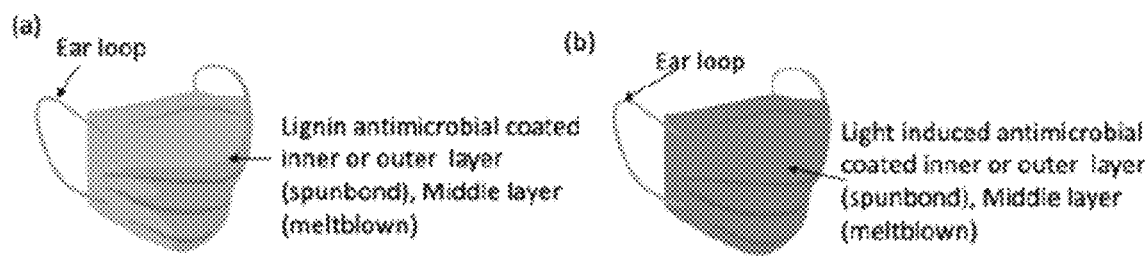

FIG. 19. Schematic representation of lignin-based antimicrobial (a) and light induced (b) antimicrobial coating on the disposable surgical mask.

Figure 20:
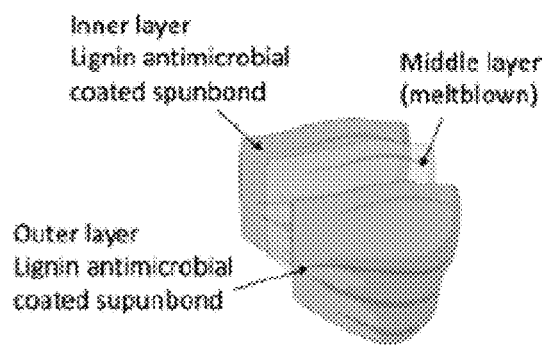

FIG. 20 depicts an example of a mask.

Figure 21:
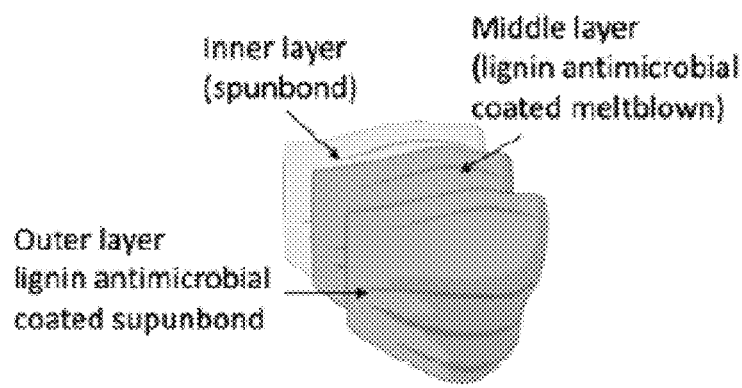

FIG. 21 combination of mask inner (spunbond), middle (lignin antimicrobial coated meltblown), and outer (lignin antimicrobial coated spunbond) layers.

Figure 22:
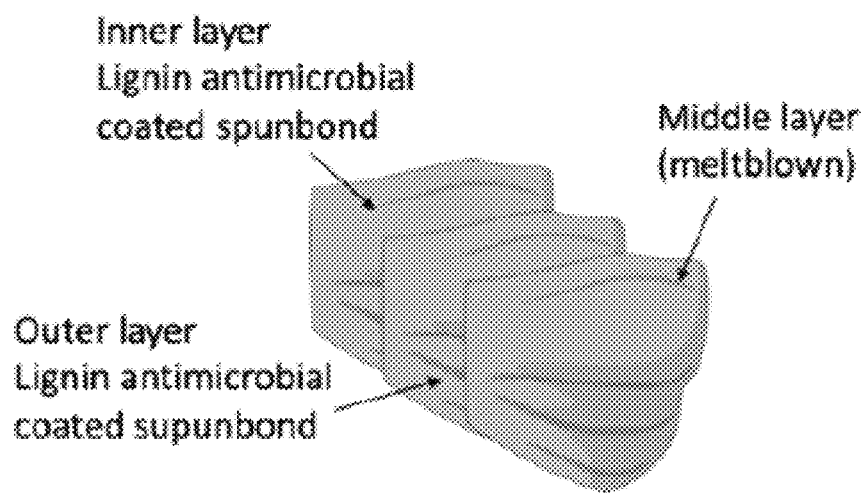

FIG. 22 depicts an example of a mask.

Figure 23:
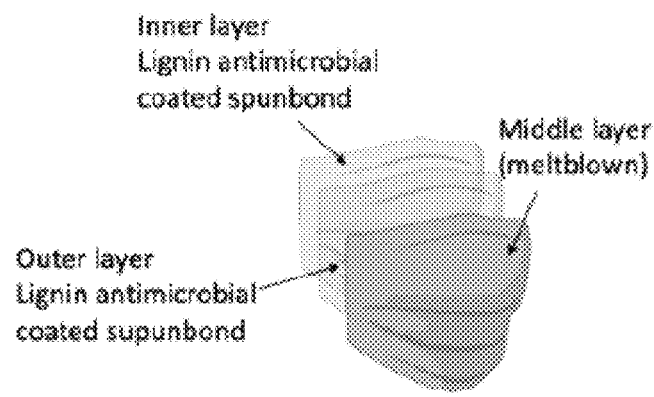

FIG. 23 combination of mask inner (lignin antimicrobial coated spunbond), middle (lignin antimicrobial coated meltblown), and outer (lignin antimicrobial coated spunbond) layers.

Figure 24:
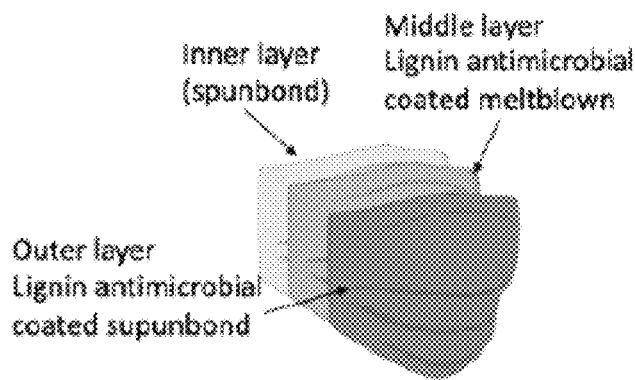

FIG. 24 depicts an example of a mask.

Figure 25:
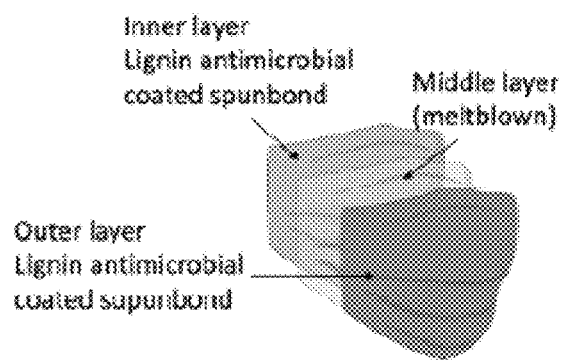

FIG. 25 combination of mask inner (lignin antimicrobial coated spunbond), middle (meltblown), and outer (light induced antimicrobial coated spunbond) layers.

Figure 26:
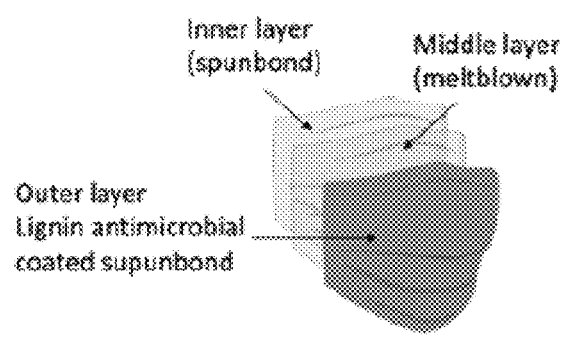

FIG. 26 combination of mask inner (lignin antimicrobial coated spunbond), middle (meltblown), and outer (light induced antimicrobial coated spunbond) layers.

Figure 27:
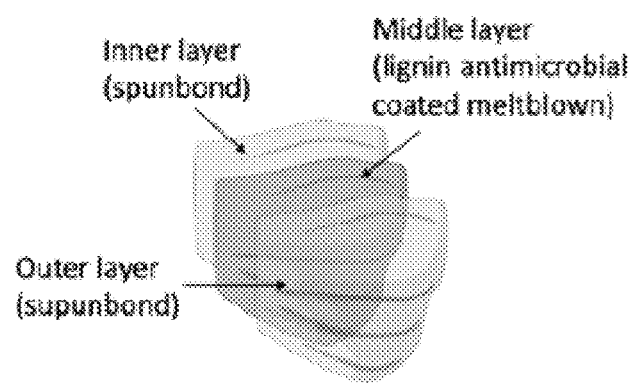

FIG. 27 combination of mask inner (spunbond), middle (lignin antimicrobial coated meltblown), and outer (spunbond) layers.

FIG. 128 Antibacterial performance of coated (LTMAC) spunbond mask layer exposed with bacterial droplet and aerosol.

Figures 28, 29:
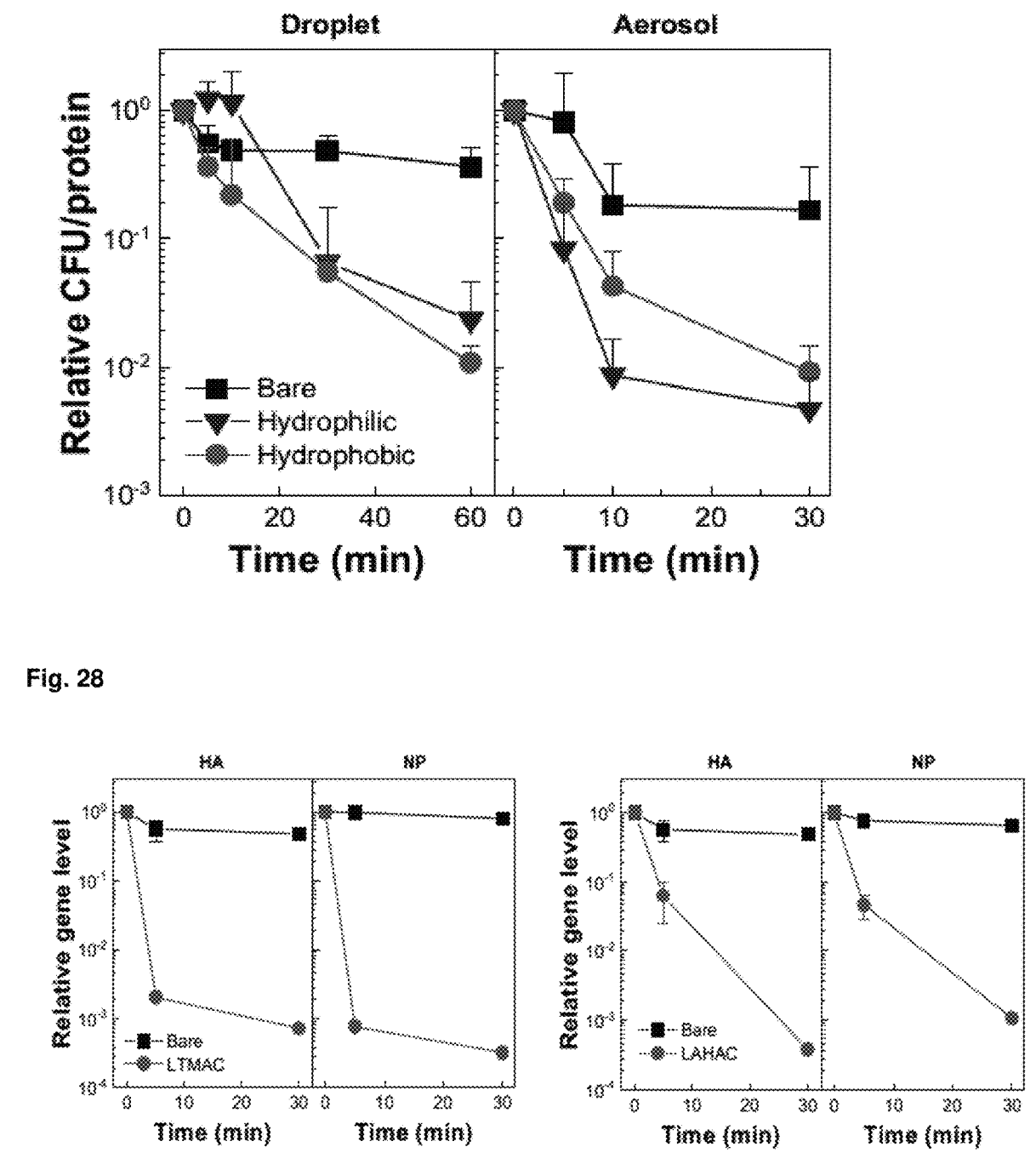

FIG. 29 Antimicrobial performance of LTMAC and LAHAC coated spunbond mask layer exposed with H1N1 aerosol.

DETAILED DESCRIPTION

Example 1

Abstract

COVID-19 poses a major threat to global health and socioeconomic structures, and the need for a highly effective, antimicrobial face mask has been considered a major challenge for protection against respiratory diseases. Here, we report the development of a universal, antiviral, and antibacterial material that can be dip-/spray-coated over conventional mask fabrics to exhibit antimicrobial activities.

Our data shows that antimicrobial fabrics rapidly inactivated multiple types of viruses, i.e. human (alpha/beta) coronaviruses, influenza virus, and bacteria, irrespective of their modes of transmission (aerosol or droplet). This research provides an immediate method to contain infectious diseases, such as COVID-19.

Respiratory diseases can be transmitted through aerosols and/or droplets released from human activities, such as coughing, sneezing, or speaking. This is exemplified by influenza, severe acute respiratory syndrome (SARS), Middle East respiratory syndrome (MERS), and COVID-19.[1] During the pandemic, wearing face masks in public and healthcare settings, where physical distancing was not possible, was recommended to decrease viral transmission in the community, as indicated by WHO.[2] The performance of current surgical masks (abbreviated as SM) and N95 respirators (abbreviated as N95) mainly depends on the mechanical filtration and, if applicable, the additional contribution from an electrostatic filtration mechanism.[3] However, the accumulation of the virus on the mask fabrics during the breathing process not only decreases filtration efficacy but also increases the risk of direct/indirect contact transmission and infection.[4] To inactivate the virus, several efforts have been made to treat face mask fabrics with diverse antimicrobial materials, including nanoparticles, metallic compounds, carbon-based materials, salts, and halogen compounds.[5,6] However, they failed to meet diverse requirements for the practical application of face masks, due to toxicity of materials, slow antimicrobial activity, pathogen-specific activity, difficulty to scale-up, incompatibility with existing manufacturing process, etc.[7] Importantly, unlike the time before the COVID-19 pandemic, the prevalence of influenza viruses, coronavirus, and the generation of mutant coronavirus increases the importance of virus type/strain non-specific inactivation capacity of the antimicrobial technology. Moreover, the reuse and long-term wear of face masks, due to global shortages, have increased the concern of bacterial contamination.[8] Therefore, this research aims to develop a virus/bacteria negation coating, which can easily be applied to any conventional face mask. In addition, the coating efficiently inactivates transmissible, viral/bacterial aerosols/droplets that are independent of the pathogen types/strains and the transmission mode, thereby improving safety and reusability of current face masks.

Figure 1:
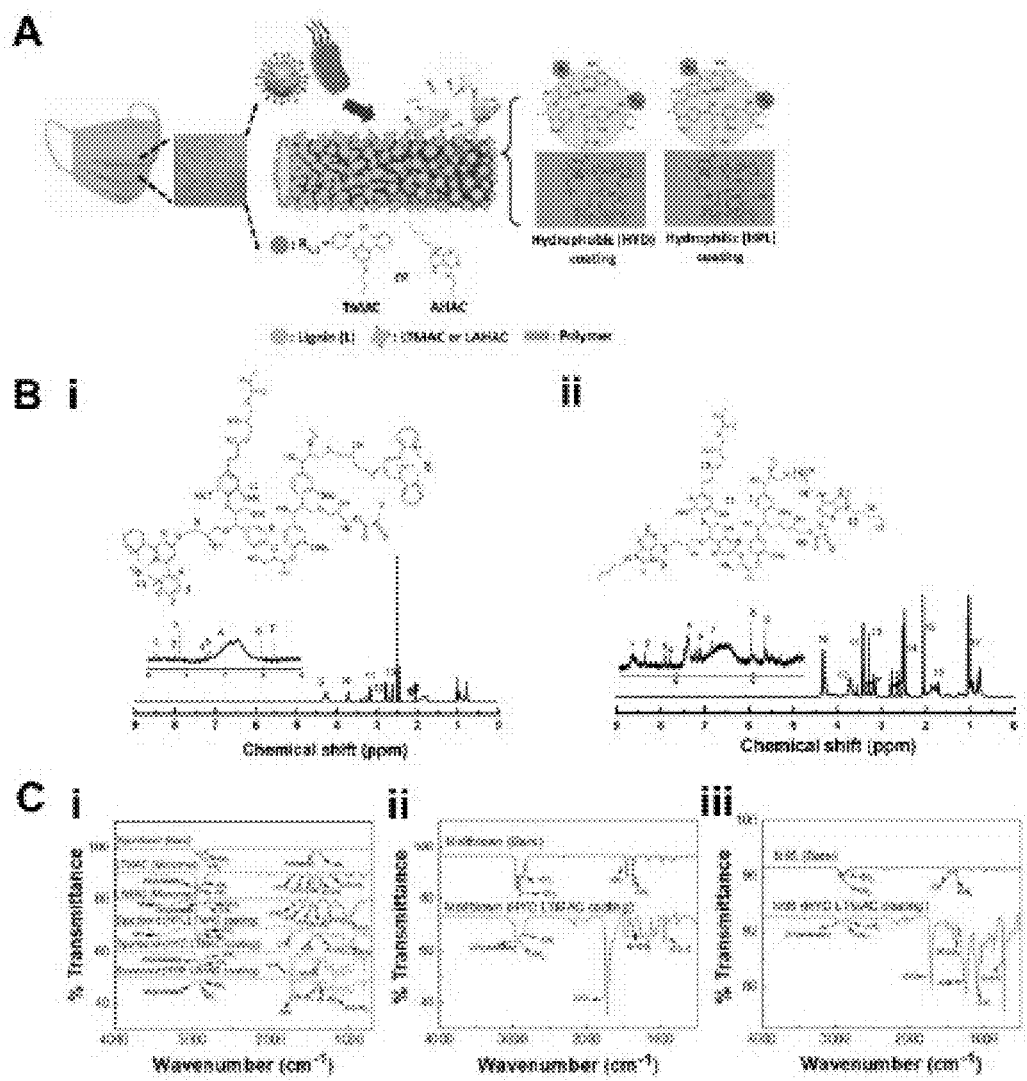
FIG. 1. Synthesis and characterization of antimicrobial coating materials and fabrication of antimicrobial face mask fabrics. (A) Schematic representation of the UV crosslinked, antimicrobial coating on the surface of the face mask. (B) Synthesis of lignin conjugated 2,2',6',2"-(terpyridine-1-methyl ammonium chloride-1-yloxy) methyl epoxide (LTMAC) and the corresponding 1H NMR (i) and synthesis of lignin conjugated hexyl adenine epoxide (LAHAC) and 1H NMR spectra of the product (ii). (C) FTIR spectra of the fabricated spunbond PP fabrics with UV crosslinked, LTMAC and LAHAC-based hydrophobic (HYD) and hydrophilic (HPL) antimicrobial polymer coatings (i), meltblown (ii), and spunbond-N95 (iii).
Figure 5:
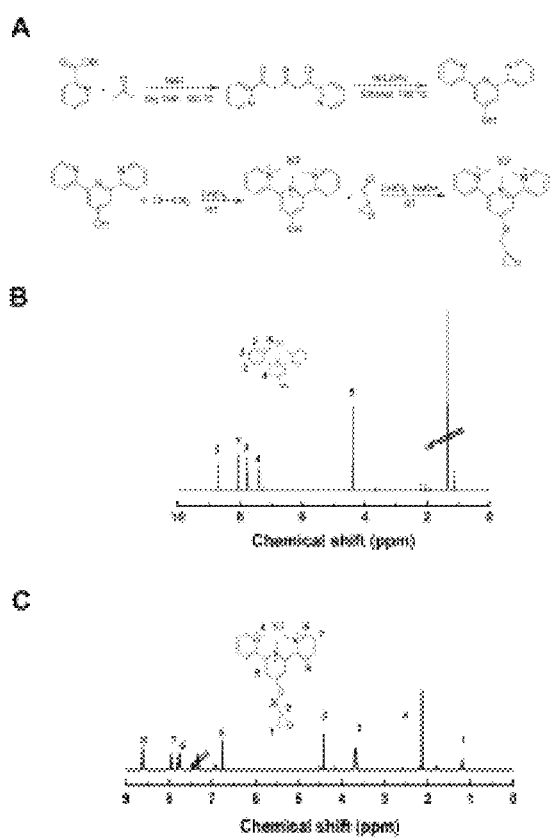
FIG. 5. Synthesis of 2,2':6',2"-(terpyridine-1-methyl ammonium chloride-1-yloxy) methyl epoxide (TMAC). Synthesis scheme of TMAC (A), 1H NMR of 2,2', 6',2"-terpyridine-1-methyl ammonium chloride-1-ol (B), and 2,2': 6',2"-(terpyridine-1-methyl ammonium chloride-1-yloxy) methyl epoxide (C). The synthetic pathway for the epoxide functionalizing antimicrobial substance, TMAC, is shown in FIG. 5A. First, the terpyridine hydroxide was synthesized according to the previous report1. This was obtained through classical Kröhnke and Claisen-Schmidt condensation2, 3. The synthesis of terpyridine functionalized methyl ammonium chloride hydroxide was obtained by an N-methyl coupling reaction, where the aromatic tertiary nitrogen atom is quaternized by an aliphatic methyl chloride substituent. The lignin-antimicrobial coupling epoxy group was synthesized by a simple C—O— bond formation reaction of a phenol group of terpyridine and epichlorohydrin in the presence of NaOH. The methylation of terpyridine was confirmed by 1H NMR (FIG. 5B) analysis as indicated by the chemical shift peaks at δ=8.67 ppm (d, 4H, aromatic), 8.01 ppm (d, 4H, aromatic), 7.77 ppm (s, 4H, aromatic), 6.7 ppm (m, 2H, aromatic), and 4.35 ppm (m, 2H, —CH2). 1H NMR in FIG. 5C shows the chemical shift peaks of δ=8.7 ppm (d, 4H, aromatic), 8.01 ppm (d, 4H, aromatic), 7.77 ppm (s, 4H, aromatic), 6.7 ppm (m, 2H, aromatic), 4.35 ppm (m, 2H, —CH2), 3.6 ppm (m, 2H, —CH), and 2.1 ppm (m, 9H, —CH3), confirming the synthesis of 2,2':6',2"-(terpyridine-1-methyl ammonium chloride-1-yloxy) methyl epoxide (TMAC).
Figure 6:
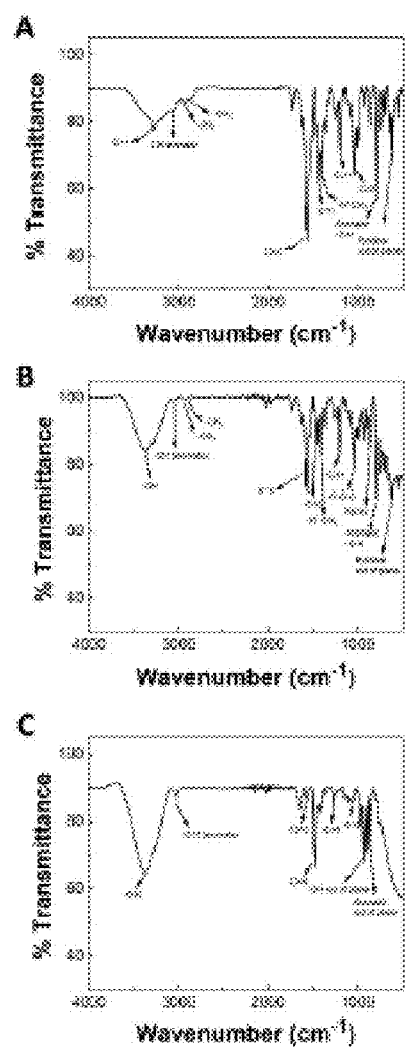
FIG. 6. FTIR of 2,2': 6',2"-terpyridine-1-methyl ammonium chloride-1-ol (A), 2,2': 6',2"-(terpyridine-1-methyl ammonium chloride-1-yloxy) methyl epoxide (B), 2,2': 6',2"-terpyridine hydroxide (C). The FTIR spectrum (FIG. 6A) of the 2,2':6',2"-terpyridine-1-methyl ammonium chloride-1-ol includes the peaks at 3278 cm−1 (—OH asymmetric stretching), 3059 cm−1 (aromatic —CH asymmetric stretching), 2945 cm−1 (aliphatic —CH3 asymmetric stretching), 2874 cm−1 (aliphatic —CH2 asymmetric stretching), 1574 cm−1 (aromatic —C═C symmetric stretching), 1441 cm−1 (—C—N symmetric stretching), 1404 cm−1 (—N+—CH3 symmetric stretching), 1215 cm−1 (—C—H symmetric stretching), 1037 cm−1 (—C—O symmetric stretching), 799 cm−1 (aromatic —C—H out of plane stretching), and 612 cm−1 (pyridine aromatic out of plane deformation vibration). The FTIR spectrum (FIG. 6B) of the 2,2':6',2"-(terpyridine-1-methyl ammonium chloride-1-yloxy) methyl epoxide shows the corresponding peaks at 3357 cm−1 (—OH asymmetric stretching), 3059-3011 cm−1 (aromatic —CH stretching), 2934 cm−1 (aliphatic —CH2 asymmetric stretching), 2872 cm−1 (aliphatic —CH3 asymmetric stretching), 1572 cm−1 (aromatic —C═C symmetric stretching), 1469 cm−1 (—C—N symmetric stretching), 1403 cm−1 (—N+-CH3 symmetric stretching), 1203 cm−1 (—C—H symmetric stretching), 1033 cm−1 (—C—O symmetric stretching), 862 cm−1 (epoxy ring stretching), 791 cm−1 (aromatic —C—H out of plane stretching), and 615 cm−1 (pyridine aromatic out of plane deformation vibration). The FTIR spectrum (FIG. 6C) of the starting material, 2,2':6',2"-terpyridine hydroxide, shows the corresponding peaks at 3371 cm−1 (—OH asymmetric stretching), 3020 cm−1 (aromatic —CH stretching), 1554 cm−1 (aromatic —C═C symmetric stretching), 1469 cm−1 (—C—N symmetric stretching), 1266 cm−1 (—C—H symmetric stretching), 1037 cm−1 (—C—O symmetric stretching), 924 cm−1 (—O—H out of plane stretching), and 853 cm−1 (aromatic out of plane stretching). These results indicate successful synthesis of precursor materials for synthesizing TMAC.
Figure 7:
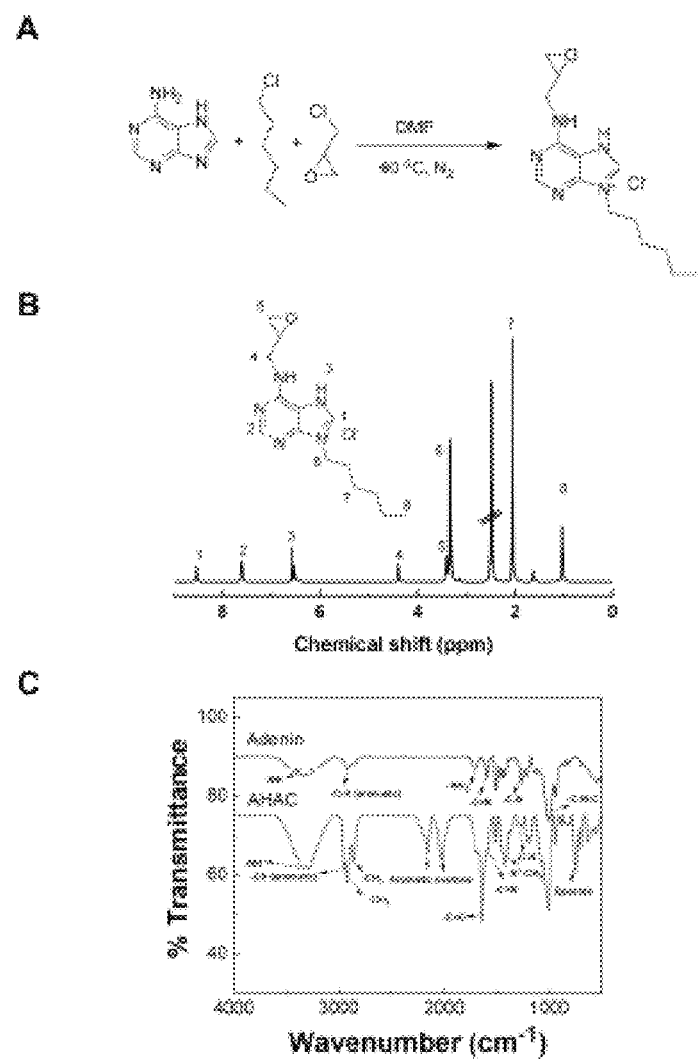
FIG. 7. Synthesis of N-9(Adenine N-hexyl ammonium chloride)N-6 methyl epoxide (AHAC). Synthesis scheme (A), 1H NMR (B) and FTIR (C) of AHAC. The antimicrobial AHAC was synthesized by the one-pot coupling of adenine, 1-chloro hexane, and epichlorohydrin. Despite many C—N based heterocyclic reactions reported, very few show one-pot synthesis of adenine based N-alkylation reported 4. The multiple aromatic nitrogen can induce a stable N-alkyl reaction (FIG. 7B) as evident by the 1H NMR peaks at 8.53 (s, 1H, Aromatic), 7.6 (s, 1H, Aromatic), 6.57 (s, 1H, Aromatic), 4.46 (s, 1H, NH—$CH_2$), 3.42 (—$N^+$-$CH_2$—), 2.0 (—$CH_2$—, Aliphatic), 1.73 (—O—$CH_2$), 1.03 (—$CH_2$—CH2-) of AHAC in d6 DMSO. Similarly, FTIR spectrum (FIG. 7C) of the AHAC indicates the successful synthesis of AHAC as evidenced by the observation of the peaks at 1635 cm−1 (aromatic —C═C symmetric stretching), 1592 cm−1 (—C═N symmetric stretching), 1418 cm−1 (—$N^+$-CH2 symmetric stretching), 1254 cm−1 (aromatic —C—N symmetric stretching), and 1210 cm−1 (epoxy bending).
Figure 8:
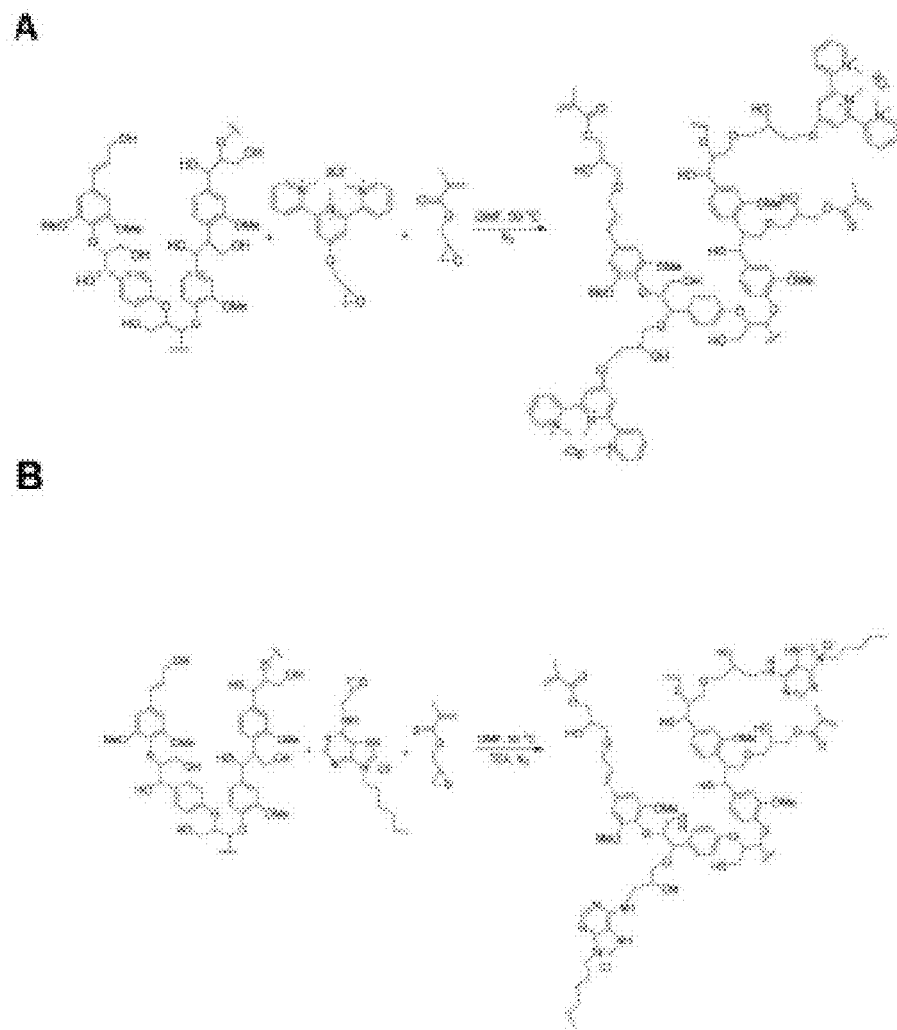
FIG. 8. Schematic of LTMAC (A) and LAHAC (B) synthesis.

While quaternary ammonium compounds (QAC) are widely used antimicrobial materials,[9] their application to the mask had significant limitations due to i) toxicity and performance degradation as a result of non-bonded, weak attachment on filter surface,[10,11] ii) complex, inefficient, and unscalable surface modification using plasma treatment,[12] and iii) low monomeric stability of the polymeric antibacterial material with pendant QAC.[13] To address these challenges, we developed antimicrobial substances that can be dip- or spray-coated on the surface of face mask fabrics and crosslinked to form permanent, antimicrobial coatings (FIG. 1A). The core of our approach is based on the chemical modification of the biocompatible lignin molecules with abundant hydroxyl and carboxyl groups, enabling various conjugation strategies such as the formation of photo-polymerizable coating and the functionalization with antimicrobial substances. To this end, two types of antimicrobial substances (i.e., terpyridine methyl ammonium chloride (TMAC: Supporting Information FIGS. 5 and 6) and adenine hexyl ammonium chloride (AHAC: FIG. 7)) were synthesized, followed by conjugation with lignin. For this purpose, highly effective epoxide chemistry was used to produce lignin 2,2',4' terpyridine methyl ammonium chloride (LTMAC) and lignin adenine hexyl ammonium chloride (LAHAC), respectively (see FIG. 8A for LTMAC and FIG. 8B for LAHAC). The successful synthesis of LTMAC (FIG. 1B(i)) and LAHAC (FIG. 1B(ii)) was confirmed by $^1$H NMR.

Figure 9:
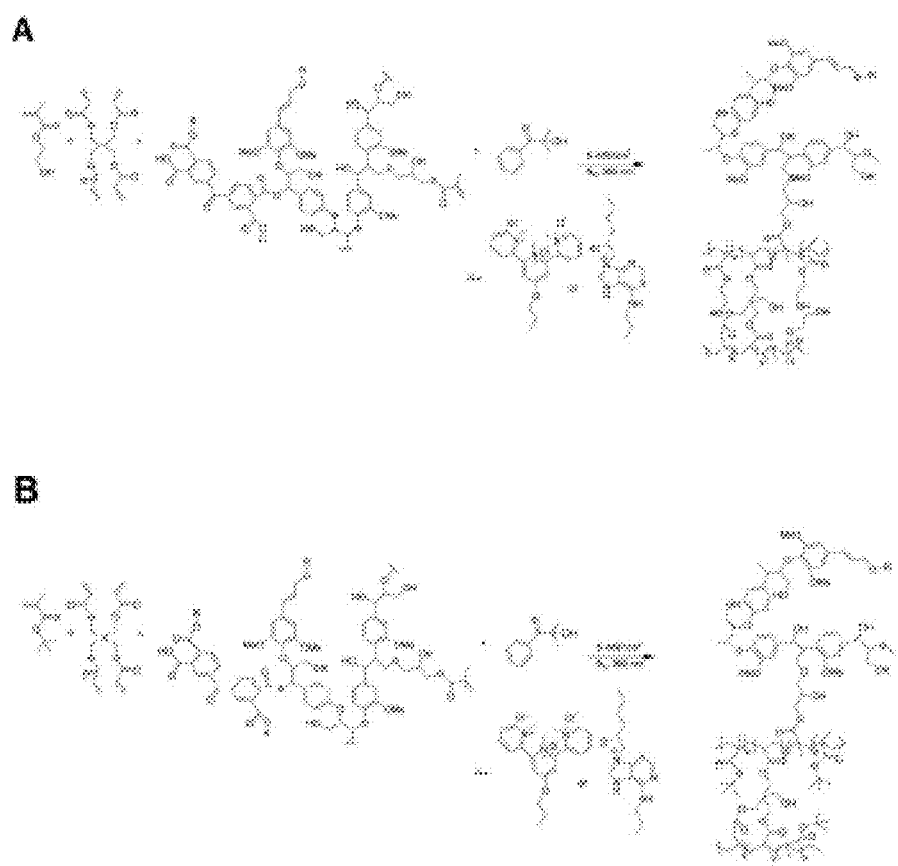
FIG. 9. Synthesis scheme of hydrophilic (A) and hydrophobic (B) LTMAC/LAHAC-polymer coating via UV-induced crosslinking polymerization. UV-induced polymer coating is a faster way to fabricate hydrophilic (HYP) or hydrophobic (HYD) antimicrobial polymer coating on PP fabrics. The polymerization solution contains 95% 2-hydroxyethyl methacrylate (HEMA) (for hydrophilic coating) or tert-butyl methacrylate (for hydrophobic coating), 4.9% of penaerythritol tatraacrylate (crosslinker), 750 mg of LTMAC or LAHAC, and 0.1% hydroxy-2-methylpropiophenone (UV initiator) in DMF solvent.

The high level of quaternary ammonium group substitution in LTMAC and/or hydrophobic alkyl group (C6) with multiple amine groups in LAHAC was used to achieve easy-to-apply, UV-induced antimicrobial face mask coatings. In particular, hydrophilic (HPL) and hydrophobic (HYD) characteristics of the antimicrobial coating were modulated by adding 2-hydroxy ethyl methacrylate and tert-butyl methacrylate to pentaerythritol tetraacrylate (crosslinker), respectively, for the photopolymerization reaction (~1 min) (FIG. 9). The formation of UV crosslinked antimicrobial coatings was confirmed by FTIR analysis (FIG. 1C). The observation of FTIR peaks at 2864 cms$^{-1}$ (—CH$_2$ asymmetric stretching), 2843 cm$^{-1}$ (—CH$_3$ asymmetric stretching), 1710 cm$^{-1}$ (C=O symmetric stretching), 1516 cm$^{-1}$ (—C=C symmetric stretching), 1418 cm$^{-1}$ (—N$^+$—CH$_2$ symmetric stretching), 1374 cm$^{-1}$ (—N$^+$—CH$_3$ symmetric stretching), 1271 cm$^{-1}$ (aromatic C—O—CH$_2$ symmetric stretching), and 1030 cm$^{-1}$ (=C—N symmetric stretching) indicates the formation of LTMAC and LAHAC. Additionally, the disappearance of C=C symmetric stretching peaks at 1516 cm$^{-1}$ and the increased intensity of the methacrylate C=O bond at 1710 cm$^{-1}$ indicate the successful formation of HYD and HPL coatings, respectively. This analysis indicates that the various coating formulations can be tuned by selecting the type and relative amount of polymer (i.e., HPL, HYD) and antimicrobial components (i.e., LTMAC, LAHAC, or mixture), and easily applied on any type of face mask for the fast fabrication of dry polymer coatings.

Figure 2:
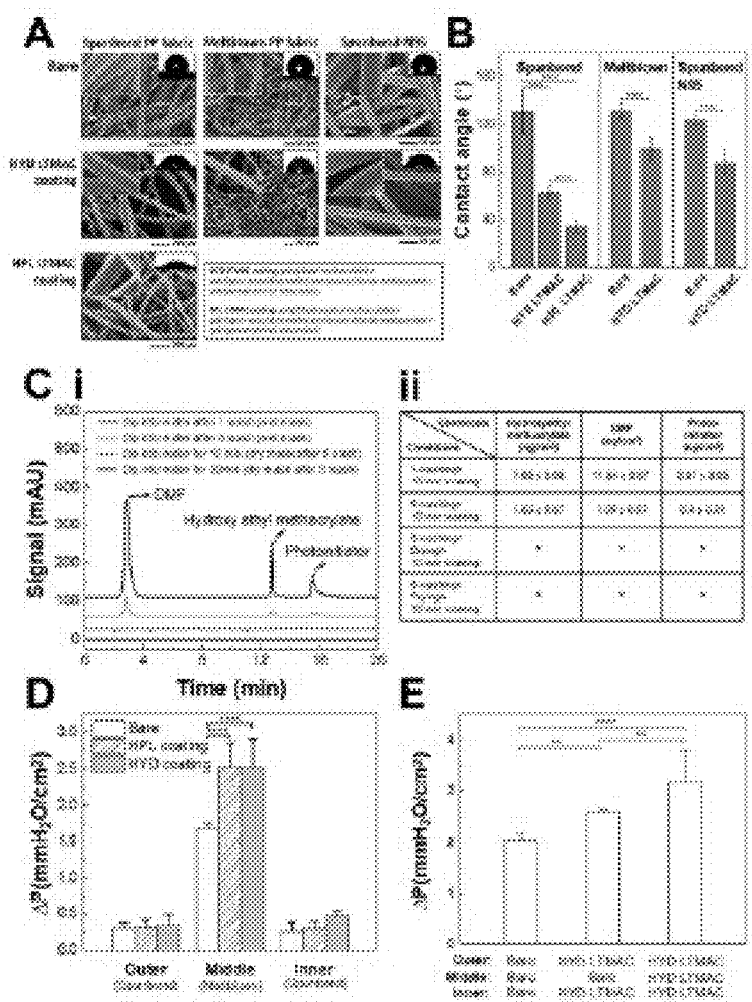
FIG. 2. Characterization of antimicrobial face mask fabrics. (A) SEM images of spunbond, meltblown, and spunbond N95 fabrics with insets (top left: zoomed-in image to show the morphology of the PP fibers, with (w/) and without (w/o) antimicrobial coatings (LTMAC), and top right: optical microscope images for contact angle measurement). (B) Water contact angle of PP fabrics (spunbond, meltblown, and spunbond-N95) with different antimicrobial coatings (one way ANOVA, n=9, mean±SD) and (C) HPLC analysis (i: spectra, ii: peak analysis) to measure the chemicals released from the HPL antimicrobial PP fibers (sample size: 2.4 cm$^2$; n=3, mean±SD). *: below detection limit (0.2 ng/cm$^2$). (D) pressure drop across individual mask layer, i.e. spunbond fabrics (used for outer and inner layers), and meltblown fabrics (used for middle layer), w/ and w/o hydrophilic (HPL)/hydrophobic (HYD) antimicrobial coatings (one-way ANOVA, n=7-10, mean±SD), and (E) pressure drop of the 3-ply masks with antimicrobial coatings (one-way ANOVA, n=10-11, mean±SD).
Figure 10:
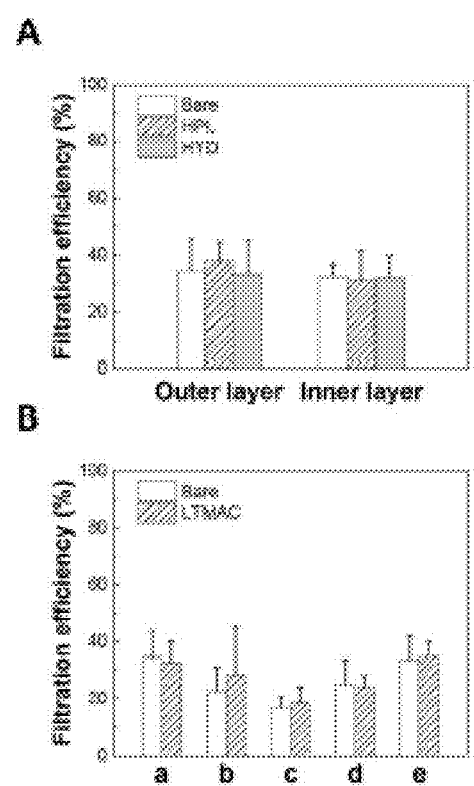
FIG. 10. Filtration efficiency of spunbond PP fabrics (inner and outer layers of Tian brand surgical mask) with HPL and HYD antimicrobial polymer coatings (A) (one-way ANOVA, n=7-12, mean±SD). Filtration efficiency of inner layer of surgical mask (a, Fischer brand), cotton masks (b: DSCover, c: TSI), and spunbond outer layer of N95 respirators (d: Honeywell-Sperian, e: 3M-8210) (student's t-test, n=5, mean±SD).

FIG. 2A shows scanning electron microscope (SEM) images of the polypropylene (PP) fabrics used in SM and N95 w/ and w/o (HYD and HPL) antimicrobial coatings; left: spunbond PP fabric of SM (spunbond, used as outer and inner layers), middle: meltblown PP fabric of SM (meltblown, used as a middle layer), and right: spunbond PP fabric of N95 respirators (spunbond-N95, used as an outer layer). Compared with the bare, PP fibers with antimicrobial coatings showed a higher surface roughness. The contact angle for 5 µL of water was observed to be 62.2±6.10 on the spunbond HYD LTMAC, 98.8±9.4° on the meltblown HYD LTMAC, and 87.8±9.0° on the spunbond HYD LTMAC-N95. As expected, a significantly lower contact angle (34±4.3°) was observed on HPL LTMAC compared to HYD LTMAC (P<0.0001; FIG. 2B). This means that surface properties of the individual layer of face masks can be tailored to exhibit application-specific performance by modulating coating formulation. Additionally, the release of any antimicrobial polymer coating components (i.e., monomer, photoinitiator, and solvent) was not detected from HPLC analysis for the HPL antimicrobial PP fiber, which eliminated safety concern (FIG. 2C). The type of antimicrobial coating (i.e., HPL or HYD) did not have a notable effect on the filtration efficiency and pressure drop of spunbond fabrics of SM (see FIG. 10A for filtration efficiency and FIG. 2D for pressure drop of the inner and outer layers). As shown in FIG. 10B, HYD LTMAC coating did not significantly influence the filtration efficiency of 1-ply cotton masks, spunbond fabric of SM, and spunbond fabric of N95 respirators under testing conditions for this study. On other hand, a meltblown fabric with antimicrobial coatings displayed an increase in pressure drop compared to bare fabrics (bare: 1.7±0.1, HPL: 2.5±0.3, and HYD: 2.5±0.4 mmH$_2$O/ cm$^2$; P<0.0001). The smaller pores of the meltblown filter would exert a higher capillary force, causing it to absorb more coating solution. This accounts for a substantial increase in pressure drop compared to spunbond fabrics with large pores. It is well known that the meltblown filter of N95 respirators is electrostatically charged ($10^{-5}$-$10^{-4}$ C/m$^2$) to increase filtration efficiency for nanosized particles (increase by 7-15% due to dipole charge).[14] However, the electrostatic charge on the filter decreases due to contamination or physical/chemical damage of fibers.[15] Thus, the formation of a permanent cationic coating would produce persistent surface charge and enhance the adsorption of the pathogens on the fibers through an electrostatic mechanism.[16]

After evaluation of a single layer, the effects of antimicrobial coating on the pressure drop were tested using 3-layered face masks (outer: spunbond, middle: meltblown, and inner: spunbond) under two functionalization scenarios: i) HYD LTMAC-coated spunbond fabrics for only outer and inner layers, ii) HYD LTMAC-coated spunbond fabrics for both outer and inner layers and HYD LTMAC-coated meltblown fabric for a middle layer. As shown in FIG. 2E, while the antimicrobial coating exhibited an increase in pressure drop compared to the 3-layered bare SM (2.0±0.1 mmH$_2$O/cm$^2$), it still satisfied the pressure drop evaluation criteria, MIL-M-36945C standard recommended by FDA (<5 mmH$_2$O/cm$^2$)[17]: 2.5±0.1 mmH$_2$O/cm$^2$ (P<0.005) for antimicrobial coatings on outer and inner layers, and 3.1±0.6 mmH$_2$O/cm$^2$ (one-way ANOVA, P<0.0001) for antimicrobial coating on all the three layers. It is believed that application of a stronger vacuum can reduce the pressure drop increase by reducing the amount of coating solution absorption.

Figure 11:
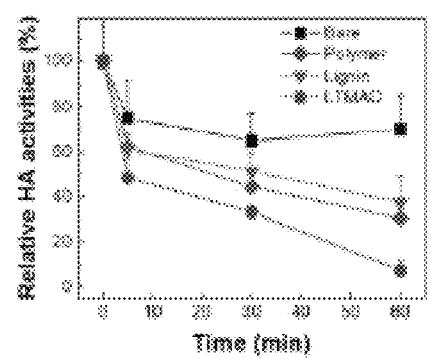
FIG. 11. Time-dependent inactivation of influenza virus on antimicrobial spunbond fabrics. Remaining HA activities of PR8 droplets (A: HPL PP fabric, B: HYD PP fabric) (n=6-8, mean±SD). HA activity data in (A) and (B) indicates that PR8 virus in droplets showed time-dependent inactivation on the HPL and HYD LTMAC-coated spunbond fabrics (GML, P<0.0001). The antimicrobial effect is mainly induced by antimicrobial moieties coupled to lignin. Bare, HPL LTMAC, and HYD LTMAC HA activity data shown in FIG. 3A are included in the plots for comparison with other materials. (Polymer: crosslinked polymer coating only and lignin: lignin-functionalized polymer coating without antimicrobial moieties).
Figure 11:
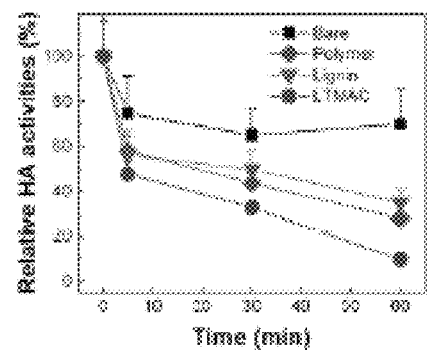
Figure 12:
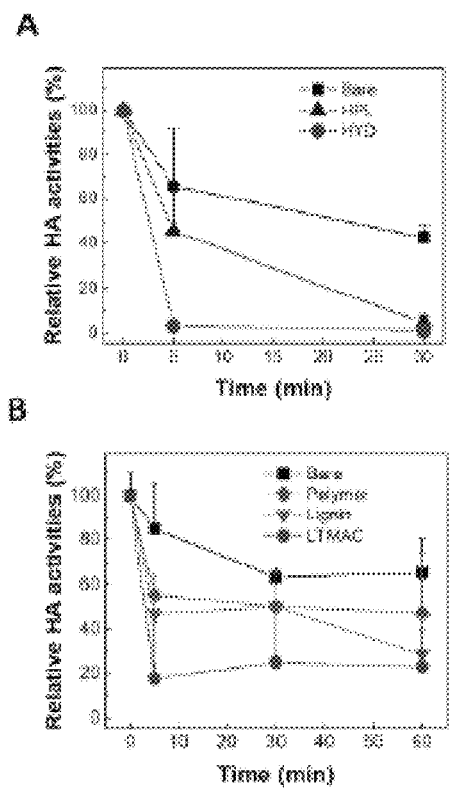
FIG. 12. Time-dependent inactivation of influenza virus on antimicrobial meltblown fabrics. Remaining HA activities of virus-carrying aerosols (A) and droplets (B, HYD PP fabric) (n=5-12, mean±SD).

Antiviral activity of the antimicrobial coatings (HPL and HYD-LTMAC) was tested by measuring the remaining hemagglutinin activity, as well as the expression levels of hemagglutinin (HA) and nucleoprotein (NP) genes of the A/PR/8/34 H1N1 (PR8) influenza virus through the hemagglutination assay and RT-qPCR analysis, respectively. As can be seen in FIGS. 3A, 11, and 12, PR8 showed a rapid decrease in the remaining HA activity for both aerosols (diameter: 2.5-4 μm) and droplets (volume: 5 μL), independent of the antimicrobial coating type (HPL and HYD) and the type of fabric (spunbond: FIG. 11, and meltblown: FIG. 12), over the increase in incubation time (General Linear Model (GLM), P<0.0001). The remaining HA activity of the aerosolized PR8 virus showed a more rapid decrease on the HPL and HYD LTMAC-spunbond fabrics compared to virus-laden droplets. Since virucidal effect of LTMAC and LAHAC is triggered by direct contact of the virus with the coated surface, a rapid inactivation of the aerosolized virus might be associated with a higher chance of being exposed to the antimicrobial moieties on the fiber surface, as well as a shorter drying time. Moreover, the most rapid virus inactivation was observed from an aerosolized virus exposed to HYD antimicrobial coating, as measured by the 1.8±2.0% remaining HA activity within 5 min.

Antiviral effects of HYD LTMAC and HYD LAHAC coatings on the type of PP fabrics were further tested by exposing a 5 μL droplet of PR8 virus to spunbond, meltblown, and spunbond-N95. As shown in FIGS. 3B and C, LTMAC and LAHAC displayed a rapid reduction in the levels of HA and NP gene expression within 5 min, and about 3-5 log reduction from all types of face mask fabrics currently used to fabricate face masks within 30 min (HA, P<0.0001 and NP, P<0.0001). This rapid, significant viability loss of the PR8 influenza virus proves the effectiveness of our antimicrobial coating formulations. To evaluate durability, antiviral performance of HYD LTMAC/LAHAC-spunbond fabrics was investigated after incubation in a harsh environment (at 37° C. and 50/97% RH) for 7 days. As shown in FIG. 3D, LTMAC coating retained a similar level of pathogen inactivation, even after storage in high temperature and humidity conditions (compare FIG. 3B (spunbond) with FIG. 3D (LTMAC)). However, LAHAC-coated spunbond PP fabrics exhibited about a 2.8 log and 1.8 log reduction in gene expression from 50 and 97% RH, respectively (compare FIG. 3C (spunbond) with FIG. 3D (LAHAC)). That is, incubation in a hot and humid environment for 7 days caused a slight decrease in the viral inactivation capacity of the coating. This might be associated with the humidity-dependent conformational or charge density change in the LAHAC-coated fabric. Transmission electron microscopy (TEM) analysis showed that the influenza virus on antiviral coatings formed on the surface of the spunbond PP was severely damaged (FIG. 3E). This observation was consistent with our HA activity and RT-qPCR analysis.

Figure 4:
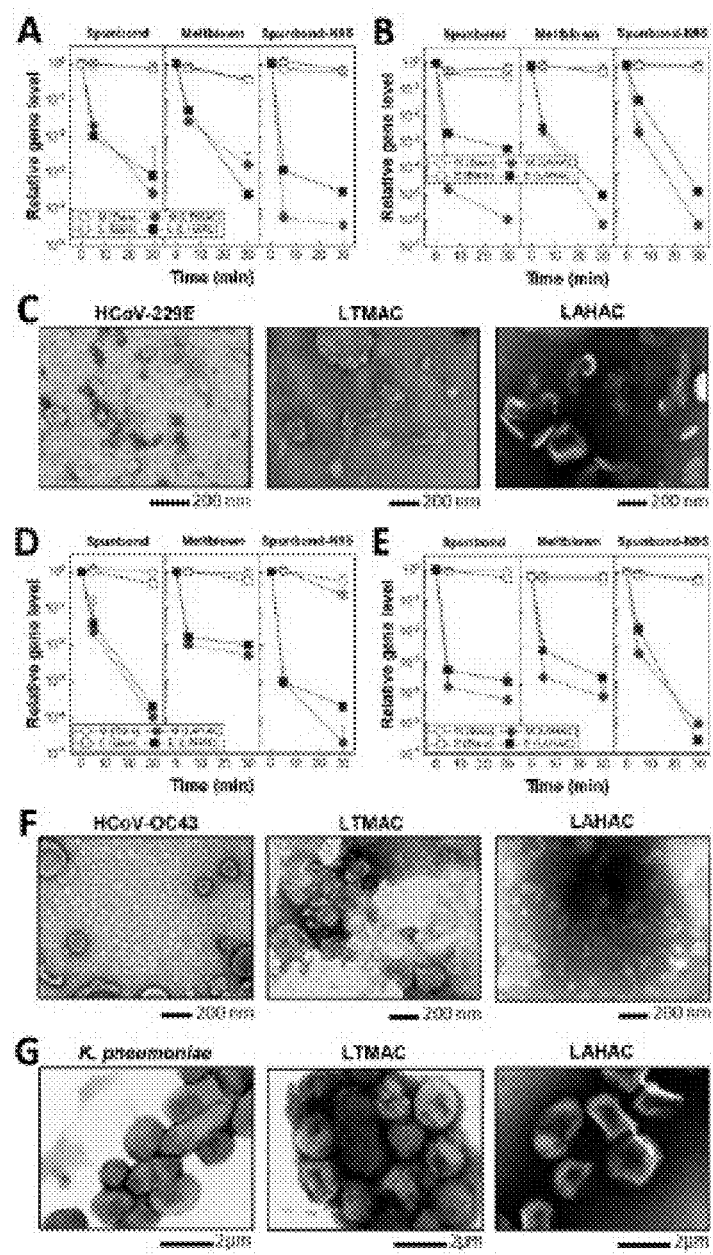
FIG. 4. Antiviral and antibacterial performance of the LTMAC, LAHAC-coated face mask fabrics against human coronavirus 229E (HCoV-229E), HCoV-OC43, and *K. pneumonia*. Gene expression level change of HCoV-229E on a lignin-based, antimicrobial (A: LTMAC, B: LAHAC) polymer-coated spunbond (outer layer of SM), meltblown (middle layer of SM), and spunbond-N95 (outer layer of N95) PP fabrics (n=3, mean±SD). (C) TEM micrographs of the HCoV-229E (viral stock as a positive control (left), virus exposed to spunbond fabrics with HYD 19 LTMAC (middle), and HYD LAHAC (right)) coatings after 30 min of incubation. Gene expression level change of HCoV-OC43 on antimicrobial (D: LTMAC and E: LAHAC) polymer-coated spunbond, meltblown, and spunbond-N95 fabrics (n=3, mean±SD). (F) TEM micrographs of the HCoV-OC43 (viral stock as a positive control (left), and virus exposed to spunbond PP fabrics with HYD LTMAC (middle) and HYD LAHAC (right)) coatings, after 30 min of incubation. (G) TEM micrographs of the *K. pneumoniae* (bacterial stock as a positive control (left), and virus exposed to spunbond PP fabrics with HYD LTMAC (middle) and HYD LAHAC (right) coatings, after 30 min of incubation).

To test pathogen non-specific, antiviral performance, two types of human coronavirus (alpha coronavirus: HCoV-229E and beta coronavirus: HCoV-OC43) were exposed to the HYD LTMAC and HYD LAHAC-coated PP face mask fabrics. FIGS. 4A and B show the expression level of M and E genes, analyzed using HCoV-229E from the fabric samples. Similar to PR8, both types of antimicrobial coatings displayed a rapid inactivation within 5 min and around a 3-6 log reduction within 30 min. As shown in the TEM images of FIG. 4C, HCoV-229E virus was found to have lost its structural integrity on the HYD LTMAC and HYD LAHAC-coated face mask fabrics. Since the M and E membrane proteins play a key role in virus assembly, TEM data supports a substantially lower level of gene expressions. Similarly, antimicrobial coatings showed a highly effective inactivation performance against HCoV-OC43, as analyzed by RT-qPCR analysis (FIGS. 4D and E). As shown in FIG. 4F, it is clear that LTMAC and LAHAC destroy HCoV-OC43 by comparing their morphology with virus suspension as a control. After confirming antiviral activity of the individual component, the effect of a mixture coating formulation was investigated by controlling the weight ratio between LTMAC and LAHAC as 50:50 and 10:90 (see FIG. 13 for FTIR analysis). As shown in FIGS. 14A-C, a mixed formulation showed around a 1-4 log reduction in influenza (FIG. 14A), HCoV-229E (FIG. 14B), and HCoV-OC43 (FIG. 14C). In contrast to a single component formulation, a lower level of time-dependent, viral inactivation was monitored, which might be attributed to a hindrance effect between two antimicrobial moieties during conjugation to lignin. Notably, HCoV-OC43 belongs to the same betacoronavirus family as SARS-CoV-2 and has a similar genome sequence to SARS-CoV-2.[18] Considering that developing a type, strain-nonspecific antiviral is a critical technical challenge in preventing the spread of respiratory diseases, high-performing antiviral activities of LTMAC and LAHAC, as demonstrated against PR8 influenza virus, HCoV-229E, and HCoV-OC43, can easily be applied to regular face mask/respirator fabrics to develop universal virus inactivating face masks.

Finally, the antibacterial activities of the HYD LTMAC and LAHAC-coated face mask fabrics were investigated against K. pneumoniae droplets and K. pneumoniae aerosols in DI water and artificial saliva (see FIGS. 15A-C for spunbond, FIGS. 15D,E for meltblown, FIG. 15F for spunbond-N95; see FIGS. 15A,B,D,F for DI water, and FIGS. 15C,E for artificial saliva). As shown in FIGS. 15 A and B, HPL LTMAC-spunbond (FIG. 15A) and HYD LTMAC-spunbond (FIG. 15B) showed a significant decrease of bacterial viability in both droplets and aerosols in DI, as indicated by a decrease of colony forming unit (CFU) values. It is noted that the crosslinked polymer or lignin molecule itself did not have a large effect on inactivating *K. pneumoniae*. That is, the antimicrobial performance of our antimicrobial coatings is mainly due to antimicrobial moieties. Also, as evidenced by the observation of a similar level of bacterial inactivation in artificial saliva (FIG. 15C), face mask fabrics with antimicrobial coating maintained their inactivation capacity, regardless of the composition of the pathogen transmission medium. Similarly, meltblown fabrics (FIGS. 15D,E) and spunbond-N95 (FIG. 15F) showed excellent antibacterial activities, independent of transmission modes (droplets and aerosols), medium composition (DI and artificial saliva), and wetting properties (HPL and HYD). In addition, HYD LAHAC-coated spunbond, meltblown, and spunbond-N95 consistently showed a time-dependent bacterial inactivation, similar to LTMAC (FIGS. 15G,H). The TEM analysis in FIG. 4G further confirms that the bacterial inactivation led to physical disruption and morphological change of the bacteria.

Face masks are the most immediate method to prevent the entry and spread of respiratory diseases. In spite of their importance, there have been no antimicrobial face masks with reliable and proven performance. Antimicrobial technology for application to face masks during the COVID-19 pandemic should exhibit universal, antimicrobial activities against a broad-spectrum of virus/bacteria in a type/strain-nonspecific manner. It should also be easy-to-implement while being compatible with existing manufacturing processes. To meet the multiple demands of COVID-19, we have developed a lignin-based, photo-polymerizable, and antimicrobial coating (LTMAC and LAHAC), and demonstrated its antiviral and antibacterial performance against viruses and bacteria (i.e., PR8H1N1 influenza virus, HCoV-229E, HCoV-OC43, and *K. pneumonia*) using LTMAC/LAHAC-coated face mask fabrics. A comparison with previous reports confirms rapid and efficient pathogen inactivation characteristics of the antimicrobial coatings, without posing a significant impact on the overall filtration efficiency (Table 1). This will eliminate concerns over contact transmission by SARS-CoV-2, virus mutation, coinfection during flu season, and bacterial contamination due to long-term use and reuse. The dipping or spray-coating of face mask fabrics into an antimicrobial coating formulation, followed by UV crosslinking for a minute can make a permanent antimicrobial coating on the surface of PP fibers. Flexibility in coating formulation allows for the development of application-specific, hydrophilic/hydrophobic filters for multifunctional face masks. We believe that universal, antimicrobial technology will contribute to the general strategy to prevent the transmission of SARS-CoV-2.

REFERENCES

1. Tellier, R.; Li, Y.; Cowling, B. J.; Tang, J. W., Recognition of aerosol transmission of infectious agents: a commentary. BMC Infect. Dis. 2019, 19, 101.
2. World Health Organization Mask use in the context of COVID-19: interim guidance, 1 Dec. 2020; World Health Organization: Geneva, 2020, 2020.
3. Chua, M. H.; Cheng, W.; Goh, S. S.; Kong, J.; Li, B.; Lim, J. Y. C.; Mao, L.; Wang, S.; Xue, K.; Yang, L.; Ye, E.; Zhang, K.; Cheong, W. C. D.; Tan, B. H.; Li, Z.; Tan, B. H.; Loh, X. J., Face masks in the new COVID-19 normal: materials, testing, and perspectives. Research 2020, 2020, 7286735.
4. Chughtai, A. A.; Stelzer-Braid, S.; Rawlinson, W.; Pontivivo, G.; Wang, Q.; Pan, Y.; Zhang, D.; Zhang, Y.; Li, L.; MacIntyre, C. R., Contamination by respiratory viruses on outer surface of medical masks used by hospital healthcare workers. BMC Infect. Dis. 2019, 19, 1-8.
5. Zhou, J.; Hu, Z.; Zabihi, F.; Chen, Z.; Zhu, M., Progress and perspective of antiviral protective material. Adv. Fiber Mater. 2020, 2, 123-139.
6. Quan, F. S.; Rubino, I.; Lee, S. H.; Koch, B.; Choi, H. J., Universal and reusable virus deactivation system for respiratory protection. Sci. Rep. 2017, 7, 39956.
7. Rubino, I.; Choi, H. J., Respiratory protection against pandemic and epidemic diseases. Trends Biotechnol. 2017, 35, 907-910.
8. Brosseau, L. M.; McCullough, N. V.; Vesley, D., Bacterial survival on respirator filters and surgical masks. Appl. Biosaf. 1997, 2, 32-43.
9. Jennings, M. C.; Minbiole, K. P.; Wuest, W. M., Quaternary ammonium compounds: an antimicrobial mainstay and platform for innovation to address bacterial resistance. ACS Infect. Dis. 2015, 1, 288-303.
10. Marti, M.; Tunon-Molina, A.; Aachmann, F. L.; Muramoto, Y.; Noda, T.; Takayama, K.; Serrano-Aroca, A., Protective Face Mask Filter Capable of Inactivating SARS-CoV-2, and Methicillin-Resistant *Staphylococcus aureus* and *Staphylococcus epidermidis*. Polymers 2021, 13, 207.
11. DeLeo, P. C.; Huynh, C.; Pattanayek, M.; Schmid, K. C.; Pechacek, N., Assessment of ecological hazards and environmental fate of disinfectant quaternary ammonium compounds. Ecotoxicol. Environ. Saf. 2020, 206, 111116.
12. Wang, T.; Kang, E.; Neoh, K.; Tan, K.; Liaw, D., Surface modification of low-density polyethylene films by UV-induced graft copolymerization and its relevance to photolamination. Langmuir 1998, 14, 921-927.
13. Parent, J. S.; Penciu, A.; Guillén-Castellanos, S. A.; Liskova, A.; Whitney, R. A., Synthesis and characterization of isobutylene-based ammonium and phosphonium bromide ionomers. Macromolecules 2004, 37, 7477-7483.
14. Yim, W.; Cheng, D.; Patel, S. H.; Kou, R.; Meng, Y. S.; Jokerst, J. V., KN95 and N95 respirators retain filtration ffficiency despite a loss of dipole charge during decontamination. ACS Appl. Mater. Interfaces 2020, 12, 54473-54480.
15. Viscusi, D. J.; Bergman, M.; Sinkule, E.; Shaffer, R. E., Evaluation of the filtration performance of 21 N95 filtering face piece respirators after prolonged storage. Am. J. Infect. Control. 2009, 37, 381-386.
16. Kang, P. K.; Shah, D. O., Filtration of nanoparticles with dimethyldioctadecylammonium bromide treated microporous polypropylene filters. Langmuir 1997, 13, 1820-1826.
17. Food Drug Administration, Guidance for industry and FDA staff: surgical masks—premarket notification [510 (k)] submissions. 2003.
18. Vijgen, L.; Keyaerts, E.; Moes, E.; Thoelen, I.; Wollants, E.; Lemey, P.; Vandamme, A. M.; Van Ranst, M., Complete genomic sequence of human coronavirus OC43: molecular clock analysis suggests a relatively recent zoonotic coronavirus transmission event. J. Virol. 2005, 79, 1595-1604.

Supporting Information
Methods

1. Materials and Coating Method

All reactions were conducted in a nitrogen environment. Reagents, 2-hydroxyethyl
methacrylate, inhibitor removal resin, pentaerythritol tetraacrylate, hydroxy-2-methylpropiophenone, tert-butyl methacrylate dimethyl formamide, glycidyl methacrylate, inhibitor remover, sodium hydride (NaH), anhydrous tetrahydrofuran (THF), methyl chloride, 1-chloro hexane, ammonium acetate, sodium hydroxide (NaOH), adenine, softwood Kraft lignin powder, and ethyl-picolinate, purchased from Sigma Aldrich Canada (Oakville, ON, Canada), were used as received, unless otherwise stated. Surgical masks (Tians-40578-RS5, Fisher scientific-12888001A), N95 respirators (Honeywell-Sperian and 3M-8210), acetone, diethyl ether, ethanol, magnesium sulfate, and Whatman qualitative filter paper (No. 4) were purchased from Fisher Scientific (Pittsburgh, PA, USA). 100% Cotton masks (DSCover and TSI) were purchased from Amazon Inc (Toronto, ON, Canada). Surgical masks (Tian) and N95 respirators (3M), not otherwise specified, were used for experiments.

Monomers such as 2-hydroxyethyl methacrylate, tert-butyl methacrylate, and crosslinker penaerythritol tatraacrylate were passed through inhibitor removal resin, prior to use. Solvent concentration in vacuo was performed using a rotary evaporator with a water bath at 40° C., followed by further concentration using a high-vacuum pump. UV cross-linking was performed using RealUV-LED (Waveform Lighting; Vancouver, WA, USA). Spunbond PP fabrics (~22 g/m$^2$), meltblown PP filters (~20 g/m$^2$), and spunbond PP fabrics (~25 g/m$^2$) were obtained from the outer, middle, and inner layer of the three-ply surgical masks. Unless otherwise specified, spunbond and meltblown fabrics indicate the outer and middle layer of the surgical mask, respectively. Outer layer PP fabrics (spunbond, ~50 g/m$^2$) of N95 (hereafter abbreviated as spunbond-N95) were also used to evaluate the universal applicability of the antimicrobial coatings. PP fabrics cut into circular pieces (2.4-4 cm$^2$) were lightly soaked in antimicrobial coating formulations, and excess coating solution was removed by applying a vacuum (10 in. Hg) for 10 seconds on each side of the mask. Alternatively, samples could also be coated using a spray-coating system, which is a custom-made spray equipped with an atomizing nozzle (Spraying system co.; Wheaton, IL, USA) and operated with compressed nitrogen gas (operation at 40 psi). Coating formulation was spray-coated onto spunbond or meltblown mask fabrics at a height of 15 cm for 5 sec (spray solution flow rate: ~15 mL/s). The excessive coating solution was removed by applying a vacuum (10 in. Hg) for 10 seconds on each side of the mask. For this work, we mainly prepared samples via the dip-coating method. The spunbond and meltblown fabrics coated with antimicrobial polymers were cured for 1 minute using UV light with a power density of 6 mW/cm$^2$. The UV cured fabric was washed 3 times with 1 mL of ethanol, and then 5 times with 1 mL of water. Then, coated fabrics were dried at 37° C. for 12 hours to obtain HYD/HPL LTMAC/LAHAC.

2. Synthesis of the Antimicrobial Substance and Fabrication of the Face Mask Fabrics with Antimicrobial Coatings 6 g (0.120 mol) of chloromethane was added to a RT solution of 2,2':6',2"-terpyridine hydroxide (5 g, 0.02 mol) in 20 mL chloroform under a N2 atmosphere. This process was followed by stirring for 4 hours. Then the crude mixture was slowly poured into 300 mL of diethyl ether with continuous stirring to obtain a white precipitate. The precipitated product was filtered by grade 4 Whatman filter paper, then washed with another 200 mL of diethyl ether. The precipitate was further purified by a repeated precipitation (i.e., dissolving in chloroform and precipitating in diethyl ether, 3 times). The solvent was removed under high vacuum to obtain 7.5 g (yield: 95%) of white powder 1.

2.2. 2,2':6',2"-(terpyridine-1-methyl ammonium chloride-1-yloxy) methyl epoxide (2)

2 g (0.122 mol) of epichlorohydrin was added to a solution of 5 g (0.02 mol) of 2,2':6',2"-terpyridine-1-methyl ammonium chloride (1) in 20 mL of anhydrous chloroform. In a separate 25 mL round bottom flask, 0.01 mmol of sodium hydroxide in 5 mL of anhydrous ethanol was prepared. Then the solution was added to the first reaction mixture, stirred at 60° C. for 3 hours, and stirred again at RT for 4 hours. After the reaction, the solvent was removed using a rotary evaporator at 40° C. The resulting product was dissolved in 30 mL of chloroform, and extracted with 10 mL of DI water, 3 times. Anhydrous magnesium sulfate (MgSO$_4$) was added into the product dissolved in CHCl$_3$ until the solution became clear. After the solvent was removed using a rotary evaporator, the solid was dissolved in chloroform and slowly poured into 300 mL of diethyl ether, while stirring continuously to yield a yellowish precipitate. The precipitation product was filtered by Whatman filter paper (grade 4) and washed with another 200 mL of cold, 4° C. diethyl ether. The precipitate was filtered and dried under vacuum to obtain 5.28 g (yield: 92%) of product 2.

2.3. Synthesis of N-9(N-hexyl adenine ammonium chloride)N-6 methyl epoxide (3)

Under a nitrogen atmosphere, 5 g (0.037 mol) of adenine was dissolved in 25 mL of dry DMF in a 50 mL round bottom flask. This was followed by the addition of 2 g (0.022 mol) of epichlorohydrin and 2.4 g (0.022 mol) of 1-chloro hexane. The reaction flask was then immersed in a silicon oil bath at 60° C. and stirred for 14 hrs. After the reaction, the crude mixture was continuously stirred while being slowly poured into 400 mL of diethyl ether to yield a white precipitate. The precipitation product was filtered by Whatman filter paper (grade 4), then washed with 100 mL of cold diethyl ether. The precipitation procedure was repeated 3 times. The precipitate was further purified by stirring in 25 mL of diethyl ether for 30 minutes and filtering the mixture 3 times. The white precipitate was filtered and dried under vacuum to obtain 9.97 g (yield: 86%) of product 3.

2.4. Fabrication of Hydrophobic Antimicrobial Polymer Coatings: HYD LTMAC (4), HYD LAHAC (5), HPL (6), and HPL (7)

In a 5 mL Eppendorf tube, 2 mL of a polymerization solution containing 95 w/w % tert-butyl methacrylate (TBMA), 4.9 w/w % of penaerythritol tatraacrylate (crosslinker), and 0.1 w/w % hydroxy-2-methylpropiophenone (UV initiator) was mixed all together in 5 μL of dimethyl formamide (DMF) with 750 mg of LTMAC or LAHAC in 95 μL DMF, by vortexing for 2 min. The mixture of monomer, crosslinker, LTMAC, and photo-initiator was then purged with nitrogen (10 mL/min) for 3 minutes to remove any dissolved oxygen. In the case of HPL LTMAC and HPL LAHAC, 95% 2-hydroxyethyl methacrylate (HEMA) was used instead of TBMA. 20 μL of the curing solution composed of the monomer, cross-linker, LTMAC, and photo-initiator was then evenly spread on 2.5 or 4 cm² circular fabrics (spunbond and meltblown). The excess solution was removed by applying a vacuum (10 in. Hg) to each side of the mask fabric for 10 seconds. The LTMAC and LAHAC infused spunbond and meltblown fabrics were then placed on the irradiation chamber and irradiated with 360 nm LED UV light (power density 6 mW/cm²) for 30 sec on each side. The UV cured fabric was washed 3 times with 1 mL of ethanol, followed by 5 times with 1 mL of water. The coated fabric was dried at 37° C. for 12 hours to obtain 4-7.

2.5. Fabrication of HYD LTMAC/LAHAC (50:50) (8) and (10:90) (9)-Coated PP Fabrics In a 5 mL Eppendorf tube, 2 mL of polymerization solution containing 95% tert-butyl methacrylate (TBMA), 4.9% of penaerythritol tatraacrylate (crosslinker), and 0.1% Hydroxy-2-methylpropiophenone (UV initiator) in 5 μL of dimethyl formamide (DMF) was mixed with LTMAC and LAHAC (375 mg of LTMAC and LAHAC each for 50:50, and 75 mg of LTMAC and 675 mg of LAHAC for 10:90) in 95 μL DMF by vortex for 2 minutes. The monomer/antimicrobial coating solution was purged with nitrogen (10 mL/min) for 3 minutes to remove any dissolved oxygen. The UV crosslinked fabrics (8 and 9) were fabricated following the same procedure as described in 2.4.

3. Face Mask Fabric/Filter Characterization

FTIR analysis Attenuated total reflection Fourier transform infrared (ATR-FTIR) analysis was performed using a Bio-Rad FTS Varian 7000 spectrometer equipped with a ZnSe IRE detector. The mask samples (before and after antimicrobial coating on the surgical mask/N95 respirator) were cut into 1×1 cm² and placed on FTIR-ATR diamond crystal for analysis. The measurements were performed using p-polarized radiation, (ZnSe wire grid polarizers) incident at 75°. The spectra were obtained in the region of 4000-500 cm⁻1 (resolution: 16 cm⁻¹ and scanning number: 100-200 to increase the signal to noise ratio). The background spectra were recorded, prior to analysis.

NMR analysis ¹H NMR spectra were recorded using an Agilent Varian VNMRS 600 MHz spectrometer equipped with a Z-axis pulsed-field gradient triple resonance probe. Chemical shifts (δ) are reported in ppm, relative to the residual solvent signals (CDCl$_3$: 7.26 ppm and d$_6$-DMSO: 2.50 ppm). The NMR peaks were acquired for 32 scans with a relaxation delay of 5 sec.

SEM analysis The surface morphology of the face mask fabrics was analyzed in secondary electron mode using scanning electron microscopy (Hitachi S-3000N and Hitachi S4800; Hitachi, Toronto, Canada) at an acceleration voltage of 20 kV. The samples were cut into 1×1 cm² pieces and coated with an 8 nm thick gold layer using the Denton Desk II sputter coating system.

Contact angle measurement The mask fabrics' wetting properties were characterized by a contact angle measurement using the sessile drop technique[5]. The bare and antimicrobial filters were fixed onto a microscope glass slide (3"×1"×0.04") with tape, and a DI water droplet (5 μL) was applied to the surface of the filters using a syringe needle. The contact angles were measured by analyzing images collected with FTA-200 (First Ten Angstroms; Newark, CA, USA). At least 5 sample replicates were used for measurements.

High-performance liquid chromatography (HPLC) analysis The release of chemicals from HPL LTMAC-coated spunbond PP fabrics was characterized using the water extraction technique. Dimethylformamide (DMF; solvent), 2-hydroxyethyl methacrylate (monomer), and hydroxy-2-methylpropiophenone (photoinitiator) were tested for releasing from the antimicrobial coated mask. The fabric piece (2.4 cm²) was soaked into 1 mL of DI water for 10 and 30 min. Then, the chemicals released into water were analyzed using Agilent 1100 infinity HPLC (Santa Clara, CA, USA), coupled with a UV-detector, and the UV-absorption was measured between 200-350 nm. A Zorbax SB-C$_{18}$ (4.6×15 cm) column was used for analysis at 22° C. and the eluent consisted of acetonitrile (ACN) and methanol at a flow rate of 1 mL·min⁻¹. Each analysis was carried out three times in order to check repeatability, and three samples were taken for every equilibrated mixture at the given temperature. The average value was used in calculating the final data.

Filtration efficiency and pressure drop tests Filtration efficiency and pressure drop tests were conducted using the procedure reported in the previous study[6].

TEM analysis The structural stability of the virus and bacteria was investigated using TEM (JEOL JEM-2100; Peabody, MA, USA). The samples were prepared following the procedure described in ref 6.

4. Bacteria/Virus Preparation and Antimicrobial Performance Analysis 4.1. Pathogen Strains and Culture Conditions K. pneumoniae (ATCC BAA-1705; ATCC, Manassas, VA, USA) was grown overnight at 37° C. on Mueller Hinton Agar (MH agar; BD, Franklin Lakes, NJ, USA) from a single frozen stock. For the liquid culture of K. pneumoniae, a single colony of overnight culture on Mueller Hinton (MH) agar was inoculated into 3 mL of MH broth, incubated at 37° C., and shaken at 200 rpm overnight. The overnight culture broth was diluted 100 times in fresh MH broth and incubated until the early exponential phase.

Influenza virus, A/Puerto Rico/8/34 (PR8), was inoculated and grown in 10-day old embryonated hen eggs, and the virus was purified from the allantoic fluid, following the previous report[5]. Human coronavirus propagation was conducted following the previous report, with slight modifications[7]. Briefly, HCoV strains, 229E (ATCC® VR-740TM), and OC43 (ATCC® VR-1558TM) were purchased from ATCC and inoculated/cultured in MRC-5 human fetal lung fibroblast cells (ATCC® CCL-171TM). The MRC-5 cell was maintained in DMEM (Corning, NY, USA) that was supplemented with 10% FBS (Thermo Fisher Scientific; Waltham, MA, USA), 100 U/mL penicillin, and 100 μg/mL streptomycin of antibiotics (Thermo Fisher Scientific) at 33° C. with 5% $CO_2$ before infection. HCoV strains, HCoV-229E or HCoV-OC43, were infected (MOI 0.01) and propagated in passage 6-7 of MRC-5 cells (1.5×10⁷) in MEM medium (Thermo Fisher Scientific) supplemented with 2% FBS, 100 U/mL penicillin, 100 μg/mL streptomycin, and 1 μg/mL TPCK treated trypsin (Sigma-Aldrich) with 5% $CO_2$ for 5 days at 33° C. Then, the culture medium was centrifuged at 2,800×g for 10 min at 4° C. The supernatant was filtered through 0.22 μm and centrifuged using ultracentrifuge at 30,000 rpm, for 1 hour. The HCoV pellet was resuspended in DI water and stored at 4° C. for further experiments.

4.2. Bacterial/Viral Inactivation Test

Antibacterial tests were performed, following the previous study[6]. Briefly, the PP fabric (sample size: 4 cm$^2$) was located on the aerosol chamber, and the nebulizer unit was placed on top of the fabric piece. 20 μL of a highly concentrated pathogenic strain in DI water or artificial saliva (0.6 g/L Na$_2$HPO$_4$, 0.6 g/L CaCl$_2$), 0.4 g/L KCl, 0.4 g/L NaCl, 4 g/L mucin, 4 g/L Urea, and adjust pH 7.2 with NaOH)[8] was applied for aerosolization. The fabrics exposed to aerosols were incubated for each time point. After incubation, the bacteria on the face mask fabric was resuspended in 2 mL of 1×PBS (pH 7.4) and concentrated with centrifugation at 14,000 rpm for 15 min (4° C.). The resuspended *K. pneumoniae* strain was serially diluted and spread onto an MH agar plate for colony-forming unit (CFU) counting. The CFU results were normalized to the total protein amounts of each sample, which were determined by the micro BCA assay (Thermo Fischer Scientific). For the droplet tests, the bacteria stock was prepared in water or artificial saliva solution to an optical density of 0.01 at 600 nm. Then, 20 μL (4 droplets, 5 μL each) of the droplet was placed by using a pipette on top of the fabrics, followed by incubation for 5, 30, and 60 min. After incubation, the bacteria were resuspended in 1×PBS (pH 7.4) and centrifuged for 15 min at 14,000 rpm (4° C.). The pellet was resuspended in 1×PBS (pH 7.4), prior to the micro-BCA assay and CFU counting.

Similarly, 7 mg/mL of PR8 stock was applied for aerosolization on the bare and functionalized filter samples for an inactivation test. After exposure to the aerosolized PR8, the bare and functionalized filter was incubated for 5 and 30 min at room temperature. The PR8 on filters was collected in 2 mL of PBS (pH 7.4) and a centrifuge at 14,000 rpm and 4° C., for 15 min. The PR8 pellet was resuspended in PBS. For the droplet test, 1 mg/mL of viruses including PR8, HCoV-229E, and HCoV-OC43 were used, and 20 μL (4 droplets, 5 μL each) of the virus was applied on the bare and functionalized filter. After being incubated for 5, 30, and/or 60 minutes, the virus on filters was collected and resuspended in PBS. The resuspended virus strains were used for quantification of protein concentration using the micro-BCA assay, hemagglutination assay, and total RNA isolation.

4.3. Hemagglutination Assay

After protein quantification, the PR8 was diluted to 0.8 μg/mL with PBS (pH 7.4) and placed into 96-well plate (Corning, NY, USA) with two-fold dilution. An equal volume of 0.7% Chicken Red Blood Cells (Innovate Research; Novi, MI, USA) in PBS was mixed with the diluted virus. The plates were incubated at room temperature for 30 min to obtain a titer readout.

4.4. Long-Term Environmental Stability Test

Antimicrobial activity tests at harsh environmental conditions were conducted following the previous study.[5] Briefly, the bare and spunbond PP fabrics with HYD LTMAC or LAHAC coatings were incubated in a climate chamber (Memmert HPP260; Memmert, Buchenbach, Germany) at 37° C. (50 and 97% RH) for 7 days. After incubation, the fabrics were dried under ambient conditions (21° C., 32% RH) for 1 hour. This was followed by antiviral performance tests against PR8 influenza virus in droplets (5 μL) by measuring expression levels of HA and NP genes.

4.5. Quantitative RT-PCR Analysis

From the PR8, HCoV-229E and HCoV-OC43 exposed to face mask fabrics, RNA (Invitrogen; Carlsbad, CA, USA) was isolated following the manufacturers' instructions. The concentration of the isolated viral RNA samples was measured using nanodrop (Nanodrop One; Thermo Fisher Scientific), and each sample was controlled to have the same RNA concentration with RNase free water. The viral RNA samples were synthesized to cDNA with a Reverse Transcription kit (Applied Biosystems; Foster City, CA, USA), following the manufacturers' instructions. Quantification of cDNA was carried out using the SYBR Green PCR Master Mix (Applied Biosystem), and the real-time amplification of PCR products were analyzed using the ABI 7500 Fast Real-Time PCR System (Applied Biosystem). The amplification cycle consisted of one cycle at 95° C. for 3 min, followed by 40 cycles at 95° C. for 15 sec, and 40 cycles at 60° C. for 1 min. After the final cycle of PCR, reactions went through melt curve analysis for non-specific binding detection. All RT-qPCR analyses included standard samples for the quantifications. The sequences of primers are presented in Table 2.

5. Statistical Analysis

Statistical analysis for pressure drop (Δp), filtration efficiency, contact angle, and HPLC testes was performed using one-way analysis of variance (ANOVA). We performed statistical analysis for inactivation tests with aerosols and droplets by using General Linear Model (GLM) analysis. Statistical analysis was conducted using SPSS version 24 (IBM; Armonk, NY, USA).

TABLE 1

List of antimicrobial substances and their pathogen inactivation performance

| Materials | Pathogen used in the study | Incubation time | Inactivation efficiency | Ref. |
|---|---|---|---|---|
| Ag/CNT | *E. coli* | 30 min | 91% inactivation | 9 |
| Gold nanoparticles with undecanesulfonic acid-containing ligand | Adenovirus-5 | 30 min | no inhibition | 10 |
| Ag Nanoparticle in poly (3-hydroxybutyrate-co-3-hydroxyvalerate) (PHBV) film | Murine norovirus | 30 min | 0.14-0.86 log reduction | 11 |
| Benzalkonium chloride | Human Adenovirus Type 8 | 1 hr | 1.01 log reduction | 12 |
| Chloroxylenol/Benzalkonium chloride on glass slide | Human Coronavirus (Strain OC43) | 10 min | no inhibition | 13 |

TABLE 1-continued

List of antimicrobial substances and their pathogen inactivation performance

| Materials | Pathogen used in the study | Incubation time | Inactivation efficiency | Ref. |
|---|---|---|---|---|
| ZnO, Ag, Zn Zeolite powder | Human Coronavirus (strains 2291) | 1 hr | 0.50 log reduction | 14 |
| Hyperbranched quaternized polymers immobilized on glass | Polio virus | 1 hr | No significant reduction | 15 |
| Quaternary ammonium chloride | Polio virus | 10 min | 0.04-0.15 log reduction | 16 |
| Hexadecylated polyethylene imine grafted glass slide | Bacteriophage | 1 hr | 50% reduction less than 1 log reduction | 17 |
| N-[(11-benzyloxycarbonyl)undecanoyl]-functionalized polyethylene imine on glass slide | H1N1 | 30 min | ~60% virucidal activity | 18 |
| Immobilized N-alkyl polyethylene imine on a glass substrate | E. coli | 30 min | ~75% inactivation | 19 |
| Copolymer of quaternary ammonium chloride methacrylate and fluorine-methyl methacrylate spray coated on cotton fabrics | E. coli and S. aureus | 2 hrs | 82-90% | 20 |
| Quaternary ammonium iodide functioned on stainless steel and filter paper | K. pneumoniae | 24 hrs | 87-98% | 21 |

TABLE 2

List of primers used in this study

| Pathogen strain | Target gene | Primer name | primer sequence (5'-3') | Product size (bP) | Ref. | SEQ ID NO: |
|---|---|---|---|---|---|---|
| A/PR8/34 | Hemagglutinin (HA) | PR8/HA-F | GGAAAGAAGTCCTCGTGCTATG | 316 | This study | 1 |
| | | PR8/HA-R | CAATCGTGGACTGGTGTATCTG | | | 2 |
| | Nucleoprotein (NP) | PR8/NP-F | GCACGGTCTGCACTCATATT | 405 | This study | 3 |
| | | PR8/NP-R | TCCTCCACTTCTGGTCCTTAT | | | 4 |
| HCoV-229E | Membrane (M) | 229E/M-F | TGGCCCCATTAAAAATGTGT | 574 | 22 | 5 |
| | | 229E/M-R | CCTGAACACCTGAAGCCAAT | | | 6 |
| | Envelope (E) | 229E/E-F | CTCTGGTGTGTGGTGCTTATAG | 172 | This study | 7 |
| | | 229E/E-R | CTCGTTTAGGAAAGGGTCTATG | | | 8 |
| HCoV-OC43 | Membrane (M) | OC43/M-F | GGCTTATGTGGCCCCTTACT | 344 | 22 | 9 |
| | | OC43/M-R | GGCAAATCTGCCCAAGAATA | | | 10 |
| | Envelope (E) | OC43/E-F | TGATGCTTATCTTGCAGACACT | 240 | This study | 11 |
| | | OC43/E-R | ACGTCATCCACATCAAGGAC | | | 12 |

REFERENCES (SUPPORTING INFORMATION)

1. Zalas, M.; Gierczyk, B.; Ceglowski, M.; Schroeder, G., Synthesis of new dendritic antenna-like polypyridine ligands. Chem. Pap. 2012, 66, 733-740.
2. Kroehnke, F., The specific synthesis of pyridines and oligopyridines. Synthesis 1976, 01, 1-24.
3. Wang, H., Comprehensive organic name reactions. Wiley: 2010.
4. Pineda de las Infantas y Villatoro, M. J.; Unciti-Broceta, J. D.; Contreras-Montoya, R.; Garcia-Salcedo, J. A.; Gallo Mezo, M. A.; Unciti-Broceta, A.; Diaz-Mochon, J. J., Amide-controlled, one-pot synthesis of tri-substituted purines generates structural diversity and analogues with trypanocidal activity. Sci. Rep. 2015, 5, 9139.
5. Quan, F. S.; Rubino, I.; Lee, S. H.; Koch, B.; Choi, H. J., Universal and reusable virus deactivation system for respiratory protection. Sci. Rep. 2017, 7, 39956.
6. Rubino, I.; Oh, E.; Han, S.; Kaleem, S.; Hornig, A.; Lee, S. H.; Kang, H. J.; Lee, D. H.; Chu, K. B.; Kumaran, S.; Armstrong, S.; Lalani, R.; Choudhry, S.; Kim, C. I.; Quan, F. S.; Jeon, B.; Choi, H. J., Salt coatings functionalize inert membranes into high-performing filters against infectious respiratory diseases. Sci. Rep. 2020, 10, 13875.
7. Lundin, A.; Dijkman, R.; Bergstrom, T.; Kann, N.; Adamiak, B.; Hannoun, C.; Kindler, E.; Jonsdottir, H. R.; Muth, D.; Kint, J.; Forlenza, M.; Muller, M. A.; Drosten, C.; Thiel, V.; Trybala, E., Targeting membrane-bound viral RNA synthesis reveals potent inhibition of diverse coronaviruses including the middle East respiratory syndrome virus. PLoS Pathog. 2014, 10, e1004166.
8. Tlili, C.; Cella, L. N.; Myung, N. V.; Shetty, V.; Mulchandani, A., Single-walled carbon nanotube chemoresistive label-free immunosensor for salivary stress biomarkers. Analyst 2010, 135, 2637-2642.
9. Jung, J. H.; Hwang, G. B.; Lee, J. E.; Bae, G., Preparation of airborne Ag/CNT hybrid nanoparticles using an aerosol process and their application to antimicrobial air filtration. Langmuir 2011, 27, 10256-10264.
10. Cagno, V.; Andreozzi, P.; D'Alicarnasso, M.; Jacob Silva, P.; Mueller, M.; Galloux, M.; Le Goffic, R. Jones, S. T.; Vallino, M.; Hodek, J.; Weber, J.; Sen, S.;

Janecek, E. R.; Bekdemir, A.; Sanavio, B. Martinelli, C.; Donalisio, M.; Rameix Welti, M. A.; Eleouet, J. F.; Han, Y., Broad-spectrum non-toxic antiviral nanoparticles with a virucidal inhibition mechanism. Nat. Mater. 2018, 17, 195-203.
11. Castro-Mayorga, J. L.; Randazzo, W.; Fabra, M. J.; Lagaron, J. M.; Aznar, R.; Sanchez, G., Antiviral properties of silver nanoparticles against norovirus surrogates and their efficacy in coated polyhydroxyalkanoates systems. LWT—Food Sci. Technol. 2017, 79, 503-510.
12. Romanowski, E. G.; Yates, K. A.; Shanks, R. M.; Kowalski, R. P., Benzalkonium chloride demonstrates concentration-dependent antiviral activity against adenovirus in vitro. J. Ocul. Pharmacol. Ther. 2019, 35, 311-314.
13. Wood, A.; Payne, D., The action of three antiseptics/disinfectants against enveloped and non-enveloped viruses. J. Hosp. Infect. 1998, 38, 283-295.
14. Bright, K. R.; Sicairos-Ruelas, E. E.; Gundy, P. M.; Gerba, C. P., Assessment of the antiviral properties of zeolites containing metal ions. Food. Environ. Virol. 2009, 1, 37-41.
15. Tuladhar, E.; de Koning, M. C.; Fundeanu, I. R.; Beumer, Duizer, E., Different virucidal activities of hyperbranched quaternary ammonium coatings on poliovirus and influenza virus. Appl. Environ. Microbiol. 2012, 78, 2456-2458.
16. Weber, D. J.; Barbee, S. L; Sobsey, M. D.; Rutala, W. A., The effect of blood on the antiviral activity of sodium hypochlorite, a phenolic, and a quaternary ammonium compound Infect. Control Hosp. Epidemiol. 1999, 20, 821-827.
17. Gelman, F.; Lewis, K.; Klibanov, A. M., Drastically lowering the titer of waterborne bacteriophage PRD1 by exposure to immobilized hydrophobic polycations. Biotechnol. Lett. 2004, 26, 1695-1700.
18. Haldar, J.; An, D. Q.; de Cienfuegos, L. A.; Chen, J. Z.; Klibanov, A. M., Polymeric coatings that inactivate both influenza virus and pathogenic bacteria. Proc. Natl. Acad. Sci. USA 2006, 103, 17667-17671.
19. Milovic, N. M.; Wang, J.; Lewis, K.; Klibanov, A. M., Immobilized N-alkylated polyethylenimine avidly kills bacteria by rupturing cell membranes with no resistance developed. Biotechnol. Bioeng. 2005, 90, 715-722.
20. Lin, J.; Chen, X.; Chen, C.; Hu, J.; Zhou, C.; Cai, X.; Wang, W.; Zheng, C.; Zhang, P.; Cheng, J.; Guo, Z.; Liu, H., Durably antibacterial and bacterially antiadhesive cotton fabrics Coated by cationic fluorinated polymers. ACS Appl. Mater. Interfaces 2018, 10, 6124-6136.
21. Jampala, S. N., Sarmadi, M., Somers, E. B., Wong, A. C. L., and Denes, F. S., Plasma-enhanced synthesis of bactericidal quaternary ammonium thin layers on stainless steel and cellulose surfaces. Langmuir 2008, 24, 8583-8591.
22. Vabret, A.; Mouthon, F.; Mourez, T.; Gouarin, S.; Petitjean, J.; Freymuth, F., Direct diagnosis of human respiratory coronaviruses 229E and OC43 by the polymerase chain reaction. J. Virol. Methods 2001, 97, 59-66.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

Example 2

Here, we report the development of a universal, antiviral, and antibacterial material that can be dip-/spray-coated over conventional mask fabrics to exhibit antimicrobial activities. Our data shows that antimicrobial fabrics rapidly inactivated multiple types of viruses, i.e. human (alpha/beta) coronaviruses, influenza virus, and bacteria, irrespective of their modes of transmission (aerosol or droplet). This research provides an immediate method to contain infectious diseases, such as COVID-19 and influenza. This technology can be easily applied to develop antimicrobial face masks, personal protective equipment, and products with a self-sanitizing surface. Please find attached manuscript for detailed information including schematics.

SUMMARY

The current disclosure relates to personal protective equipments, industrial air purifying mask and filtration devices that inactivate airborne pathogens such as bacteria, fungi, and viruses. More specifically, the disclosure relates to new antibacterial/viral compounds, composition, coating method on existing disposable surgical masks, N95, N99, HEPA, HVAC nonwoven microfilters, coverall, and HEPA filters that capable of contact and non-contact inactivation of the pathogens. There is a critical need for personal protective equipment (PPE) to improve the air quality of inhabited areas by eliminating pathogens, because of civilian concern for epidemic and pandemic pathogens such Covid-19, SARS, Influenza. Recent ongoing Covid-19 pandemic with over 5 million confirmed cases and new cases increasing by ~10% per day (at the time of writing) that has caused major disruptions to the world economy [1-2]. The emergence of Covid-19 pandemic has triggered an increase in demand for protective masks, including surgical masks and respirators. Contaminated air contains a mixture of particles, water vapor, and gases. The particles smaller than 2 microns are normally drawn into the lungs and may be retained there. These particles cause the greatest concern to health professionals and require HEPA grade filtration for adequate removal. The mechanism for the existing masks and respirators is based on a passive, mechanical filtration. Therefore, microorganisms attached to these masks can survive for several hours. however, they are usually unable to kill airborne pathogens that greatly increases the risk of cross-infection.

The disclosure herein relates to non-transparent antimicrobial coating personal protective equipment (PPE) such as facemask, respirators, apron, and gown. The antimicrobial coating technology is a novel cost-effective, material independed, from sustainable source, coating on personal protective equipment which protects the face, eyes, skin and mucus membrane inside the nose from infectious pathogens in the form of aerosol and droplets. There is described a multifunctional hydrophilic and hydrophobic coating, which provide contact based or non-contact (ionized induced by visible light) based inactivation mechanism, can be designed to provide wide range of application platforms. Thin layer of antimicrobial coating on facemask and PPE gown creates an airflow barrier which prevents entry of airborne pathogens (below 5 microns) and droplet (above 5 microns) pathogens. The rapid implementation of the coating by spry system and flash UV cure will significantly reduce the scaleup time. This type of coating will also minimize the specific mode of pathogens transmission and addressing the hierarchy control of health and safety on multiple levels.

Different components of PPE generally consist of different materials, example the face mask consist of 3 ply fabrics stacked by spunbond, meltblown and spunbond fabricated polyproplene/polyethylene layers. Similarly, N100, N99, N95, KN 95, FFP2, P2, Korea 1st class (KF94), and DS respirator mask consist of several polypropylene layer stacked. General population uses multiply cotton, silk or surgical mask. In the case of cotton, 100% cotton which is either high-thread-count (600 TPI), moderate-thread-count (80 TPI) or blended with synthetic fibers such as flannel (a 65% cotton-35% polyester blend), natural silk or chiffon (90% polyester-10% Spandex weave). Reusable (multi-use) coverall/gowns are usually made of 100% cotton, 100% polyester, or polyester/cotton blend fabrics. The spunbond gowns weight ranges 35-50 GSM, Caps range from 12-25 GSM, mask fabric is typically 25-50 GSM. The surgical face mask is mainly made of 3 ply polypropylene using 20 gsm spunbond technology for the inner and outer layer and for middle layer 25 gsm non-woven polypropylene made using melt-blown technology are used.

The present disclosure provides antibacterial/viral formulations and scalable methods for preparing a coating on a protective mask, filters. The coated surgical mask and filters possess pressure drop; filtration efficiency aligns with a standard testing protocol such as FDA, NIOSH, ASTM [3-5]. The present disclosure also provides submicron non-woven fibers, such as spunbond and melt-blown polypropylene, cellulose-based fabrics (quilt cotton, 100% medium weight), Flannel fabrics (made of either wool, cotton or synthetic fibers), Spandex (polyether-polyurea copolymer) coating made by formulations and scalable methods. The scalable methods of the present disclosure can provide for any mask, filters (HVAC, HEPA) of the present formulations. In detail, the antibacterial functionalized lignin-based polymer solutions, into fibers that can be formed into a coating by chemical, light, and heat curing technique. The coating is covalently attached to spunbond or cellulose-based nonwoven fibers chemical interlocking and/or cross-linking. The antibacterial-loaded lignin-based polymer solution for nonwoven fibers can include selected antibacterial agents and a selected polymer mixture. The antibacterial lignin polymer-based coat on a nonwoven mask can be a light-induced reactive oxygen generator, bear electrostatic charges, and polyphenol. The first generation of antibacterial in said antibacterial-loaded lignin-based polymers are a light-activated generation of reactive oxygen but not limited to reactive hydroxyl radicle. The antibacterial material loaded in lignin-based polymer solution can include but not limited to lignin, cellulose, chitosan, humic acid, fluvic acid, polymeric quaternary ammonium salt (aliphatic and aromatic) with counter ions such as chloride, iodide, bromide, $SO4^{-}$, methyl carbonate ($CH3-CO2^{-}$), trifluoromethane, perfluorooctanoate, BF4, PF6, SbF6, ClO4, and NO3. The present disclosure also describes methods for making polymeric coating having a lignin conjugated methacrylate monomer and antibacterial and anti-viral moieties; exposing the monomeric composition to heat or electromagnetic radiation such as UV or visible light to produce a pathogen inactivated coating on surgical masks and respirators. The synthetic lignin conjugated polymer composition containing a base methacrylate monomer (80%), crosslinkers (17%), photoinitiator (3%) in the current embodiments, yet the coating strength of the synthetic polymer deposited to the microfibers is strong enough to resist stringent washing with alcohol, water and with surfactant aqueous solutions. Being aqueous or polar solvent based, the coating compositions and methods described herein can, in many embodiments, produce homogeneous coating on mask surfaces. because the coating is fully synthetic, coating process does not suffer from batch variation, and limited shelf the does not require use of expensive equipment. The compositions and methods enable coating of a wide range of mask, respirator, cloths, and fabrics formats, which can be coated with high uniformity at low costs. Another advantage over in situ polymerization processes includes the ability to perform quality control review of the polymers before coating to ensure that the composition of the coating is always the same. Additionally, due to the simplified coating process, composition can be provided as a kit for use in coating by an end user in almost any industrial settings. The coating application of monomer composition include traditional dispensing a liquid coating and spray coating. There are number of patents related to the antibacterial activities of U.S. Pat. No: US20100282083A1 which describes the use of blended quaternary ammonium chloride (such as Alkyl Dimethyl Benzyl Ammonium Chloride) melt blended with filter polymer fibers for inactivating microorganisms [6]. Another one related to crosslinking biocides (U.S. Pat. No. 5,849,311A) (benzalkoniumchloridea derivative) on polypropylene/polyethylene material [7].

This disclosure is directed to a method for applying lignin based antibacterial material to the mask surface either, spraying or dipping methods and/or impregnated into the nonwoven or woven fiber structure using vacuum pressure technique. A polymer coating composition consisting of monomer solutions (lignin methacrylate conjugated antibacterial, monomer (hydrophilic or hydrophobic), crosslinker, solvent and a photo initiator; mixing the above components to provide a homogeneous suspension of monomers; and spraying the composition with a gas compressed spray nozzle onto a suitable support surface. Another aspect of this disclosure is a method for producing antibacterial coating on a non-woven fabric comprising a container capable monomer composition of producing an aerosol and spraying the composition from a spray point on the device onto a non-woven mask surface wherein substantially the diluent evaporates before the composition reaches the non-woven fabric surface thereby forming a biocide coating on the fabric.

The present disclosure is lignin-based antimicrobial coating on mask in the FIG. 16, where contact based (polycationic) biocide coating (1-4) or photoactivated reactive radicle generating coating (7-10) to outer layer or mixture of photoactivated reactive radicle generating coating and polycationic biocide coating (5-6) and also contact based biocide coating on the middle layer of the surgical mask (nonwoven PP). The current disclosure has advantage over any single biocide coated mask or respirator, because two different inactivation is happening in single mask and even one layer of the biocide coating fails to inactivate airborne pathogens, the other layer is also there to do it. This also has advantage on broad pathogen strain, which varies inactivation depends on other factors such as humidity and pathogen types. Although a number of the disclosures relate to sprayable coatings which contain fibres, this disclosure, in contrast, is based on the antibacterial and anti-viral polymerizable materials onto non-woven fabrics by a simple spraying process. Thus, the disclosure allows provision of non-woven fabrics containing a wide variety of fabric materials, by a simple and straightforward method. The disclosure allows application of fabric to a wide variety of different surfaces and with almost unlimited scope for the contours of the fabric.

Example 1. An antibacterial, antiviral coating method on surgical mask, filters and respirators; the method comprising the steps of:
  a. capable of inactivating air stream carrying pathogens through a novel active mask either in presence of light or simply by contact.
  b. comprised of plant based natural chemicals or synthetic chemicals having biocide properties to rupture the outer membrane of the bound pathogens or dissolving their lipids, and spilling their cellular contents, there by inactivating or destroying the pathogens.
  c. The product that is applied contains antimicrobial composition that float in contact with the surface and the internal medium of the coating.

Example 2. Lignin based antimicrobial materials based on tert-pyridine quaternary ammonium chloride, Adenine hexyl ammonium chloride, and Eosin-Y benzophenone carboxylate are synthesized and characterized.

Example 3. The antimicrobial coating composition containing the acrylate based quaternary ammonium chloride and acrylate monomer, cross-linker, UV initiator and solvent are mixed just prior to use. The samples coated using a spray-coating system, which is a custom-made spray system (FIG. 16) equipped with an atomizing nozzle (Spraying system co.; Wheaton, IL, USA) and operated with 40 psi of compressed nitrogen gas. Coating formulation was spray-coated onto substrates such as plastic sheet, glass, metal sheet and nonwoven fabrics at a height of 10-15 cm for 5 sec (spray solution flow rate: ~15 mL/s). For fabric non-transparent fabrics, the excessive coating solution was removed by applying a 10 in. Hg vacuum for 10 seconds. The substrates coated with antimicrobial polymers were cured for 1 minute using UV light with a power density of 6 mW/cm2. The UV cured substrates were washed 3 times with 1 mL of ethanol for the plastic, steel, and glass. However, for the coated fabric 3 times with 1 mL of ethanol then 5 times with 1 mL of water. Then, coated fabrics were dried at 37° C. for 12 hours to obtain the final products.

Example 4. An antibacterial, antiviral coating A material composition comprising:
  A. blend of polymerizable lignin, crosslinker and photoinitiator to create a uniform coating on the filter media elements such as disposable surgical mask, respirators, HEPA and HVAC microfibers.
  b. The biocide chemical compounds that have been coated on the mask microfibers elements to include aromatic 4-pyridyl and terpyridyl quaternary ammonium compounds with varying counter ions for contact inactivation of airborne pathogens
  c. The biocide chemical compounds that have been coated on the mask microfibers elements to polymerizable lignin-based Xanthene dyes or plant based polyaromatic elements for light activated contactless inactivation of airborne pathogens.
  d. The biocidal active compound uniformly coated on non-woven fiber mats comprised of microfiber elements of different density
  e. a contactless UV cured spray coating to improve coating efficacy, increase active surface area and bonding strength of the biocide chemical compounds onto the mask filter elements.

Example 5. An air purifier filter comprising:
  a. filter cartridge (HEPA or convectional HVAC filter) containing active biocide coated microfilter media for in-line air handling systems.
  b. such filter cartridge having an outer frame housing one or more internal active filter media units.

Example 6. The apparatus of claim, wherein multiple biocide filter screens of this disclosure are arrayed adjacent to one another in an air handling duct, with each filter cartridge containing one or more active filter media mats, comprised of the materials and chemicals of this disclosure.

Examples of Method of Application: —For the coating application, the first step is to make a preparation of fabrics, depends on the solvent compatibility, precleaning and cleaning of the substrate where the composition will be applied. For plastic samples, ethanol, methanol, isopropanol and water are used for precleaning any debris and oil attached on the polymer sheet. For the case of metal sheets, hexane, pentane, ethanol, methanol, isopropanol, chloroform, acetone, and water is used for the precleaning. The remaining solvents can be removed using strong jet of air.

The present disclosure also based on polymer coating synthesized from functionalized lignin-based molecules as a sustainable material, lignin is nature's most abundant aromatic chemical and is readily available and more than 70 million metric tons of lignin are harvested annually. lignin is made of a random polymeric network composed of aromatic methoxyl, phenolic hydroxyl, aliphatic hydroxyl and other carbonyl groups. The incorporation of aromaticity in the polymer structure is known to improve the overall stability and physical strength of the polymer coating. Functionalized lignin molecules with a polymerizable group such as methacrylate, acrylate, and allyl are also referred to as lignin-based monomers. Synthesizing a lignin-containing polymer material comprises reacting lignin having terminal hydroxyl groups with methacrylic, acrylic acid, in presence of 2% base (such as NaOH, K2CO3, Triethylamine) thereby converting the terminal hydroxyl groups to terminal ester groups and forming a polymerizable methacrylic, acrylic lignin; and (b) performing amine to the hydroxy reaction between lignin and allylamine or methacryloyl-L-Lysine in presence of 1-ethyl-3-(3-dimethylaminopropyl) carbodiimide hydrochloride (EDC) or N-hydrosuccinimide (NHS) in presence of 2-5% base such as hydroxybenzotriazole (HOBt), 1-Hydroxy-7-azabenzotriazole (HOAt), Dimethylaminopyridine (DMAP) to form bond formed between lignin and a polymerizable allyl group. Similarly, allyl glycidyl ether and glycidyl methacrylate having pendant epoxy groups to bond with the hydroxy group of lignin (Example 1) in presence of 1% mild base such as Tritethylamine (TEA), N-ethylisopropylamine (EIP), and 1,8-Diazabicyclo[5.4. 0]undec-7-ene (DBU).

(1) An example of a class of molecules that can polymerizable lignin methacrylate (LM), which have the general chemical structure (1) shown below:

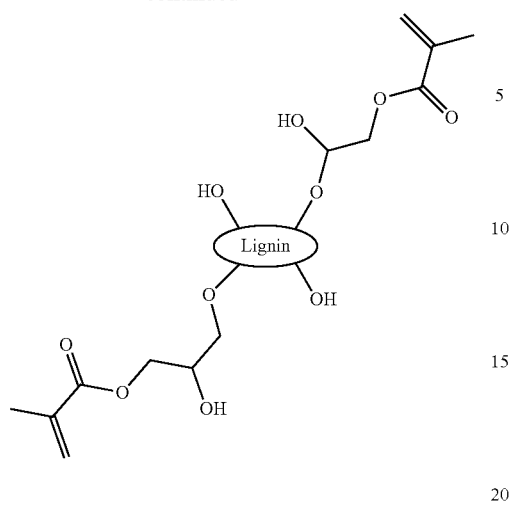

(2) Another example of a class of molecules that can undergo a contact based polymerizable antibacterial/anti-viral coating such as lignin methacrylate functionalized 4-Pyridonium glycidyl ether (LMPGE), which have the general chemical skeleton (2) shown below:

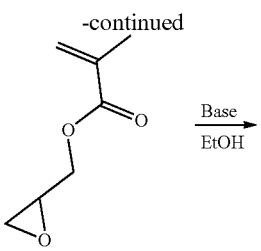

Here the 4-pyridinium ion (cations Cl-, Br-, I-, OH-, BF3-, and CH3COO-) are synthesized by reacting (molar ratio 1:1) 4-vinyl pyridine, alkyl halide (H, CH3, CH3(CH) 2-8CH3), and glycidyl ethyl bromide in presence of KI catalyst and Dry DMF solvent at 60° C. The resultant product was purified by precipitation, dried in vacuum and further functionalized with lignin and glycidyl methacrylate in presence of base (1~5% triethylamine) to obtain compound 2.

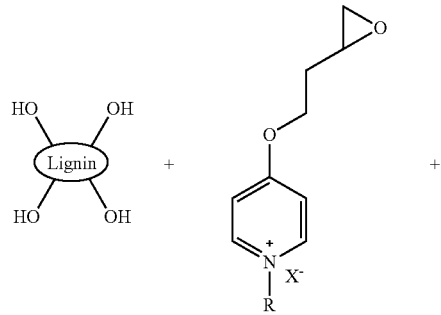

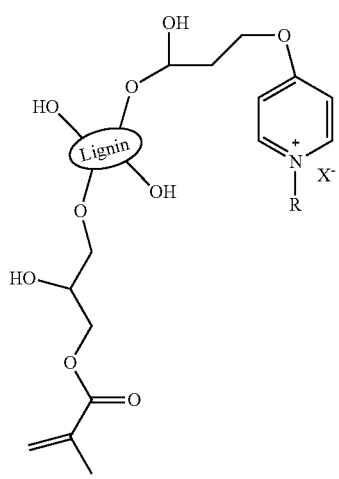

(3) Another embodiment of a class of molecules that can undergo a contact based antibacterial/anti-viral polymerizable lignin methacrylate functionalized lignin based terpyridine polycations (LTMAC), which have the general chemical structure (3) shown below: Similar to compound 2, polymerizable lignin based terpyridine polycation also synthesized. The multication terpyridine group synthesized by using 2,2':6',2"-terpyridine hydroxide is first quaternized with methyl ammonium chloride and followed by grafting epoxide functional group to form 2,2':6',2"-terpyridine-1-methyl ammonium chloride ethyl epoxide.

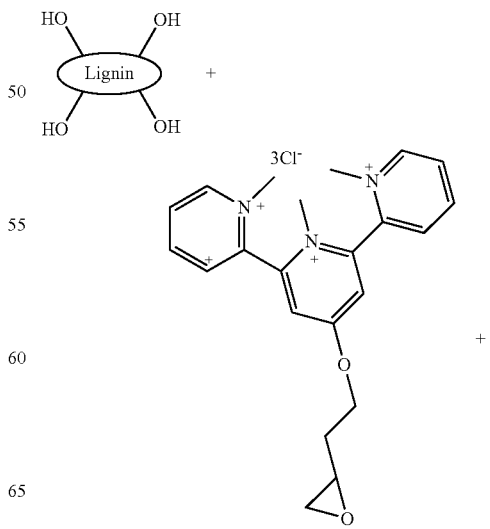

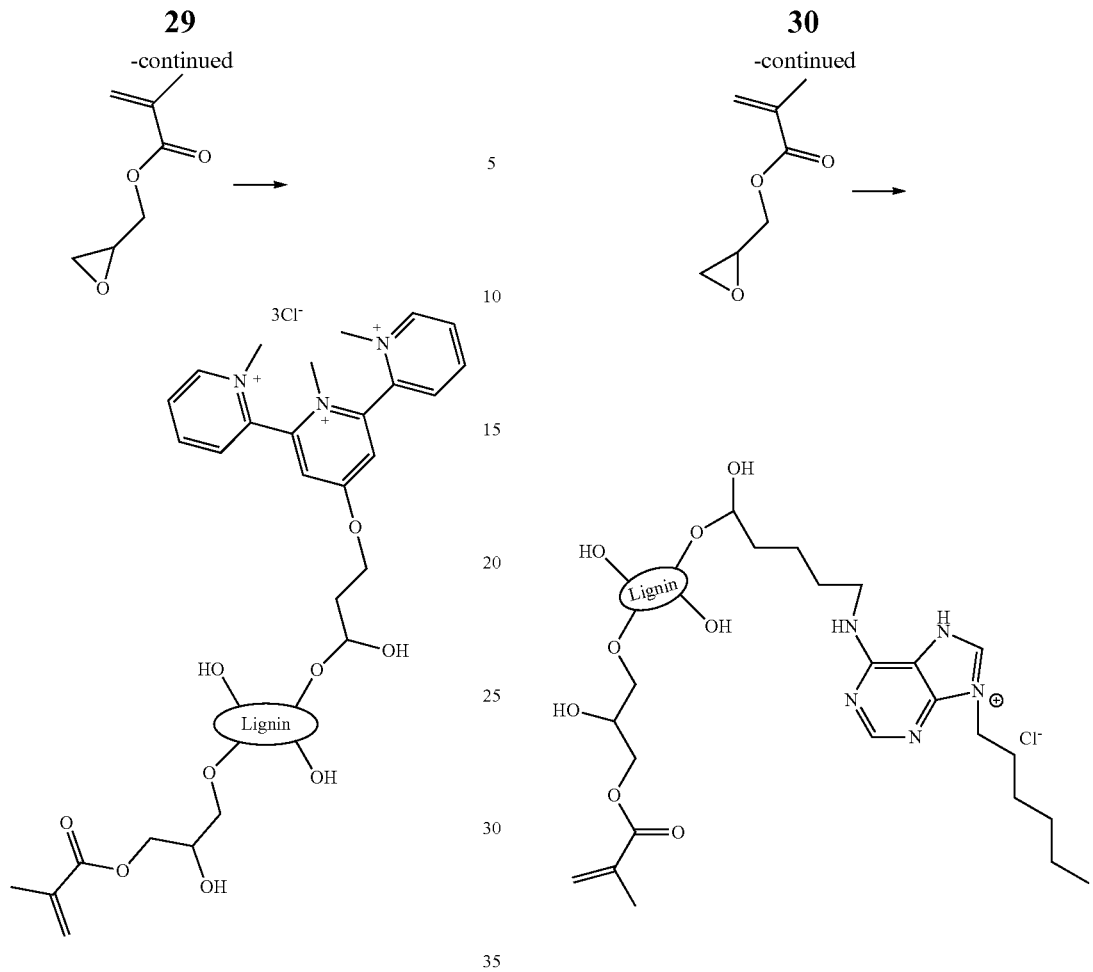

(4) Another embodiment of a class of molecules that can undergo a contact based antibacterial/anti-viral polymerizable lignin methacrylate functionalized lignin based terpyridine polycations (LAHAC), which have the general chemical structure (4) shown below: Similar to compound 2, polymerizable lignin based terpyridine polycation also synthesized. Similar to previous reaction scheme, adenine in dry DMF, functionalized with epichlorohydrin, and 1-chloro hexane, to form lignin functionalizable N-9(N-hexyl adenine ammonium chloride)N-6 methyl epoxide.

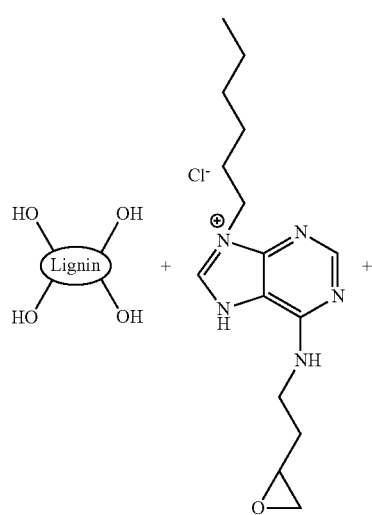

5) Another embodiment of the disclosure, example a polymer hydrophobic coating formed from a LTMAC or LAHAC monomer which has the chemical structure is provided in 3 and 4. Coatings made with the UV polymerizable product of 3 and 4 monomer having a terpyridine or adenine quaternary ammonium chloride group or similar monomers. The hydrophobic resultant coating containing 95% tert-butyl methacrylate (TBMA), 4.9% of pentaerythritol tetraacrylate (cross-linker), and 0.1% Hydroxy-2-methylpropiophenone (UV initiator) in 5 μL of dimethyl formamide (DMF) were mixed with 750 mg of LTMAC or LAHAC in 95 μL DMF. The monomer/antimicrobial coating solution was purged with N2 for (10 m/min) for 3 minutes to remove any dissolved oxygen. A 20 μL of the curing solution was then spread evenly on 2.0 or 2.5 cm2 circular fabrics (spunbond and meltblown fabrics for surgical and N95 masks) and the excess solution was removed using vacuum filtration apparatus connected to a vacuum pump and apply vacuum (10 In Hg) for 10 seconds each mask sides. The LTMAC and LAHAC infused spunbond and meltblown fabrics were then placed on the irradiation chamber and irradiated with 360 nm LED UV light (power density 6 mW/cm2) for 30 sec each side. The UV cured fabric was washed with 1 mL of ethanol for 3 times and then with 1 mL water (3 times). The coated fabrics were dried at 37° C. for 12 hours to obtain the product 5.

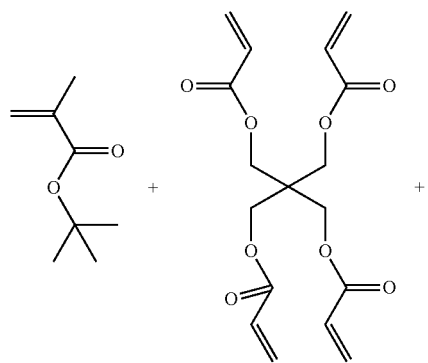
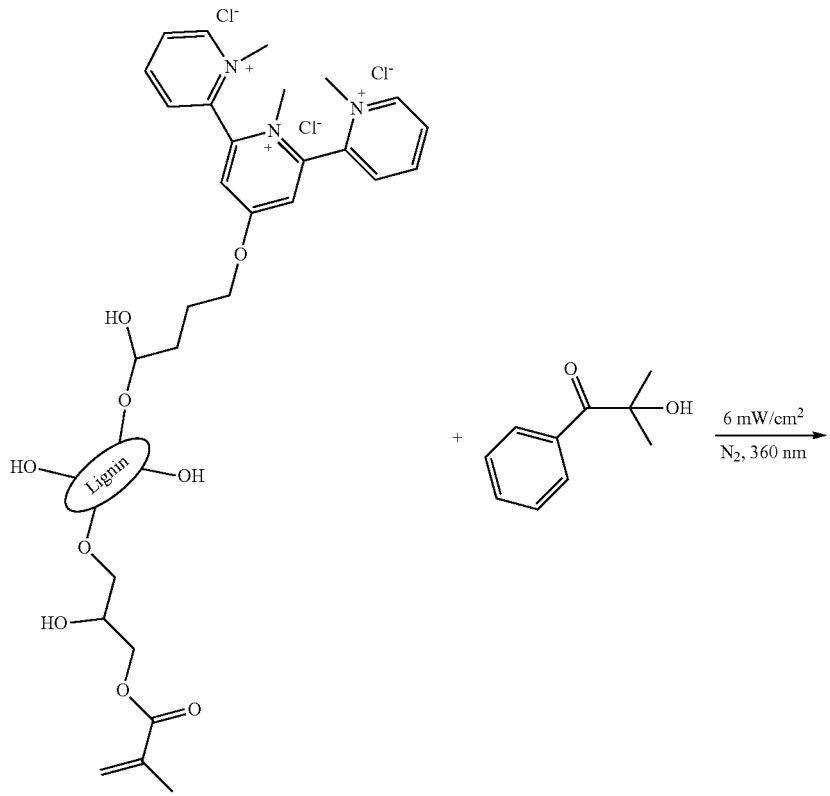

-continued

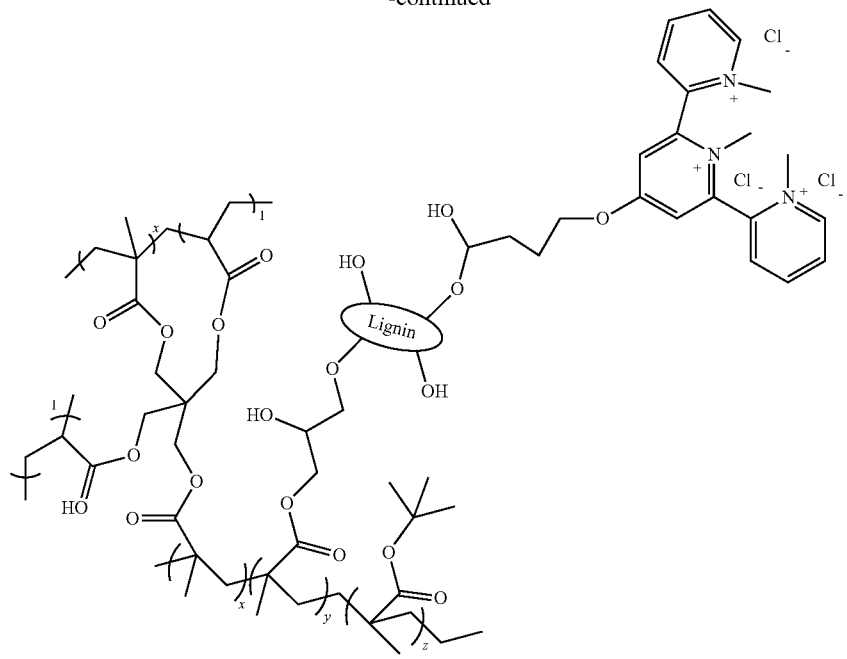

6) Another embodiments of the disclosure, example a polymer hydrophilic coating formed from a LTMAC or LAHAC monomer which has the chemical structure is provided in 3 and 4. Coatings made with the UV polymerizable product of 3 and 4 monomer having a terpyridine or adenine quaternary ammonium chloride group or similar monomers. The hydrophilic resultant coating containing 95% 2-hydroxyethyl methacrylate (HEMA), 4.9% of pentaerythritol tetraacrylate (cross-linker), and 0.1% Hydroxy-2-methylpropiophenone (UV initiator) in 5 μL of dimethyl formamide (DMF) were mixed with 750 mg of LTMAC or LAHAC in 95 μL DMF. The monomer/antimicrobial coating solution was purged with N2 for (10 mL/min) for 3 minutes to remove any dissolved oxygen. A 20 μL of the curing solution was then spread evenly on 2.0 or 2.5 cm2 circular fabrics (spunbond and meltblown fabrics for surgical and N95 masks) and the excess solution was removed using vacuum filtration apparatus connected to a vacuum pump and apply vacuum (10 In Hg) for 10 seconds each mask sides. The LTMAC and LAHAC infused spunbond and meltblown fabrics were then placed on the irradiation chamber and irradiated with 360 nm LED UV light (power density 6 mW/cm2) for 30 sec each side. The UV cured fabric was washed with 1 mL of ethanol for 3 times and then with 1 mL water (3 times). The coated fabrics were dried at 37° C. for 12 hours to obtain the product 6.

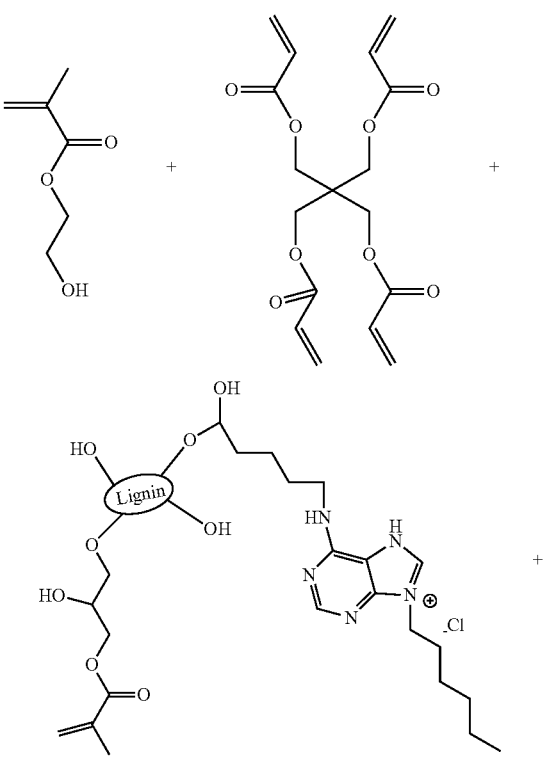

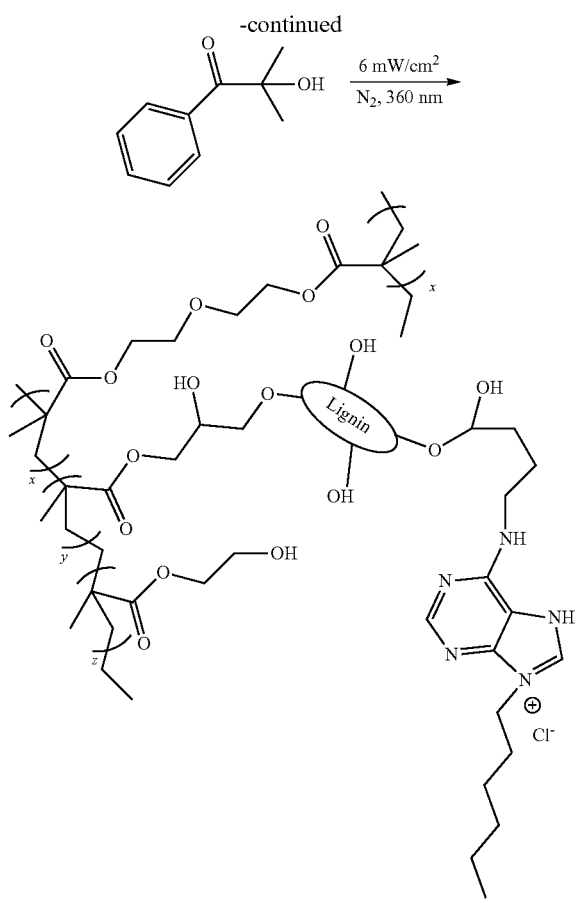

Light Induced Reactive Oxygen Generators.

Reactive oxygen species (ROS) normally generated by cellular metabolism and functional activities and plays an important role in homeostasis and cell signaling process inside natural bodies [6]. ROS generator produces strong oxidizing power when illuminated with light (UV-A, UV-B, visible light 400-800 nm). The ROS material designed such that with superoxide ions ($O^{2-}$, $SO_3^{2-}$), holes ($h^+$), hydrogen peroxide ($H_2O_2$), singlet oxygen ($1O_2*$), and hydroxyl radicals ($OH·$) generated in the valence band, and electrons and generated in the conduction band, when irradiated with light. The ROS has the standard oxidation potential of above +2.8 V; thus, it is very effective at oxidizing and reacts very rapidly with a wide variety of organic (oxidizable) species. Many mechanisms of ROS initiate the damages of pathogens are reported. ROS can initiate reactions of polyol compounds, to aggressively bind and immobilize amino acids of the pathogen, rapid cross-linking of cellular proteins, oxidation of lipids, damaging nucleic acids, which breaks down lipids in cell membranes. protein. Unlike other antibacterial materials such as antibiotics, light-induced ROS generation technique does not need contact with pathogens and selection of mutant resistant strains. The ROS can excite molecular oxygen to form singlet oxygen by energy transfer from a light-responsive semiconductor nanomaterial, organic photosensitizers, metalloporphyrins, aromatic dyes. The ROS lifetime is very short in aqueous media, several nanoseconds, and therefore must be produced with several tens of angstroms of a target substrate due to minimal diffusion path length. can decompose and mineralize organic compounds by participating in a series of oxidation reactions leading to carbon dioxide. The current disclosure reveals that visible light illumination (white light illumination power density ~3 mW/cm$^2$) modulates lignin based photoactive biocides (examples 7-10) affinity to produce reactive radicle species, thereby providing pathogen inactivation performance. In comparison to nonilluminated or dark conditions, is observed to increase by over more than 2 log reduction. The inactivation is more apparent when using mixture of lignin biocide photo and polycation for the coating.

The current disclosure, photoactive lignin is prepared by coupling the lignin with 3, 3',4,4'-benzophenone tetracarboxylic (BPTCD) and xanthene dye in presence of 1,1'-Carbonyldiimidazole (CDI) or di(imidazol-1-yl)methanethione (DIM) in organic solvents such as THF, DMF, and acetone at 60° C. for 12 hours. The product can be precipitated from the reaction mixture using ethanol or methanol and purified by centrifugation. The obtained photoactive lignin (FIG. 1 b) is further functionalized with a polymerizable group as explained above section.

(7) An example of a class of molecules that can undergo a reactive oxygen species in structure and properties in response to external light stimuli are lignin methacrylate functionalized Eosin-Y benzophenone carboxylate (LMEB), which have the general chemical structure (7) shown below. The absorbance range for the LMEB is 360~750 nm.

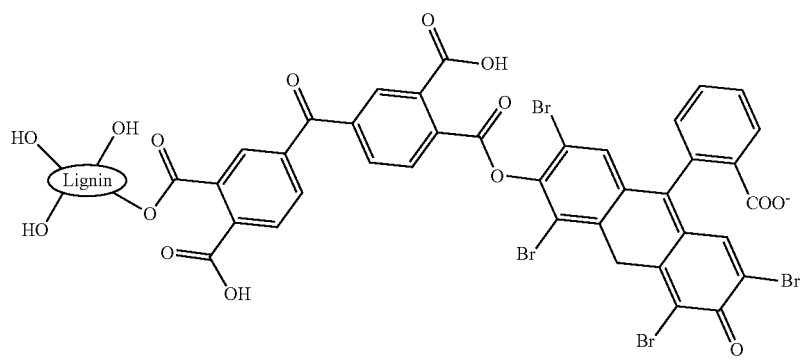

(8) Another example of a class of molecules that can undergo a reactive oxygen species in structure and properties in response to external light stimuli are lignin methacrylate functionalized Rose Bengal benzophenone carboxylate (LMRB), which has the absorbance range for the LMEB is 360~650 nm. The general chemical structure (8) shown below:

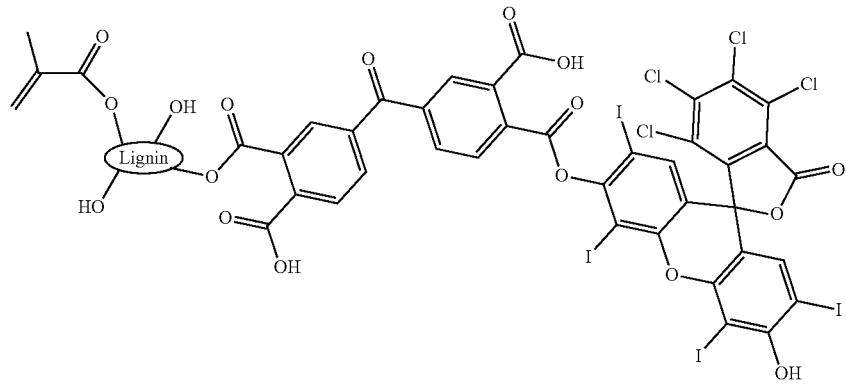

(9) Another example of a class of molecules that can undergo a reactive oxygen species in structure and properties in response to external light stimuli are lignin methacrylate functionalized hypericin benzophenone carboxylate (LMHB), which have the general chemical structure (9) shown below. The LMHB has anthraquinone derivative which has an active constituent of *Hypericum* (Saint John's wort tree). Hypericin can also be synthesized by simple coupling reaction of Emodin (6-methyl-1,3,8-trihydroxyanthraquinone). The absorbance range for the LMHB is 250~600 nm.

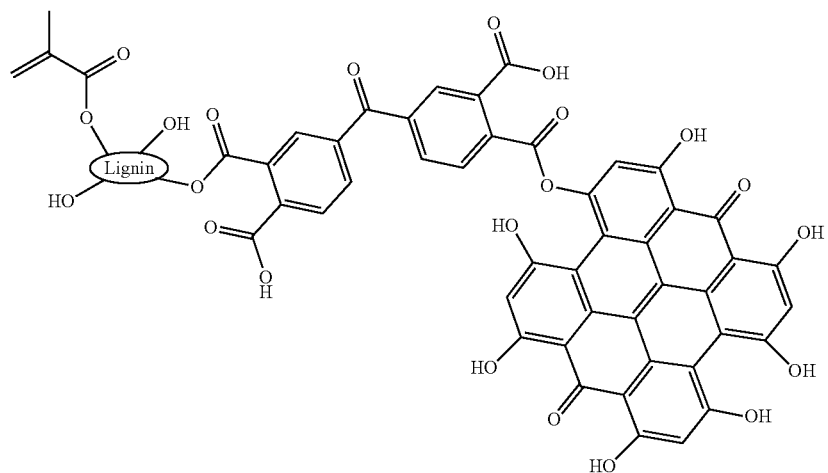

(10) Another example of a class of molecules that can undergo a reactive oxygen species in structure and properties in response to external light stimuli are lignin methacrylate functionalized curcumin benzophenone carboxylate (LMCB), which have the general chemical structure (10) shown below. Curcumin is stable than Xanthene dyes and absorb 300~450 nm light and can produce reactive oxygen species 0.2-1 vµg/mL curcumin concentration. Curcumin is a bright yellow chemical produced by *Curcuma longa* plants and commercially available too.

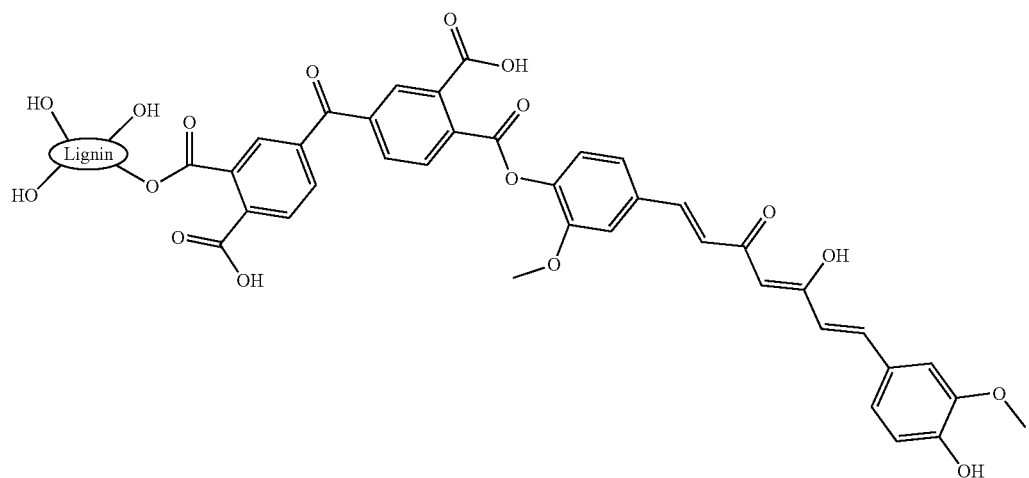

Some of the present disclosures relate to photosensitive reactive oxygen species. The main mechanism for photosensitive properties of the mentioned materials relies on the light exposure of material with energy larger than its bandgap. The photosensitizer has a high absorption coefficient in the spectral region of the excitation light; enough triplet energy (high quantum yield), long triplet state lifetimes to allow efficient energy transfer to ground state oxygen. The photosensitizer generally induces one-photon transition between a ground state and excited state, followed by relaxation of singlet excited state yields the lowest excited singlet state of the sensitizer. Also, intersystem crossing generates the sensitizer triplet state due to the lifetime of the triplet state is longer than that of the excited state allowing this excited state to react oxygen, water molecules more than many types. An Example, electron-transfer (hydrogen atom removal) between the excited sensitizer and a substrate (O2, H2O, NO2, CO2), yielding substrate-free radicals and species such as the superoxide radical anion. These reactive species can inactive the pathogens when they came close proximity of the light activated biocide coated microfibers as shown in FIG. 17. This technique doesn't need to attach pathogen closely to the biocide coated fibers.

The disclosure also designed different light-sensitive organic photosensitizer as shown in disclosure 7-10; as well as their derivatives capable of forming polymers by various polymerization techniques. The organic photosensitizer such as benzyl phenone functionalized Xanthene dyes (rose bengal, Eosin-Y), curcumin, and hypericin are very effective photosensitizers, as they possess triplet states of appropriate energies for sensitization of oxygen and H$_2$O. Xanthene dyes with a strong absorbance in the range of 350-750 nm, the heavier halogen substituents on the xanthene induce red shift halogens increases the yield of intersystem crossing to the triplet state of the dye, which is an important criterion for a photosensitizer. The present disclosure also related to methods for preparing such polymeric cross-linking using functional monomers comprising acrylic or methacrylate, their polymerizations using stimuli-induced (UV light (250~360 nm) freer radicle polymerization. Organic photosensitive material has the ability to alter their properties with a change in environmental stimuli that can be utilized for a wide variety of applications such as optical memory devices, memory devices, membranes, drug delivery agents.

(11) Another embodiment example of a lignin-based contact inactivation and UV induced crosslinking chemical structure (2) shown below: here a continuous roll-on lignin-based UV-curable large scale antimicrobial coating techniques is described.

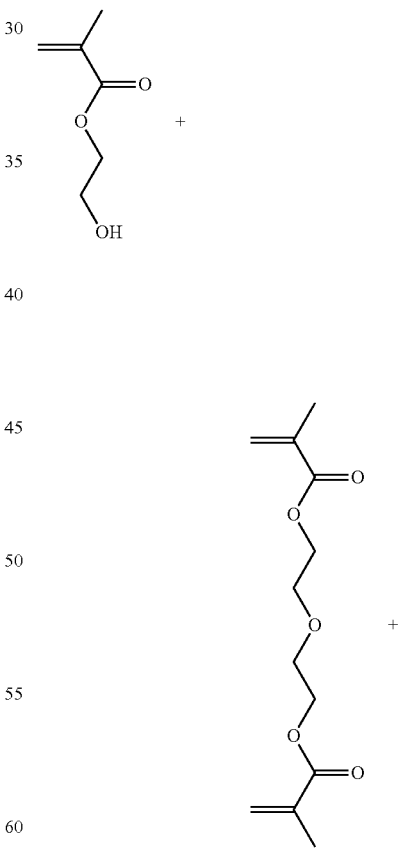

-continued

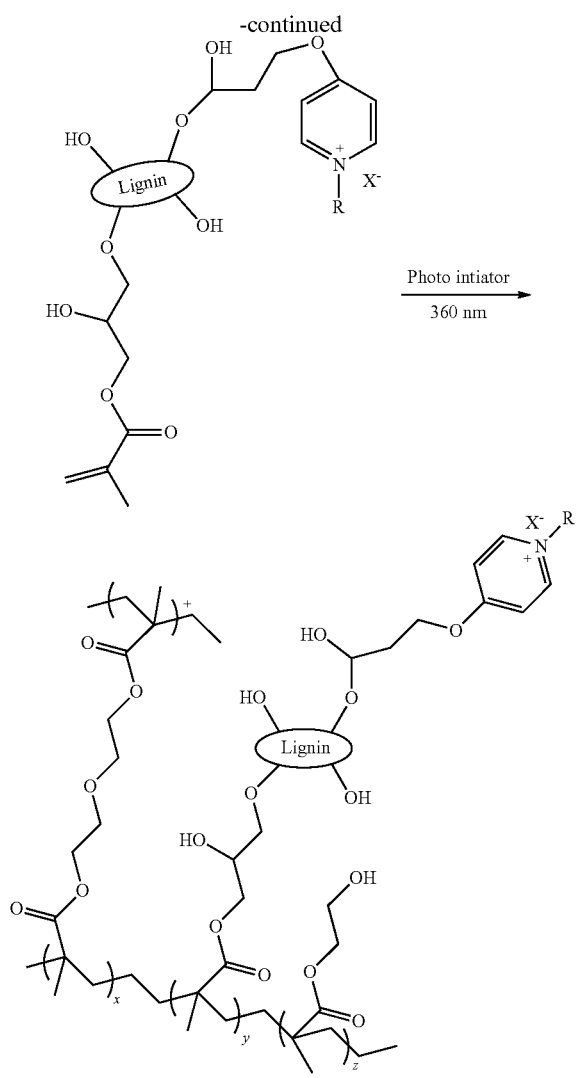

An aspect of the present disclosure is to provide a continuous roll-on lignin-based UV-curable coating on a microfabrics material such as spunbond polypropylene to enhance pathogen inactivation, and to improve production yield. FIG. 18 is a diagram illustrating a continuous process of lignin-based antibacterial spray-coating composition and followed by UV curing of the present disclosure. The above and other features of the present disclosure are described in detail and in the accompanying drawings which are given to presenting a somewhat simplified representation of various preferred features illustrative of the disclosure. The disclosure is accomplished by passing spunbond fabric strips through feed rolls (FIG. 18) and by applying monomer composition solutions with concentrations from 10-50 wt % of lignin monomer in DMSO. The monomer solution is bubbled with nitrogen gas (flow rate 100 m/min) for 25 minutes before spray coating. The monomer composition was then coated on microfabrics using a spray-atomization technique, like a fluid-bed coated top spray. The thickness of lignin-based polymer coating on microfibre fabrics is controlled by changing the viscosity of the monomer composition (determined by TA rheological instrument), airflow, and monomer feed rate from the spray nozzle. Examples of commercial manufacturers of suitable spray equipment and their models include: spay system inc., GEA Process Engineering Inc. (Precision Coater), and Schlick Nano ABC spray nozzle. The coating nozzle has a spray angle of 40~65o and has a coating capacity of 1-6 g/mL. A layer of rubber or similar material and pressing the fabric or apply mild vacuum to remove excessive monomer composition. A UV lamp is irradiated at 360 nm light, with a power density of 6 mW/cm2 for 30 sec for each side. Examples of commercial manufacturers of suitable spray equipment and their models include Waveform Lighting (RealUV LED Flood lamp), and Dymax Inc. BlueWave LED Flood curing system etc. The coated fabric was then washed with H2O, ethanol to remove the unreactive monomer. The thickness of the polymer coating films can be tuned by spraying from solutions that are more or less concentrated in the lignin monomer composition. The disclosure is accomplished by passing a strip of fabric through feed rolls and by applying to the fabric, either at the top or bottom or both faces of the fabrics thereof.

(12) As an example of our disclosure, we have shown the schematic of final lignin based coated disposable surgical mask in the FIG. 19a, where contact based (polycationic) antimicrobial coating (1-3) and in the FIG. 19b, photoactivated reactive radicle generating coating (4-7) to the outer layer of the surgical mask or respirator.

Combination of Mask (13). a kind of mask in the FIG. 20 include:
Inner layer, the inner layer includes hydrophobic lignin based antimicrobial nonwoven spunbond fabric, and the inner layer is configured to the nose and mouth of contact wearer; Middle layer, the middle layer are arranged on the inside of outer and inner layer, which is a nonwoven meltblown fabric material; Outer layer, the outer layer is configured on the middle layer and include lignin based antimicrobial nonwoven spunbond fabric, and the outer layer is configured to connect external environment.

(14) a kind of mask in the FIG. 21 include:
Inner layer, the inner layer includes nonwoven spunbond fabric, and the inner layer is configured to the nose and mouth of contact wearer; Middle layer, the middle layer are sandwiched between outer and inner layer, which is a hydrophobic lignin based antimicrobial coated meltblown fabric material; Outer layer, the outer layer is configured on the middle layer and include lignin based antimicrobial nonwoven spunbond fabric, and the outer layer is configured to connect external environment.

FIG. 21:—combination of mask inner (spunbond), middle (lignin antimicrobial coated meltblown), and outer (lignin antimicrobial coated spunbond) layers.

(15) a kind of mask in the FIG. 22 include:
Inner layer, the inner layer includes hydrophobic lignin based antimicrobial coated nonwoven spunbond fabric, and the inner layer is configured to the nose and mouth of contact wearer; Middle layer, the middle layer is sandwiched between outer and inner layer, which is a hydrophobic lignin based antimicrobial coated meltblown fabric material; Outer layer, the outer layer is configured on the middle layer and include lignin based antimicrobial nonwoven spunbond fabric, and the outer layer is configured to connect external environment.

(16) a kind of mask in the FIG. 23 include:
Inner layer, the inner layer includes nonwoven spunbond fabric, and the inner layer is configured to the nose and mouth of contact wearer; Middle layer, the middle layer is sandwiched between outer and inner layer, which is a meltblown fabric material; Outer layer, the outer layer is configured on the middle layer and include light induced antimicrobial nonwoven spunbond fabric, and the outer layer is configured to connect external environment.

FIG. 23:—combination of mask inner (lignin antimicrobial coated spunbond), middle (lignin antimicrobial coated meltblown), and outer (lignin antimicrobial coated spunbond) layers.

(17) a kind of mask in the FIG. 24 include:

Inner layer, the inner layer includes nonwoven spunbond fabric, and the inner layer is configured to the nose and mouth of contact wearer; Middle layer, the middle layer is sandwiched between outer and inner layer, which is a hydrophobic lignin based antimicrobial coated meltblown fabric material; Outer layer, the outer layer is configured on the middle layer and include light induced antimicrobial nonwoven spunbond fabric, and the outer layer is configured to connect external environment.

(18). a kind of mask in the FIG. 25 include:

Inner layer, the inner layer includes hydrophobic lignin based antimicrobial coated nonwoven spunbond fabric, and the inner layer is configured to the nose and mouth of contact wearer; Middle layer, the middle layer is sandwiched between outer and inner layer, which is a meltblown fabric material; Outer layer, the outer layer is configured on the middle layer and include light induced antimicrobial nonwoven spunbond fabric, and the outer layer is configured to connect external environment.

FIG. 25:—combination of mask inner (lignin antimicrobial coated spunbond), middle (meltblown), and outer (light induced antimicrobial coated spunbond) layers.

FIG. 26:—combination of mask inner (lignin antimicrobial coated spunbond), middle (meltblown), and outer (light induced antimicrobial coated spunbond) layers.

(20) a kind of mask in the FIG. 27 include:

Inner layer, the inner layer includes nonwoven spunbond fabric, and the inner layer is configured to the nose and mouth of the contact wearer; Middle layer, the middle layer is sandwiched between the outer and inner layer, which is a lignin antimicrobial coated meltblown fabric material; Outer layer, the outer layer is configured on the middle layer and include a nonwoven spunbond fabric, and the outer layer is configured to connect external environment. or a mixture of photoactivated reactive radicle generating coating and polycationic biocide coating (1-3) and also contact based biocide coating on the middle layer of the surgical mask (nonwoven PP)

FIG. 27:—combination of mask inner (spunbond), middle (lignin antimicrobial coated meltblown), and outer (spunbond) layers.

(21) Nonwoven Fabrics

Nonwoven fabrics are sheets and a web of fibers interlocked by friction or entanglement. The nonwoven fabric fibers may be natural such as cellulose, jute, wood pulp, cotton or synthetic such as polyesters, polypropylene, polyethylene, polyamides, polyimides, and acrylics. The nonwoven can be stapled, continuous, or formed in situ. For manufacturing of surgical disposable mask and respirator N95, N99 are constructed from a nonwoven spunbond polypropylene used in the inner layer with a density of 18 g/m2, middle layer with a density of 22 g/m2 in which the polypropylene fibers are dispersed and heat-sealed together. The middle layer is fabricated using the meltblowing technique or hybrid spunbond/meltblown/spunbond (SMS) laminate microfibers having an average diameter of about 3 microns or less. Metlblown fibers are extruded and drawn by high velocity heated air to make fine fibers in the 1-4 μm diameter range. Fiber filaments must be small enough to create pore sizes that are adequate in stopping particles, especially 0.3 μm in size, from passing through. The current disclosure also applied to coating on different types of synthetic and natural microfibers, such as cellulose acetate (CA), gelatin, chitosan and polyhydroxybutyrate-co-hydroxyvalerate (PHBV), polyamide 6 (PA 6), polystyrene (PS), polyvinylpyrrolidone (PVP), polyacrylonitrile (PAN), polyvinyl alcohol (PVA), poly (lactic acid) (PLA), poly (lactic-co-glycolic acid) (PLGA), polybutylene terephthalate (PBT) and polyurethane (PU).

(22) HEPA filters:—High-efficiency Particulate Air (HEPA) filters are the technology used to remove submicron size particles from the air in individual and industrial air filtration protection applications. HEPA filters are 99.97% efficient at collecting the most-penetrating particle ~0.3 micrometers. Another type of Ultra-Low Penetration Air (ULPA) filter is capable of filtering out at least 99.999% of 0.12-micron diameter particles. HEPA filters are typically manufactured of different types of passive micro-fibers, (spunbond and melt-blown polyethylene, polypropylene, polyethyleneterepthalate, and nylon) layers sandwich together into a nonwoven microfibrous mat. This microfiber passive filter is usually protected by a prefilter with a large pore size to remove larger particles from the incoming airstream. In many applications, the mat is pleated to allow a large amount of surface area within the filter housing. HEPA-based technology are employed in a variety of environments, including hospitals, airplanes, pathogens handing laboratories, semiconductor manufacturing clean rooms, and nuclear power plants. However, HEPA filters may not provide adequate protection for all threats: viruses are submicron in size and have small minimum infection doses (MID50). Heating, ventilation, and air conditioning (HVAC) equipment filters use a nonwoven type microfibre utilizing a pressurized flow of air for heating homes and industrial heating and cooling equipment. They are equipped with a filter to remove airborne contaminants, such as dust, debris, and pollen.

The most of contact killing of antibacterial disclosures that have been proposed in US patents are generally the dissolution of active components (antibiotics, iodine, quaternary ammonium compounds, copper ions, and silver ions) coated onto the material surface. The composite material is then either molded into a device or applied as a coating. The bactericidal action of such coatings depends on the diffusion of the antibacterial agent into a solution. The majority of these products are used in medical devices, implants, and clathrates to prevent contamination of microorganisms. Major disadvantages of those kinds of antimicrobial coatings often leach antimicrobial materials into the surrounding environment. Also, in the case of airborne pathogens, where there is an absence of a large-quality liquid medium, this strategy would not be expected to be effective. Compared to that, a chemically bonded bioactive material directly to the polymeric material that forms a non-dissolving surface coating, which provides this resistance over the period of time. The important aspect of the lignin-based antimicrobial polymer coating is that the antibacterial agent capable of reversibly binding or complexing with the pathogen's charged surface of the lipopolysaccharide network, thereby disrupting the outer membrane. In the current disclosure, polymerizable lignin-based terpyridine polycations possess pathogen inactivation properties when crosslinked on microfibers. When a pathogen contacts the lignin-based terpyridine polycations, the high surface-active material penetrates at least the outer portion of the lipid bilayer of the microorganism's cell membrane upon contact without elution of the active material into solution, thereby maintaining long term efficacy. The disclosure further provides methods for making the compositions consist of polymerizable lignin-based terpyridine polycations with monomer, cross-linker and photoinitiator generally comprises providing a solution (dissolve in an organic solvent such as THF, DMF, and DMSO or a mixture of an organic solvent and water), dispersion or suspension and applying them in the form of spray or solution dip to form antimicrobial coatings on the microfibers of the mask.

In this innovation, polymeric coating compositions with multiple functionalities crosslinks and coatings are described, which are capable of forming a variety of cross-links with varying durability, hydrophilicity, and chemical compatibility. The monomeric coating composition types mentioned are hydrophilic polymers alone, and as such, are Acetone, water, ethanol, methanol, tetrahydrofuran (THF), Dimethyl sulfoxide (DMSO), N-methyl-2-pyrrolidone (NMP), and dimethylformamide (DMF) soluble and will not form durable coatings unless cross-linked. The coating can be formed in various ways, e.g. by polymerization initiated by UV light irradiation, by the heat-induced formation of internetwork structures, or by direct chemical reaction. A nonwoven synthetic fibers consist of Polyethylene (PE), polyvinyl chloride (PVC), polyproplene (PP), poly(fluorinated ethylene propylene) (PFEP), polycarbonate (PC), polyethylene terephthalate (PET), poly(glycol-modified polyethylene terephthalate) (PETG), poly(liquid silicone rubber (PLSR), polymethylpentene (PMP), poly(styrene acrylonitrile resin, Polysulfone (PS), Polyethylene (PE), polyvinyl chloride (PVC), polyproplene (PP), Polyester (PET), Polyvinyl chloride (PVC), Polyamides (nylon), Polyurethane (PU), phenolic resin (PF), urea formaldehyde resin (UF), epoxy resin (EP), unsaturated polyester (UP), polyurethane resin (PU)

The microstructure of the antimicrobial film contains an antimicrobial composition for surface coating, composed of quaternary ammonium chloride of terpyridine, adenine-based multi-amine heterocyclic aromatic, along with others as an example such as pyrimidines, quinoline, indole, piperidine, pyridine, pyrrolidine, etc. The aliphatic part of the quaternary ammonium cationic head groups containing various alkyl chains from C1 to C16. A polymerizable group attached to a lignin group or terpyridine or adenine-based antimicrobial compound itself. The polymerizable groups consist of acrylate, methacrylate, vinyl, and allyl functionals attached to lignin via coupling methods such as epoxy amine, epoxy hydroxyl, thiol-ene, carboxylate-hydroxide coupling chemistries.

The polymer coating composition comprising an antimicrobial monomer, aliphatic or aromatic mono or bis acrylate type monomer, cross-linker, UV initiator, and solvent. The coating composition a flexible acrylic monomer such as; Hydroxyethylmethacrylate (HEMA), tert-Butyl methacrylate (tert-BMA), methyl methacrylate (MMA), Glycidyl methacrylate (GMA), Crosslinker such as diethylene glycol dimethacrylate (DEGDMA), Di(trimethylolpropane) tetraacrylate, Pentaerythritol tetraacrylate, 1,9-Bis(acryloyloxy)nonane, hexanediol dimethacrylate (HDDMA), diethylene glycol diacrylate (DEGDA), poly(ethylene glycol) diacrylate (PEGDA), trimethylolpropane ethoxy triacrylate (TMPEOTAI), Ebecryl polyurethan, triethylene glycol dimethacrylate (TREGDMA), trimethylolpropane trimethacrylate (TMPTMA). methoxyethyl methacrylate (MEMA), hydroxydiethoxyethyl methacrylate (HDEEMA), ethylene glycol dimethacrylate (EGDMA), N-Hydroxyethyl acrylamide (HEA), N,N-Dimethylacrylamide (DMA), N[Tris(hydroxymethyl)methyl]acrylamide (THMA), N-(3-Aminopropyl)methacrylamide hydrochloride(APMAH), 4-Vinylpyridine (4-VP). A UV absorber (specifically absorbed 260 nm to 360 nm); Benzophenone, 2-ethylhexyl-(4-N,N-dimethyl amino)benzoate, 2,2-Dimethoxy-1,2-diphenylethan-1-one, 2-Hydroxy-2-methyl-1-phenylpropanone, 1-Hydroxy-cyclohexylphenylketone, Ethyl-4-(dimethylamino)benzoate. The solvents such as acetone, Ethanol (EtOH), Methanol (MeOH), t-butyl alcohol (tBu-OH), chloroform, 1,2-dichloromethane, dimethyl formamide (DMF), dimethyl sulfoxide (DMSO), N-methyl-2-pyrrolidinone (NMP), Toluene, tetrahydrofuran (THF), p-Xylene.

Figure 13:
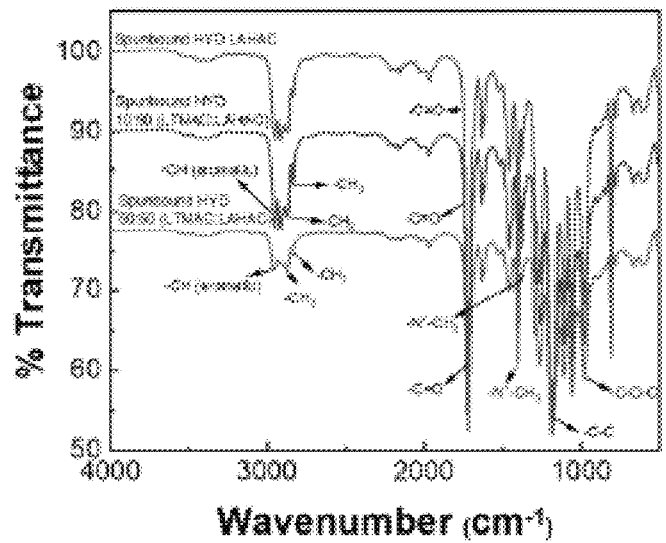
FIG. 13. FTIR spectra of spunbond PP coated with a mixture of LTMAC and LAHAC.

(23) The embodiment shows the bactericidal effect in $K.$ $pneumoniae$ droplet on coated spunbond masks. The droplet of $K.$ $pneumoniae$ in DI water (droplet and aerosol) was incubated for 5 minutes, 10 minutes, and 30 minutes on coated surgical masks (FIG. 13). Based on example 16, the bacterial CFU decreased 64 per cents from 5 minutes incubation, 96.6 percent and 98.8 per cents reduced at 10 minutes and 30 minutes incubation, respectively hydrophilic. In example 9, 75 percent of bactericidal effects were observed in 5 minutes incubation, and 99 per cents of bacterial CFU was decreased at 30 minutes incubation hydrophobic. The results indicate that the bactericidal of the respiratory pathogen can be caused by coated surgical masks effectively within 30 minutes. The bactericidal effect of aerosolized $K.$ $pneumoniae$ dissolved in deionized water and artificial saliva on coated surgical masks. The aerosolized $K.$ $pneumoniae$ in deionized water rapidly decreased bacterial CFU in 5 minutes incubation in both hydrophilic (71.8 per cents) and hydrophobic (94.1 per cents) coated filters, and 99 per cents of bacterial cfu was reduced at 30 minutes incubation in both coated filters. The aerosolized $K.$ $pneumoniae$ in artificial saliva display significant bactericidal with bacterial cfu, 99 per cents of bacteria was inactivated with 30 minutes incubation in both coated filters. In general, antimicrobial coated spunbond or meltblown fabrics shows about 3-5 log reduction within 30 min.

FIG. 28:—Antibacterial performance of coated (LTMAC) spunbond mask layer exposed with bacterial droplet and aerosol.

(24) The embodiment shows the virucidal efficacy of H1N1 droplets on coated spunbond fabrics. At 30 minutes incubation, 90 percent of virucidal activity were detected with viral titer measurement in both coated filters. The First example (FIG. 14) is for the hydrophobic LTMAC based coating and the second example is for hydrophobic LAHAC. The amplification of specific genes in H1N1 by RT-qPCR also strong evidence that the gene levels of HA and NP reduced 99.9 percent at 30 minutes incubations.

FIG. 29:—Antimicrobial performance of LTMAC and LAHAC coated spunbond mask layer exposed with H1N1 aerosol.

(24) The embodiment shows virucidal efficacy of aerosolized HCoV-229E and HCoV-OC43 coronavirus in deionized water on antimicrobial coated surgical masks. The virucidal efficacy with HA and NP gene expression at the activity of aerosolized virus rapidly reduced shows 36 log reduction within 30 min for both LTMAC and LAHAC coated filters.

REFERENCES 1. https://www.who.int/emergencies/diseases/novel-coronavirus-2019

2. https://www.statista.com/topics/6139/covid-19-impact-on-the-global-economy
3. https://www.fda.gov/medical-devices/personal-protective-equipment-infection-control/n95-respirators-and-surgical-masks-face-masks
4. https://www.cdc.gov/niosh/npptl/stps/respirator_testing.html
5. (a) ASTM F2299/F2299M-03(2017) Standard Test Method for Determining the Initial Efficiency of Materials Used in Medical Face Masks to Penetration by Particulates Using Latex Spheres; (b) ASTM F2101-19 Standard Test Method for Evaluating the Bacterial Filtration Efficiency (BFE) of Medical Face Mask Materials, Using a Biological Aerosol of *Staphylococcus aureus*; (c) ASTM F2100-19 Standard Specification for Performance of Materials Used in Medical Face Masks; (d) ASTM F1862/F1862M-17 Standard Test Method for Resistance of Medical Face Masks to Penetration by Synthetic Blood (Horizontal Projection of Fixed Volume at a Known Velocity)
6. Disinfecting air filter, US patent no: US20100282083A1
7. Contact-killing non-leaching antimicrobial materials U.S. Pat. No. 5,849,311A
8. Idris Cerkez, S. D. Worley, R. M. Broughton, T. S. Huang, Antimicrobial surface coatings for polypropylene nonwoven fabrics, Reactive and Functional Polymers, 73, 2013, 1412-1419,
9. Cheng, X.; Ma, K.; Li, R.; Ren, X.; Huang, T. S. Antimicrobial Coating of Modified Chitosan onto Cotton Fabrics Appl. Surf. Sci. 2014, 309, 138-143
10. Badrossamay, M. R.; Sun, G. Acyclic Halamine Polypropylene Polymer: Effect of Monomer Structure on Grafting Efficiency, Stability and Biocidal Activities React. Funct. Polym. 2008, 68, 1636-1645
11. Bai, Rong; Zhang, Qing; Li, Lanlan; Li, Ping; Wang, Yan-Jie; Simalou, Oudjaniyobi; Zhang, Yanling; Gao, Ge; Dong, Alideertu ACS Applied Materials & Interfaces (2016), 8 (46), 31530-31540
12. Jeong, Gu Min; Seong, Hyejeong; Im, Sung Gap; Sung, Bong Hyun; Kim, Sun Chang; Jeong, Ki Jun Journal of Industrial and Engineering Chemistry (2018), 58, 51-56.
13. Botequim, D.; Maia, J.; Lino, M. M. F.; Lopes, L. M. F.; Simoes, P. N.; Ilharco, L. M.; Ferreira, L. Langmuir (2012), 28 (20), 7646-7656
14. "Microstructured antimicrobial film", U.S. Pat. No. 8,318,282B2
15. Antimicrobial compositions and fibres incorporating the same US20120082711A1
16. Antimicrobial Polymer for Use in Ophthalmic implants US 20200383907
17. Antimicrobial woven or knitted fabric US 3699958AUS3699958A
18. Manufacturing process of antibacterial fiber U.S. Pat. No. 6,368,361-B1
19. Antimicrobial treatment of synthetic nonwoven textiles EP2558637A2

Example 3

Alternative synthesis for 2,2':6',2"-(terpyridine-1-methyl ammonium chloride-1-yloxy) methyl epoxide (TMAC) and N-9(N-hexyl adenine ammonium chloride)N-6 methyl epoxide (AHAC).

Developing alternative chemical synthetic schemes for TMAC and AHAC is important for reducing production costs. Previous reported method of TMAC and AHAC synthesis are expensive, time-consuming, and involve the use of some of hazardous materials especially in the starting material stage. However, below alternative synthetic schemes can offer more efficient and cost-effective ways to produce TMAC and AHAC, beginning with the synthesis of the starting material itself in some case. This approach can significantly reduce the overall cost of production and reducing the need for expensive starting materials. By exploring alternative routes, such as the use of different reactants, catalysts, solvents, or changes in reaction conditions and process design, cost of the final products can be significantly reduced up to 20-30% from the original design. Below are few alternative synthetic routes for synthesis of TMAC and AHAC.

(a) Synthesis of 2,2':6',2"-terpyridine from 2-cyno pyridine

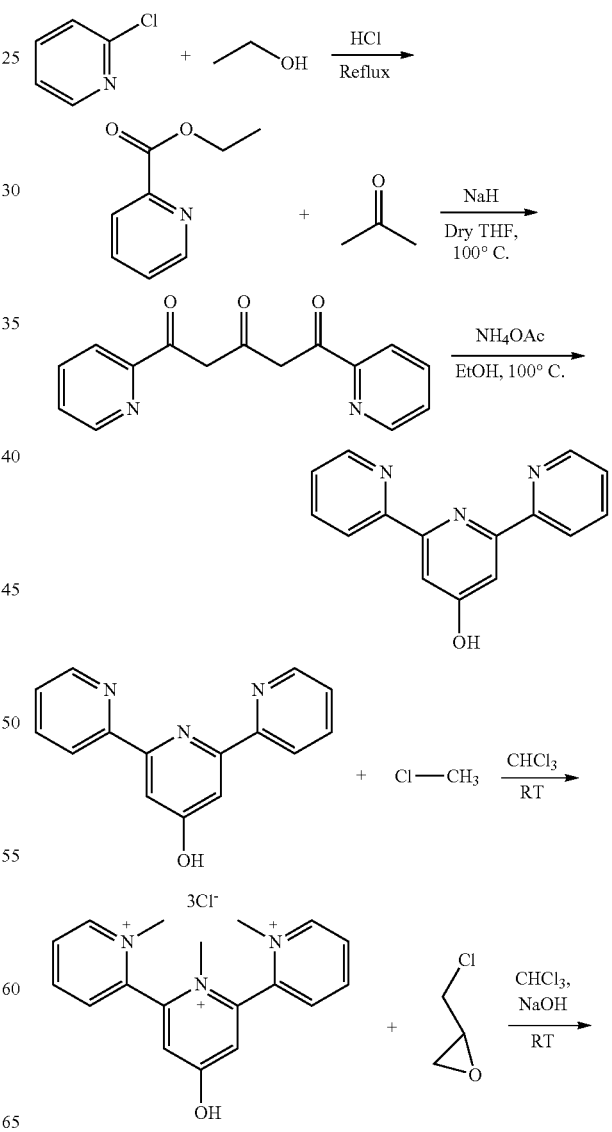

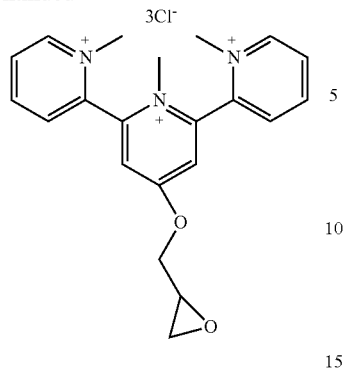

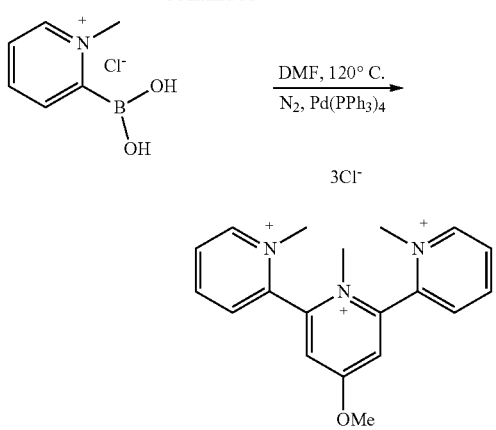

Synthesis of TMAC from low cost 2-cyno pyridine than previously provided scheme starting with 2-picolic ethyl ester. This new method can potentially lower the production cost by up to 40%.

The synthesis of TMAC can be achieved from low-cost 2-cyno pyridine, as shown above, which offers a more cost-effective alternative to the previously provided scheme starting with 2-picolic ethyl ester. To synthesize 2-picolic ethyl ester, an acid-catalyzed "Pinner reaction" is conducted using 2-cyno pyridine and ethanol. In this process, 5 g (4.8 mmol) of 2-cynopyridine is refluxed with 100 mL of ethanol and 2.5 mmol of HCl for 12 hours. The resulting solvent is removed under reduced pressure, and the residue is then dissolved in DCM and extracted with DI water. The aqueous part is neutralized by adding sodium carbonate, and the organic part is combined and passed over magnesium sulphate. The resultant concentrate is then purified using alumina or silica gel column chromatography, with DCM/hexane as the eluent, to obtain 2-ethyl picolinate as the final product. Similarly, 2-picolic ethyl ester also be prepared from the commercially available 2-picoliniacid (6 g, 6 mmol) reacted with 20 mL of thionyl chloride under reflux condition for 12 hours. After removal of thionyl chloride under reduced pressure, the residue was dissolved in 100 mL of ethanol for 5 hours to obtain 2-picolic ethyl ester. Reaction was complete by TLC analysis and reaction mixture was concentrated under reduced pressure to afford 2-picolic ethyl ester.

(b) Synthesis of 2,2':6',2''-terpyridine-4 methoxy methylammonium chloride

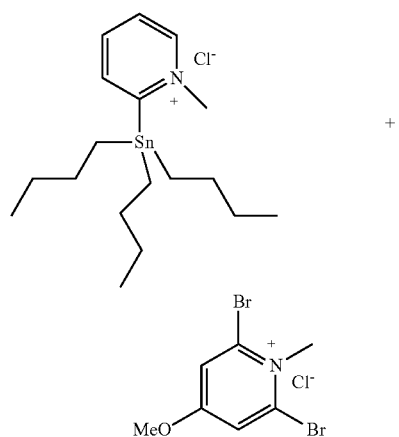

The synthesis of 2,2':6',2''-terpyridine-4 methoxy methylammonium chloride, which involves a one-step reaction of 2-(Tributylstannyl) pyridine methyl ammonium chloride and 2-5 dibromo-3-methoxy pyridine methyl ammonium chloride, providing a more cost-effective alternative to the previous three-step synthesis. This approach reduces both cost and time.

The alternative synthetic scheme involves the arylation of pyridyl halides and pyridyl boronic acid using Stille coupling of organometallic compounds in the presence of palladium triphenylphosphine under an argon atmosphere. To begin the process, 0.65 mmol of 2-5 dibromo-3-methoxy pyridine methyl ammonium chloride is coupled with 0.75 mmol of 2-(Tributylstannyl) pyridine methyl ammonium chloride and 0.75 mmol of pyridyl methyl ammonium chloride boronic acid. 0.040 mmol of $Pd(PPh_3)_4$ and 10 mL of DMF are added to the mixture at room temperature, followed by heating at 120° C. for 60 hours. The reaction is then quenched with sat. aq $NH_4Cl$ solution, and the aqueous solution is extracted with dichloromethane (DCM). The organic layer is dried over anhydrous magnesium sulphate, and the solvent is removed using Rota evaporation. The crude product is then purified by chromatography (Hexane-ethyl acetate) to obtain 2,2':6',2''-terpyridine-4 methoxy trimethyl ammonium chloride. In next step, 2,2':6',2''-terpyridine-4hydroxy trimethyl ammonium chloride is obtained by refluxing 2,2':6',2''-terpyridine methoxide-4 methoxy trimethyl ammonium chloride with a 1:1.5 molar ratio of potassium iodide (KI) in ethanol for 24 hours and passing it through an alumina column.

(c) Synthesis of 2,2':6',2''-terpyridine-4 hydroxy methyl ammonium chloride

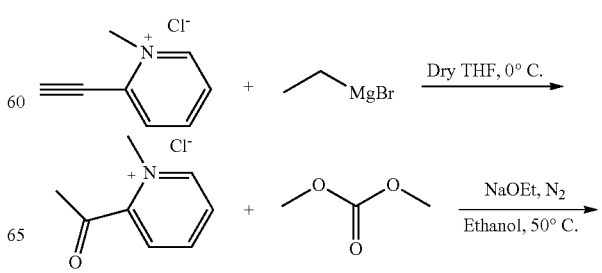

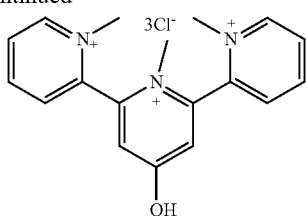

The synthesis of 2,2':6',2"-terpyridine-4 hydroxy methyl ammonium chloride starting with a two-step Grignard and Kröhnke reaction of 2-Cyanopyridine methyl ammonium chloride. This alternative synthetic scheme reduces the previous three-step synthesis to two, while using much cheaper starting materials.

Figure 3:
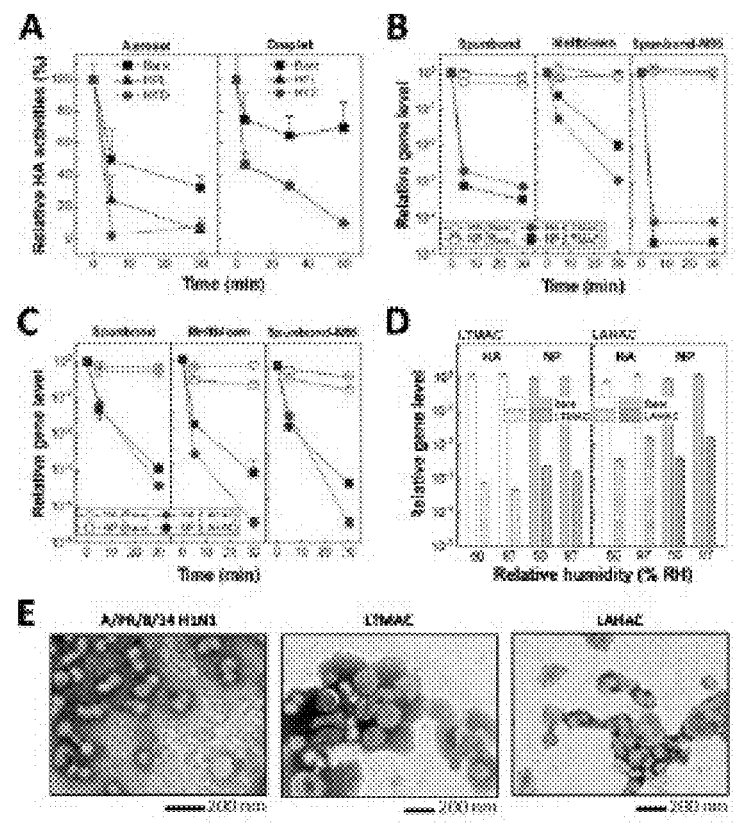

The reaction mixture of 5 g of 2-Cyanopyridine ammonium chloride (1.5 mole) and 3.4 g of ethyl magnesium bromide (3 mole) in dry THF at 0° C. in a nitrogen atmosphere was stirred for 6 hours (FIG. 3). The THF was removed using rota evaporation, and the solid sample was dissolved in aqueous ammonium chloride solution. The aqueous layer was extracted with ethyl acetate (3×100 mL), and the combined organic layer was washed with brine solution. The resultant was dried over $Na_2SO4$, concentrated under reduced pressure, and purified using alumina or silica gel column chromatography with DCM/hexane as an eluent to obtain 2-acetylpyridine as the final product. In the next step, 5.1 g of 2-acetylpyridine methyl chloride (42 mmol) and 1.9 g of dimethyl carbonate (20 mmol) were mixed with 50 mL of 2.6 mmol sodium ethoate under a nitrogen atmosphere. The reaction mixture was heated to 40° C. for 12 hours, cooled to room temperature, and slowly quenched with 5-10 mL of ammonium hydroxide. The resulting precipitation was filtered, and the final product was recrystallized using heated anhydrous ethanol.

(d) Synthesis of 2,2':6',2"-terpyridine ammonium chloride 4-ethylmethoxide from 2-acetylpyridine

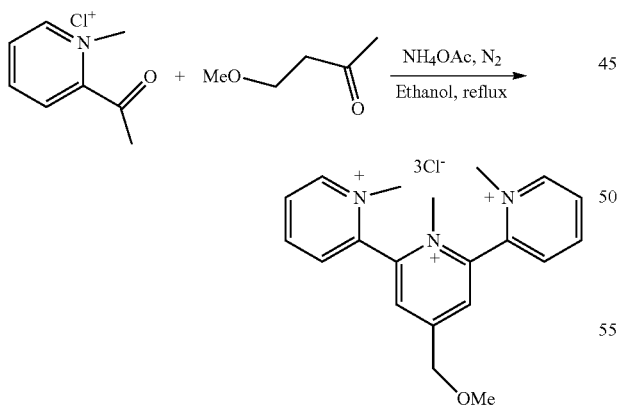

An alternative method for synthesizing terpyridine, using a modified Kröhnke-type reaction starting with 2-acetylpyridine methyl ammonium chloride.

In this approach, 1.1 g of 2-acetylpyridine methyl ammonium chloride (8 mmol), 0.8 g (4 mmol) of 1-methoxy butanone, and 0.675 g of ammonium acetate (8 mmol) are mixed in 150 mL of ethanol and refluxed for 2 days. After removing the solvent under reduced pressure, the resulting residue is dissolved in ethyl acetate and extracted with DI water, followed by the addition of sodium carbonate to extract the aqueous phase. The organic layer is then combined, passed over magnesium sulphate, and concentrated under reduced pressure. The final product, methoxyethyl terpyridine, is purified by alumina or silica gel column chromatography using DCM/hexane as the eluent.

(e) Synthesis of N-9(N-hexyl adenine ammonium chloride)N-6 methyl epoxide (AHAC) using 1-chloroethanidehyde

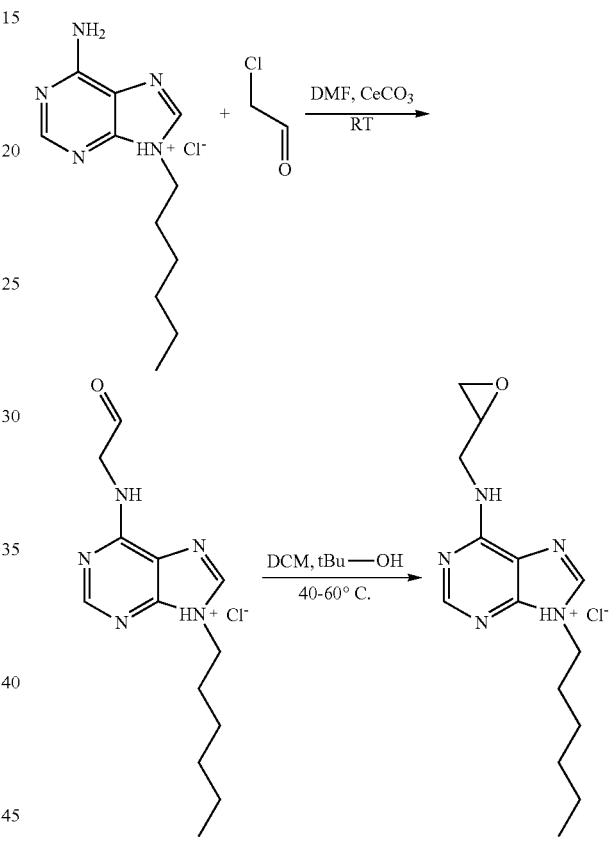

Synthesis of N-9(N-hexyladenine ammonium chloride) N-6 methyl epoxide (AHAC) using a two-step method involving 1-chloroethanal followed by epoxidation.

In alternative method shown above, a solution of adenine hexylammonium chloride (0.074 mol) and 1-chloroethanal (7.0 ml, 0.096 mol) in 100 mL of dimethylformamide (DMF) was stirred with cesium carbonate at room temperature for 12 hours. The resulting mixture was then added to 100 mL of saturated ammonium chloride solution and 300 mL of dichloromethane (DCM), after which the aqueous layer was separated. The aqueous phase was extracted three times with ethyl acetate (3×100 mL). The combined organic (DCM) layers were washed with brine, dried over magnesium sulfate, filtered, and concentrated to give the aldehyde-functionalized hexyl adenine ammonium chloride. This product can then be used as a starting material for the subsequent epoxidation step.

(f) Synthesis of N-9(N-hexyl adenine ammonium chloride)N-6 methyl epoxide (AHAC) using 1-chloroethanldehyde

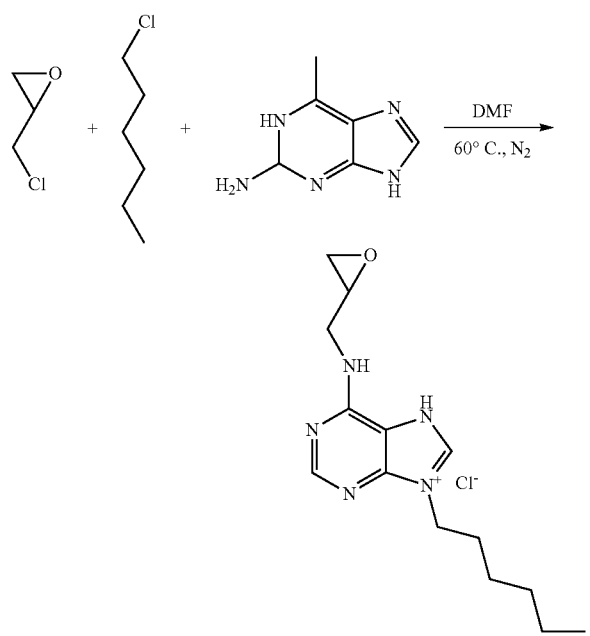

The synthesis of N-9(N-hexyl guanine ammonium chloride)N-6 methyl epoxide (AHAC) can also be achieved with a one-step reaction using guanine, which is 90% cheaper than adenine.

In another method shown above. 10 g (6.6 mmol) of guanine was quaternized with chlorohexane to form guanine hexyl ammonium chloride in a 50 mL ethanol solution. Then, 7.0 mL (0.032 mol) of 1-chlorohexane, 3.2 mL of epichlorohydrin (0.032) in 50 mL of diethyl formamide (DMF) was stirred at room temperature for 12 hours. Then the resulting mixture was poured into 100 mL of saturated ammonium chloride solution and 300 mL of dichloromethane (DCM). The aqueous layer was separated, and the aqueous phase was extracted with ethyl acetate (3×100 mL). The combined organic (DCM) layers were washed with brine, dried over magnesium sulfate, filtered, and concentrated to obtain the aldehyde functionalized hexyl guanine.

Method of the invention are conveniently practiced by providing the compounds and/or compositions used in such method in the form of a kit. Such kit preferably contains the composition. Such a kit preferably contains instructions for the use thereof.

To gain a better understanding of the invention described herein, the following examples are set forth. It should be understood that these examples are for illustrative purposes only. Therefore, they should not limit the scope of this invention in anyway.

All publications, patents and patent applications mentioned in this Specification are indicative of the level of skill those skilled in the art to which this disclosure pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

The invention claimed is:

1. A composition comprising: a lignin conjugated 2,2',6', 2"-(terpyridine-1-methyl ammonium chloride-1-yloxy) methyl epoxide (LTMAC).

2. The composition of claim 1, further comprising a crosslinker and a UV initiator.

3. The composition of claim 1, further comprising 2-hydroxyethyl methacrylate (HEMA), pentaerythritol tetraacrylate, and Hydroxy-2-methylpropiophenone.

4. The composition of claim 1, further comprising tert-butyl methacrylate (TBMA), pentaerythritol tetraacrylate, and Hydroxy-2-methylpropiophenone.

5. A composition comprising: a lignin conjugated N-9 (Adenine N-hexyl ammonium chloride)N-6 methyl epoxide (LAHAC).

6. The composition of claim 5, further comprising a crosslinker and a UV initiator.

7. The composition of claim 5, further comprising 2-hydroxyethyl methacrylate (HEMA), pentaerythritol tetraacrylate, and Hydroxy-2-methylpropiophenone.

8. The composition of claim 5, further comprising tert-butyl methacrylate (TBMA), pentaerythritol tetraacrylate, and Hydroxy-2-methylpropiophenone.

9. A method for manufacturing an antimicrobial and/or antiviral article, comprising: applying a composition comprising: a lignin conjugated 2,2',6',2"-(terpyridine-1-methyl ammonium chloride-1-yloxy) methyl epoxide (LTMAC), or a lignin conjugated N-9(Adenine N-hexyl ammonium chloride) N-6 methyl epoxide (LAHAC), onto a surface of an article.

10. The method of claim 9, the composition further comprising a crosslinker and a UV initiator.

11. The method of claim 9, the composition further comprising 2-hydroxyethyl methacrylate (HEMA), pentaerythritol tetraacrylate, and Hydroxy-2-methylpropiophenone.

12. The method of claim 9, the composition further comprising tert-butyl methacrylate (TBMA), pentaerythritol tetraacrylate, and Hydroxy-2-methylpropiophenone.

13. The method of claim 9, the applying comprising dipping or spray-coating the article with the composition.

14. The method of claim 13, wherein the article is a facemask, a respirator, an apron, a gown, a surgical mask, an N95 mask, an N99 mask, a HEPA filter, HVAC nonwoven microfilter, coveralls, a three-ply fabric stacked by spunbond, meltblown and spunbond fabricated polyproplene/polyethylene layers, an N100 mask, a KN 95 mask, a FFP2 mask, a P2 mask, a Korea 1st class (KF94) mask, or a DS respirator mask.

15. The method of claim 14, wherein the article comprises cotton, silk, a synthetic fiber, chiffon polyester, a polyester/cotton blend, polypropylene, a cellulose-based fabric, a flannel fabric, and/or Spandex.

* * * * *